United States Patent
Yeo et al.

(10) Patent No.: US 12,035,264 B2
(45) Date of Patent: Jul. 9, 2024

(54) METHOD AND APPARATUS TO ADJUST UPLINK TIMING IN COMMUNICATION SYSTEM

(71) Applicant: Samsung Electronics Co., Ltd., Suwon-si (KR)

(72) Inventors: Jeongho Yeo, Suwon-si (KR); Younsun Kim, Suwon-si (KR); Hyunseok Ryu, Suwon-si (KR); Sungjin Park, Suwon-si (KR); Youngbum Kim, Suwon-si (KR); Cheolkyu Shin, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 17/477,031

(22) Filed: Sep. 16, 2021

(65) Prior Publication Data

US 2022/0095258 A1  Mar. 24, 2022

(30) Foreign Application Priority Data

Sep. 18, 2020 (KR) .................. 10-2020-0120567

(51) Int. Cl.
*H04W 72/04* (2023.01)
*H04W 56/00* (2009.01)
(Continued)

(52) U.S. Cl.
CPC ... *H04W 56/0045* (2013.01); *H04W 72/0446* (2013.01); *H04W 72/23* (2023.01); *H04W 80/02* (2013.01); *H04W 84/06* (2013.01)

(58) Field of Classification Search
CPC .......... H04W 56/0045; H04W 56/006; H04W 56/005; H04W 80/02; H04W 84/06;
(Continued)

(56) References Cited

U.S. PATENT DOCUMENTS

2009/0180451 A1* 7/2009 Alpert ............... H04W 72/1215
370/338
2010/0234071 A1* 9/2010 Shabtay ................. H04B 7/155
455/562.1

(Continued)

FOREIGN PATENT DOCUMENTS

| KR | 10-2071543 B1 | 1/2020 |
|---|---|---|
| WO | 2018/095555 A1 | 5/2018 |
| WO | 2020/009509 A1 | 1/2020 |

OTHER PUBLICATIONS

LG Electronics, Discussions on UL time and frequency synchronization enhancements in NTN, R1-2006379, Aug. 8, 2020.

(Continued)

*Primary Examiner* — Wei Zhao
(74) *Attorney, Agent, or Firm* — Jefferson IP Law, LLP

(57) ABSTRACT

The disclosure relates to a pre-5$^{th}$-generation (5G) or 5G communication system to be provided for supporting higher data rates beyond a 4$^{th}$ generation (4G) communication system such as long term evolution (LTE). A method performed by a terminal in a communication system is provided. The method includes receiving, from a base station, a common timing advance (TA) controlled by the base station, estimating a terminal-specific TA used for compensating for link delay between the base station and the terminal, and determining a TA of the terminal based on the common TA and the terminal-specific TA.

16 Claims, 39 Drawing Sheets

(51) Int. Cl.
*H04W 72/0446* (2023.01)
*H04W 72/23* (2023.01)
*H04W 80/02* (2009.01)
*H04W 84/06* (2009.01)

(58) Field of Classification Search
CPC ............. H04W 74/0841; H04W 72/23; H04W 72/0446; H04W 72/046; H04W 56/004; H04W 74/084
See application file for complete search history.

(56) References Cited

U.S. PATENT DOCUMENTS

| | | |
|---|---|---|
| 2013/0044665 A1 | 2/2013 | Ng et al. |
| 2021/0144669 A1* | 5/2021 | Edge ................... H04W 16/28 |
| 2021/0176780 A1 | 6/2021 | Kang et al. |
| 2022/0086780 A1* | 3/2022 | Tsai ..................... H04W 56/005 |
| 2023/0300768 A1* | 9/2023 | Atungsiri .......... H04W 56/0045 |
| | | 370/503 |

OTHER PUBLICATIONS

Moderator, Feature lead Summary on enhancements on UL time and frequency synchronization for NR NTN, R1-2007290, Aug. 27, 2020.
International Search Report dated Dec. 17, 2021, issued in International Patent Application No. PCT/KR2021/012738.
Panasonic, Timing advance and PRACH design for NTN, R1-1912903, 3GPP TSG RAN WG1 #99, Nov. 8, 2019, Reno, USA.
European Search Report dated Jan. 26, 2024, issued in European Application No. 21869764.7.

* cited by examiner

| Orbit type | Height | Period |
|---|---|---|
| LEO | 500~1000 km | 90~120 mins |
| MEO | 5000~15000 km | Approx 6 hours |
| GEO | Approx 36,000 km | Approx 24 hours |

- Link budget between UE and satellite

· Path loss : [1600]
  $FSPL[d, f_c] = 32.45 + 20 \log[f_c] + 20 \log_{10}[d]$

· Rx antenna gain for UL : 24 dBi [LEO], 45.5 dBi [GEO]

- Link budget between UE and terrestrial gNB

· Path loss[LOS] : [1610]
  $PL_2 = 28.0 + 40 \log_{10}[d_{3D}] + 20 \log_{10}[f_c] - 9 \log_{10}[[d'_{BP}]^2 + [h_{BS} - h_{UT}]^2]$ · Path loss[NLOS] : [1620]
  $PL'_{Uma-NLOS} = 13.54 + 39.08 \log_{10}[d_{3D}] + 20 \log_{10}[f_c] - 0.6[h_{UT} - 1.5]$ · Rx anntenna agin for UL : ~12 dBi

METHOD AND APPARATUS TO ADJUST UPLINK TIMING IN COMMUNICATION SYSTEM

CROSS-REFERENCE TO RELATED APPLICATION(S)

This application is based on and claims priority under 35 U.S.C. § 119(a) of a Korean patent application number 10-2020-0120567, filed on Sep. 18, 2020, in the Korean Intellectual Property Office, the disclosure of which is incorporated by reference herein in its entirety.

BACKGROUND

1. Field

The disclosure relates to an apparatus and method to adjust uplink timing in a communication system. More particularly, the disclosure relates to an apparatus and method to adjust uplink timing in a communication system if a terminal transmits and receives a signal to and from a base station via a satellite.

2. Description of Related Art

To meet the demand for wireless data traffic having increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, in the late 2010s and 2020s, as the cost of launching satellites drastically has decreased, the number of companies that want to provide communication services via satellites has increased. Accordingly, a satellite network has emerged as a next-generation network system that complements an existing terrestrial network. Although the satellite network may not be possible to provide a user experience at the same level of the terrestrial network, the satellite network has an advantage of being able to provide communication services even in areas where it is difficult to deploy the terrestrial network or in a disaster situation, and also secures economic feasibility according to the drastic decrease in the cost of launching satellites. In addition, some companies and 3rd Generation Partnership Project (3GPP) standards have researched in a direct communication between smart phones and satellites.

In a satellite network, if a terminal attempts to connect to a base station via a satellite, long propagation delay time (e.g., propagation delay) may occur in arrival of a radio wave due to a long distance of several hundred km, several thousand km or more between the terminal and the satellite, and between the satellite and the base station on the ground. In general, propagation delay time between the terminal and the satellite and propagation delay time between the satellite and the base station in the satellite network are much longer than propagation delay time which may occur when the terminal and the base station communicate directly in a terrestrial network.

In addition, in the satellite network, the propagation delay time between the terminal and the satellite or the propagation delay time between the satellite and the base station changes with time because the satellite continuously moves along an orbit, so terminal-satellite propagation delay time or satellite-base station propagation delay time for all terminals belonging to the satellite network changes. Accordingly, if a plurality of terminals transmit signals to the base station at the same time, because locations of the plurality of terminals are different, time for signals transmitted by the plurality of terminals to arrive at the base station may be different.

Therefore, in order for uplink signals transmitted from different terminals to arrive at the base station at the same time for time synchronization, a time point at which the uplink signal is transmitted may be configured differently for each terminal according to a location, and a timing advance (TA) is used for this. For example, the TA is used for adjusting uplink timing, for example, uplink frame timing with respect to downlink timing, for example, downlink frame timing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for adjusting uplink timing in a communication system.

Another aspect of the disclosure is to provide a method and apparatus for adjusting uplink timing if a terminal transmits and receives a signal to and from a base station via a satellite in a communication system.

Another aspect of the disclosure is to provide a scheme in which a terminal directly determines a timing advance (TA) value to adjust uplink timing in a communication system supporting a non-terrestrial network (NTN).

Another aspect of the disclosure is to provide a scheme in which a base station or a satellite indicates a TA value and a terminal adjusts uplink timing based on the indicated TA value in a communication system supporting an NTN.

Another aspect of the disclosure is to provide a scheme in which a terminal adjusts uplink timing by adaptively selecting a scheme in which the terminal directly determines a TA value to adjust uplink timing and a scheme in which a base station or a satellite indicates a TA value and the terminal adjusts uplink timing based on the indicated TA value in a communication system supporting an NTN.

Another aspect of the disclosure is to provide a scheme in which a terminal reports a TA value or information about a method used for determining the TA value in a communication system supporting an NTN.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, a common timing advance (TA) controlled by the base station, estimating a terminal-specific TA used for compensating for link delay between the base station and the terminal, and determining a TA of the terminal based on the common TA and the terminal-specific TA.

In accordance with another aspect of the disclosure, a method performed by a base station in a communication system is provided. The method includes transmitting, to a terminal, a common timing advance (TA) controlled by the base station, and receiving an uplink signal from the terminal at time at which a TA of the terminal is applied, wherein the TA of the terminal is determined based on the common TA and a terminal-specific TA used for compensating for link delay between the base station and the terminal, and wherein the terminal-specific TA is estimated by the terminal.

In accordance with another aspect of the disclosure, a terminal in a communication system is provided. The terminal includes a transceiver, and a processor connected to the transceiver and configured to receive, from a base station via the transceiver, a common timing advance (TA) controlled by the base station, estimate a terminal-specific TA used for compensating for link delay between the base station and the terminal, and determine a TA of the terminal based on the common TA and the terminal-specific TA.

In accordance with another aspect of the disclosure, a base station in a communication system is provided. The base station includes a transceiver, and a processor connected to the transceiver and configured to transmit, to a terminal via the transceiver, a common timing advance (TA) controlled by the base station, and receive, via the transceiver, an uplink signal from the terminal at time at which a TA of the terminal is applied, wherein the TA of the terminal is determined based on the common TA and a terminal-specific TA used for compensating for link delay between the base station and the terminal, and wherein the terminal-specific TA is estimated by the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
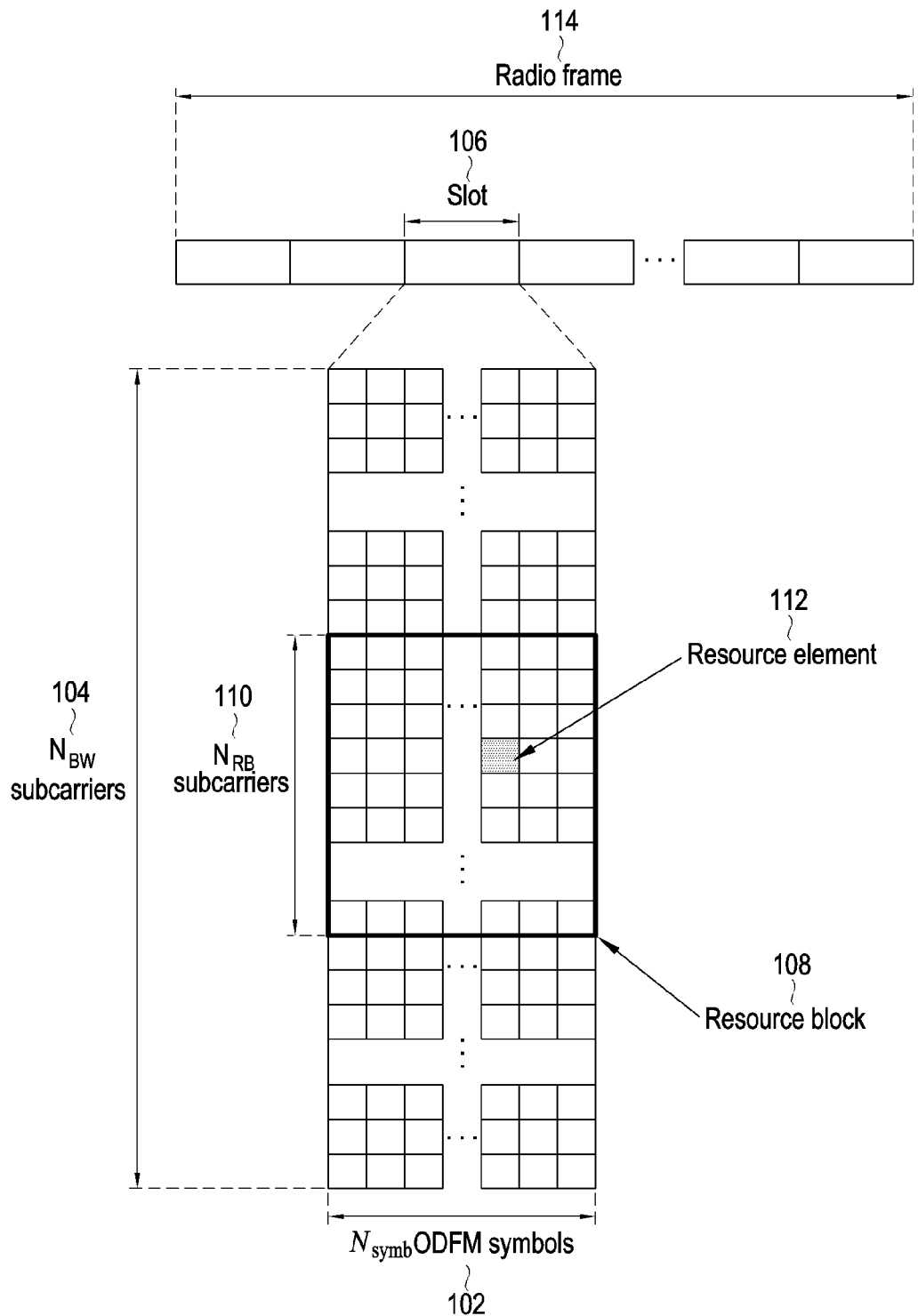
FIG. 1 is a diagram illustrating a basic structure of a time-frequency domain which is a radio resource region on which data or a control channel is transmitted in a downlink or an uplink in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New radio (NR) access technology or a new 5G communication technology, are designed to be able to freely multiplex various services in time and frequency resources and, accordingly, waveforms/numerology and reference signals may be allocated dynamically or freely as necessary in services. To provide an optimal service to a terminal in wireless communication, it is critical to provide data transmission optimized via measurement of interference and the quality of channel, and thus, accurate measurement of the channel state is essential. However, unlike 4G communication in which no significant change occurs in channel and interference characteristics depending on frequency resources, 5G channels experience drastic changes in channel and interference characteristics depending on services and thus need support of a subset in light of frequency resource group (FRG) that allows them to be divided and measured. Meanwhile, types of services supported in the NR system may be divided into categories, such as enhanced mobile broadband (eMBB), massive machine type communications (mMTC), and ultra-reliable and low-latency communications (URLLC). The eMBB, mMTC, and URLLC are services targeting high-rate transmission of high-volume data, minimized terminal power consumption and access by multiple terminals, and high reliability and low latency, respectively. Different requirements may be applied depending on types of services applied to the terminal.

As such, a plurality of services may be provided to users in the communication system and, to that end, there are required a method for providing the services in the same time interval according to characteristics and a device using the method.

Hereinafter, embodiments of the disclosure are described in detail with reference to the accompanying drawings.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), 3GPP2 high rate packet data (HRPD), ultra-mobile broadband (UMB), and institute of electrical and electronics engineers (IEEE) 802.16e communication standards. Further, for fifth generation (5G) wireless communication systems, 5G or new radio (NR) communication is being standardized.

As a representative broadband wireless communication system, the NR system adopts orthogonal frequency division multiplexing (OFDM) for downlink (DL) and uplink (UL). More specifically, the NR system employs cyclic-prefix OFDM (CP-OFDM) for downlink and two schemes, i.e., CP-OFDM and discrete Fourier transform spreading OFDM (DFT-S-OFDM) for uplink. Uplink means a wireless link where a terminal (e.g., a user equipment (UE) or a mobile station (MS)) transmits data or control signals to a base station (BS)(or an evolved Node B (eNode B)), and download means a wireless link where the base station transmits data or control signals to the terminal. Such multiple access scheme allocates and operates time-frequency resources carrying data or control information per user not to overlap, i.e., to maintain orthogonality, to thereby differentiate each user's data or control information. Hereinafter, it will be noted that the term "terminal" will be interchangeable with the term "UE" or "MS".

The NR system adopts hybrid automatic repeat request (HARQ) scheme that re-transmits corresponding data through the physical layer in case decoding fails at the initial stage of transmission. By the HARQ scheme, if the receiver fails to precisely decode data, the receiver transmits information (negative acknowledgement (NACK)) indicating the decoding failure to the transmitter so that the transmitter may re-transmit the corresponding data through the physical layer. The receiver raises the data reception capability by combining the data re-transmitted by the transmitter with the data for which decoding has failed before. Further, in case the receiver precisely decode data, the receiver may transmit information (acknowledgment (ACK)) indicating decoding succeeds to the transmitter so that the transmitter may transmit new data.

Figure 2:
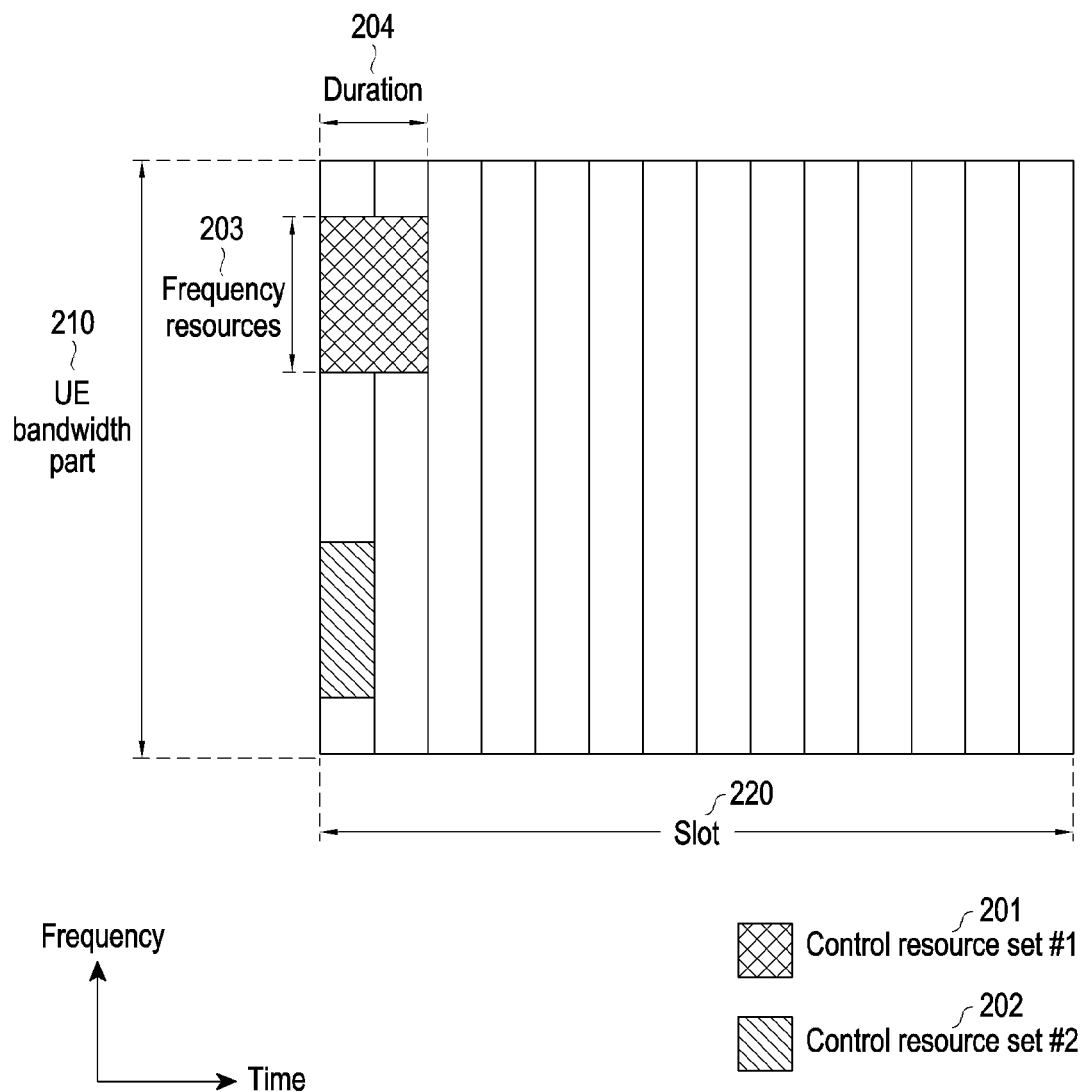
FIG. 2 is a diagram illustrating a control region on which a downlink control channel is transmitted in a 5G wireless communication system according to an embodiment of the disclosure.

FIG. 1 is a diagram illustrating a basic structure of a time-frequency domain which is a radio resource region on which data or a control channel is transmitted in a downlink or an uplink in an NR system according to an embodiment of the disclosure Referring to FIG. 1, the horizontal axis refers to the time domain, and the vertical axis refers to the frequency domain. The minimum transmission unit in the time domain is the OFDM symbol, and $N_{symb}$ (102) OFDM symbols together form one slot 106. The length of the subframe is defined as 1.0 ms, and the radio frame 114 is defined as 10 ms. In the frequency domain, the minimum transmission unit is subcarrier, and the bandwidth of the overall system transmission band consists of a total of NBW (104) subcarriers. One frame may be defined as 10 ms. One subframe may be defined as 1 ms, and thus, one frame may consist of a total of 10 subframes. One slot may be defined as 14 OFDM symbols (that is, the number $(N_{symb}^{slot})$ of symbols per slot=14). One subframe may be composed of one or more slots, and the number of the slots included in one subframe may vary according to μ which is a value set for subcarrier spacing. FIG. 2 illustrates an example in which the subcarrier spacing is set to μ=0 (204) and an example in which the subcarrier spacing is set to μ=1. When μ=0, one subframe may consist of one slot, and when μ=1, one subframe may consist of two slots. In other words, according to the set subcarrier spacing value μ, the number $(N_{slot}^{subframe\mu})$ of slots per subframe may vary, and accordingly, the number $(N_{slot}^{frame\mu})$ of slots per frame may differ. According to each subcarrier spacing μ, $N_{slot}^{subframe\mu}$ and $N_{slot}^{frame\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Before radio resource control (RRC) connected, the terminal may be configured with an initial bandwidth part (BWP) for initial access by the base station via a master information block (MIB). More specifically, the terminal may receive configuration information for a search space and control resource set (CORESET) in which physical downlink control channel (PDCCH) may be transmitted to receive system information (remaining system information (RMSI) or system information block 1 which may correspond to SIB1) necessary for initial access through the MIB in the initial access phase. Each of the control region and search space configured with the MIB may be regarded as identity (ID) 0. The base station may provide the terminal with configuration information, such as frequency allocation information, time allocation information, and numerology for control region #0, via the MIB. Further, the base station may provide the terminal with configuration information for occasion and monitoring period for control region #0, i.e., configuration information for search space #0, via the MIB. The terminal may regard the frequency range set as control region #0 obtained from the MIB, as the initial BWP for initial access. In this case, the identity (ID) of the initial BWP may be regarded as 0.

The MIB may include contain the following information.

<MIB>

```
-- ASN1START
-- TAG-MIB-START
MIB ::=                         SEQUENCE {
    systemFrameNumber                       BIT STRING (SIZE (6)),
    subCarrierSpacingCommon                 ENUMERATED {scs15or60, scs30or120},
    ssb-SubcarrierOffset            INTEGER (0..15),
    dmrs-TypeA-Position                     ENUMERATED {pos2, pos3},
    pdcch-ConfigSIB1                PDCCH-ConfigSIB1,
    cellBarred                  ENUMERATED {barred, notBarred},
    intraFreqReselection                ENUMERATED {allowed, notAllowed},
    spare                   BIT STRING (SIZE (1))
}
-- TAG-MIB-STOP
-- ASN1STOP
```

MIB field descriptions cellBarred
Value barred means that the cell is barred, as defined in TS 38.304 [20].
dmrs-TypeA-Position
Position of (first) DM-RS for downlink (see TS 38.211 [16], clause 7.4.1.1.2)
    and uplink (see TS 38.211 [16], clause 6.4.1.1.3).
intraFreqReselection -continued

| MIB field descriptions |
| --- |
| Controls cell selection/reselection to intra-frequency cells when the highest ranked cell is barred, or treated as barred by the UE, as specified in TS 38.304 [20]. |
| pdcch-ConfigSIB1 |
| Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13). |
| ssb-SubcarrierOffset |
| Corresponds to kSSB (see TS 38.213 [13]), which is the frequency domain offset between SSB and the overall resource block grid in number of subcarriers. (See TS 38.211 [16], clause 7.4.3.1). |
| The value range of this field may be extended by an additional most significant bit encoded within PBCH as specified in TS 38.213 [13]. |
| This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13). |
| subCarrierSpacingCommon |
| Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. |
| systemFrameNumber |
| The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17]. |

In a method for configuring a bandwidth part, terminals before RRC connected may receive configuration information for the initial BWP via MIB in the initial access phase. Specifically, the terminal may be configured with a control region for a downlink control channel where downlink control information (DCI) for scheduling SIB may be transmitted from the MIB of the physical broadcast channel (PBCH). In this case, the bandwidth of the configured by the MIB may be regarded as the initial BWP, and the terminal may receive the physical downlink shared channel (PDSCH), which transmits the SIB, via the configured initial BWP. The initial BWP may be utilized for other system information (OSI), paging, and random access as well as for receiving SIB.

If the terminal is configured with one or more BWPs, the base station may indicate, to the terminal, a change in BWP using the BWP indicator in the DCI.

The basic resource units in the time-frequency domains are the resource elements (REs) 112 (RE), and may be represented with the OFDM symbol index and the subcarrier index. The resource block (RB) 108 or physical resource block (PRB) is defined as Nsymb (102) contiguous OFDM symbols in the time domain. Generally, the minimum transmission unit of data is the RB. Generally in the NR system, Nsymb=14, NRB=12 (i.e., NRB 110), and, NBW is proportional to the bandwidth of system transmission band. Data rate may increase in proportion to the number of RBs scheduled for the terminal.

In the NR system, in the case of FDD system in which downlink and uplink are distinguished with frequencies, the downlink transmission bandwidth and the uplink transmission bandwidth may differ from each other. The channel bandwidth refers to an RF bandwidth corresponding to the system transmission bandwidth. Tables 2 and 3 show some system transmission bandwidths and the relationship between subcarrier spacing and channel bandwidth defined in NR system, for frequency bands lower than 6 GHz and frequency bands higher than 6 GHz, respectively. For example, in an NR system with a channel bandwidth of 100 MHz and a subcarrier spacing of 30 kHz, the transmission bandwidth is composed of 273 RBs. In the following, N/A may be a bandwidth-subcarrier combination not supported by the NR system.

TABLE 2

| | Configuration of frequency range 1 (FR1) | | | | | | | | | | | |
| --- | --- | --- | --- | --- | --- | --- | --- | --- | --- | --- | --- | --- |
| scs (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Configuration of frequency range 2 (FR2) | | | | | |
|---|---|---|---|---|---|
| Channel bandwidth BWChannel [MHz] | subcarrier spacing | 50 MHz | 100 MHz | 200 MHz | 400 MHz |
| Transmission bandwidth configuration NRB | 60 kHz 120 kHz | 66 32 | 132 66 | 264 132 | N/A 264 |

In the NR system, the frequency range may be defined separately for FR1 and FR2 as in Table 4 below.

TABLE 4

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be changed and applied. For example, the frequency range of FR1 may be changed from 450 MHz up to 6000 MHz.

Next, the synchronization signal (SS)/PBCH block in 5G is described.

The SS/PBCH block may mean a physical layer channel block composed of primary SS (PSS), secondary SS (SSS), and PBCH. Details are as follows.

PSS: A signal that serves as a reference for downlink time/frequency synchronization and provides part of the information for cell ID SSS: serves as a reference for downlink time/frequency synchronization, and provides the rest of the information for cell ID, which PSS does not provide. Additionally, it may serve as a reference signal for demodulation of PBCH.

PBCH: provides essential system information necessary for the terminal to transmit and receive data channel and control channel. The essential system information may include search space-related control information indicating radio resource mapping information for a control channel and scheduling control information for a separate data channel for transmitting system information.

SS/PBCH block and SS/PBCH block are composed of a combination of PSS, SSS, and PBCH. One or more SS/PBCH blocks may be transmitted within 5 ms, and each transmitted SS/PBCH block may be distinguished with an index.

The terminal may detect the PSS and SSS in the initial access phase and may decode the PBCH. The terminal may obtain the MIB from the PBCH and may be therefrom configured with control region #0 (which may correspond to a control region having a control region index of 0). The terminal may perform monitoring on control region #0, assuming that the selected SS/PBCH block and the demodulation reference signal (DMRS) transmitted in control region #0 are quasi-co-located (QCLed). The terminal may receive system information as downlink control information transmitted in control region #0. The terminal may obtain configuration information related to random access channel (RACH) required for initial access from the received system information. The terminal may transmit the physical RACH (PRACH) to the base station considering the selected SS/PBCH index, and the base station receiving the PRACH may obtain information for the SS/PBCH block index selected by the terminal. Through this process, the base station may know which block the terminal has selected from the SS/PBCH blocks and monitors control region #0 related thereto.

Next, downlink control information (DCI) in the 5G system is described in detail.

Scheduling information for uplink data (or physical uplink shared channel (PUSCH) or downlink data (or physical downlink data channel (PDSCH) in the 5G system is transmitted from the base station through DCI to the terminal. The terminal may monitor the DCI format for fallback and the DCI format for non-fallback for PUSCH or PDSCH. The fallback DCI format may be composed of fixed fields predetermined between the base station and the terminal, and the non-fallback DCI format may include configurable fields. The DCI may include other various formats and, it may be known whether the DCI is one for power control or one for slot format indicator (SFI) depending on the format.

DCI may be transmitted through the PDCCH, which is a physical downlink control channel, via channel coding and modulation. A cyclic redundancy check (CRC) is added to the DCI message payload, and the CRC is scrambled with the radio network temporary identifier (RNTI) that is the identity of the terminal. Different RNTIs may be used for the purposes of the DCI message, e.g., terminal-specific (e.g., UE-specific) data transmission, power control command, or random access response. In other words, the RNTI is not explicitly transmitted, but the RNTI is included in the CRC calculation process and transmitted. Upon receiving the DCI message transmitted on the PDCCH, the terminal identifies the CRC using the allocated RNTI, and when the CRC is correct, the terminal may be aware that the message has been transmitted to the terminal. The PDCCH is mapped and transmitted in a control resource set (CORESET) configured in the terminal.

For example, DCI scheduling a PDSCH for system information (SI) may be scrambled to SI-RNTI. DCI scheduling a PDSCH for a random access response (RAR) message may be scrambled to RA-RNTI. DCI scheduling a PDSCH for a paging message may be scrambled with P-RNTI. DCI providing a slot format indicator (SFI) may be scrambled to SFI-RNTI. DCI providing transmit power control (TPC) may be scrambled to TPC-RNTI. DCI for scheduling a terminal specific (e.g., UE-specific) PDSCH or PUSCH may be scrambled with cell RNTI (C-RNTI).

DCI format 0_0 may be used as fallback DCI for scheduling PUSCH, and in this case, CRC may be scrambled to C-RNTI. DCI format 0_0 in which CRC is scrambled to C-RNTI may include, e.g., the following information.

TABLE 5

Identifier for DCI formats - [1] bit
Frequency domain resource assignment -[$\lceil \log_2(N_{RB}^{UL,BWP}(N_{RB}^{UL,BWP}+1)/2) \rceil$] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/ supplementary UL (SUL) indicator - 0 or 1 bit DCI format 0_1 may be used as non-fallback DCI for scheduling PUSCH, and in this case, CRC may be scrambled to C-RNTI. DCI format 0_1 in which CRC is scrambled to C-RNTI may include, e.g., the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment - 1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits $$SRS \text{ resource indicator} - \left\lceil \log_2\left(\sum_{k=1}^{L_{max}} \binom{N_{SRS}}{k}\right) \right\rceil \text{ or } \lceil \log_2(N_{SRS}) \rceil \text{ bits}$$

$\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
code block group (CBG) transmission information - 0, 2, 4, 6, or 8 bits
Physical tracking reference signal (PTRS)-demodulation reference signal (DMRS) association - 0 or 2 bits.
beta_offset indicator - 0 or 2 bits
DMRS sequence initialization - 0 or 1 bit DCI format 1_0 may be used as fallback DCI for scheduling PDSCH, and in this case, CRC may be scrambled to C-RNTI. DCI format 1_0 in which CRC is scrambled to C-RNTI may include, e.g., the following information.

TABLE 7

Identifier for DCI formats - [1] bit
Frequency domain resource assignment -$[\lceil \log_2(N_{RB}^{DL,BWP}(N_{RB}^{DL,BWP}+1)/2) \rceil]$ bits
Time domain resource assignment - X bits
VRB-to-PRB mapping - 1 bit.
Modulation and coding scheme - 5 bits
New data indicator - 1 bit TABLE 7-continued Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used as non-fallback DCI for scheduling PDSCH, and in this case, CRC may be scrambled to C-RNTI. DCI format 1_1 in which CRC is scrambled to C-RNTI may include, e.g., the following information.

TABLE 8

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP}(N_{RB}^{DL,BWP}+1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.

TABLE 8-continued

```
    PRB bundling size indicator - 0 or 1 bit
    Rate matching indicator - 0, 1, or 2 bits
    Zero power channel state information reference signal (ZP CSI-RS) trigger - 0, 1,
or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
    HARQ process number - 4 bits
    Downlink assignment index - 0 or 2 or 4 bits
    TPC command for scheduled PUCCH - 2 bits
    PUCCH resource indicator - 3 bits
    PDSCH-to-HARQ_feedback timing indicator - 3 bits
    Antenna ports - 4, 5 or 6 bits
    Transmission configuration indication - 0 or 3 bits
    SRS request - 2 bits
    Code block group (CBG) transmission information - 0, 2, 4, 6, or 8 bits
    CBG flushing out information - 0 or 1 bit
    DMRS sequence initialization - 1 bit
```

Hereinafter, a method for allocating time domain resources for a data channel in a 5G communication system is described.

The base station may configure the terminal with a table for time domain resource allocation information for a downlink data channel (PDSCH) and an uplink data channel (PUSCH) via higher layer signaling (e.g., RRC signaling). For PDSCH, a table including up to maxNrofDL-Allocations=16 entries may be configured and, for PUSCH, a table including up to maxNrofUL-Allocations=16 entries may be configured. The time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Tables 9 and 10 below may be provided from the base station to the terminal.

TABLE 9

```
PDSCH-TimeDomainResourceAllocationList information element
PDSCH-TimeDomainResourceAllocationList    ::=           SEQUENCE
(SIZE(1..maxNrofDL-Allocations)) OF PDSCH-TimeDomainResourceAllocation
PDSCH-TimeDomainResourceAllocation ::=              SEQUENCE {
    k0                                      INTEGER(0..32)    OPTIONAL,
-- Need S
    (PDCCH-to-PDSCH timing, slot unit)
        mappingType                         ENUMERATED {typeA, typeB},
    (PDSCH mapping type)
        startSymbolAndLength                INTEGER (0..127)
        (Start symbol and length of PDSCH)
}
```

TABLE 10

```
PUSCH-TimeDomainResourceAllocation information element
PUSCH-TimeDomainResourceAllocationList ::=              SEQUENCE
(SIZE(1..maxNrofUL-Allocations)) OF PUSCH-TimeDomainResourceAllocation
PUSCH-TimeDomainResourceAllocation ::=              SEQUENCE {
    k2                                      INTEGER(0..32)   OPTIONAL,   -- Need S
    (PDCCH-to-PUSCH timing, slot unit)
    mappingType                             ENUMERATED {typeA, typeB},
    (PUSCH mapping type)
    startSymbolAndLength                    INTEGER (0..127)
    (Start symbol and length of PUSCH)
}
```

The base station may provide the terminal with one of the entries in the table for the time domain resource allocation information via L1 signaling (e.g., DCI) (e.g., it may be indicated with the 'time domain resource allocation' field in the DCI). The terminal may obtain time domain resource allocation information for the PDSCH or PUSCH based on the DCI received from the base station.

A downlink control channel in the 5G communication system is described below in greater detail with reference to the drawings.

Figure 5:
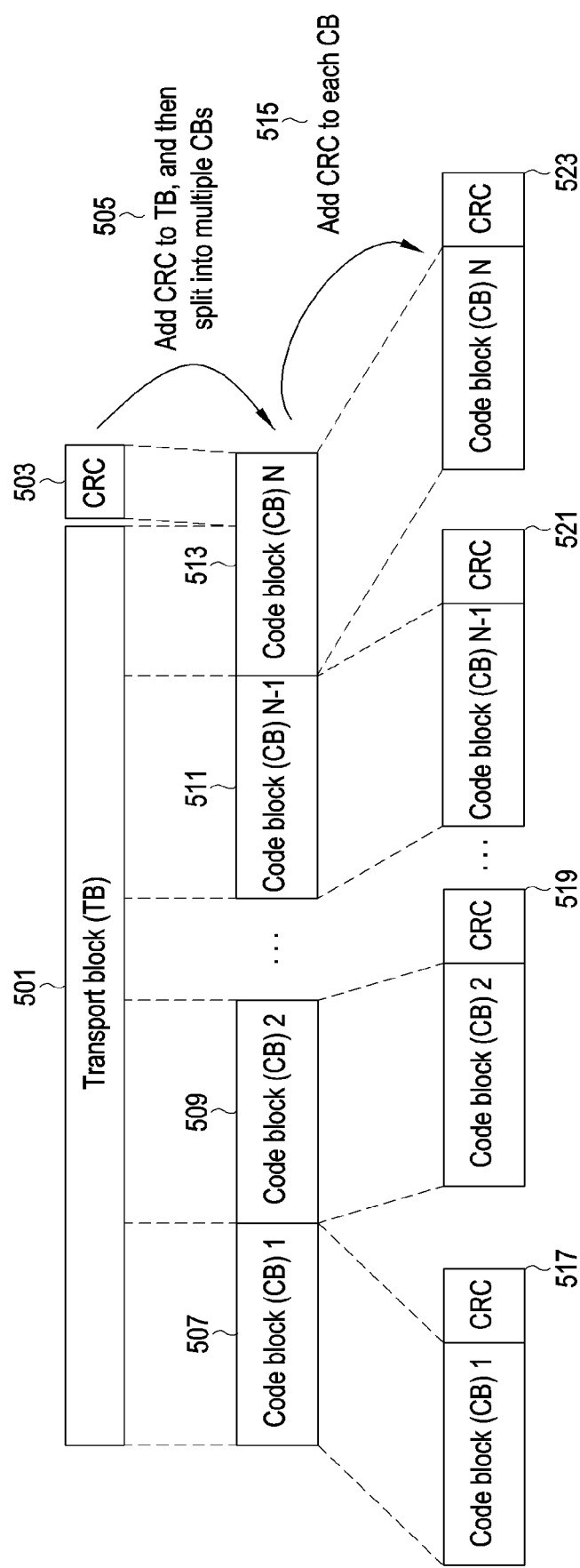
FIG. 5 is a diagram illustrating an example of a process in which one transport block is divided into several code blocks and a cyclic redundancy check (CRC) is added according to an embodiment of the disclosure.

FIG. 2 is a diagram illustrating a control region on which a downlink control channel is transmitted in a 5G wireless communication system according to an embodiment of the disclosure. Referring to FIG. 2, it illustrates an example in which two control regions (control region #1 201 and control region #2 202) are configured in one slot 220 on the time axis, and a terminal bandwidth part 210 is configured on the frequency axis. The control regions 201 and 202 may be configured to a particular frequency resource 203 in the terminal bandwidth part 210 on the frequency axis. One or more OFDM symbols may be configured on the time axis, which may be defined as control resource set duration 204. In the example of FIG. 5, control region #1 201 is configured as a control region length of two symbols, and control region #2 202 is configured as a control region length of one symbol.

The above-described 5G control region may be configured via higher layer signaling (e.g., system information, MIB, or RRC signaling) from the base station to the terminal. Configuring a terminal with a control region means providing the terminal with such information as the identifier (ID) of the control region, the frequency position of the control region, and symbol length of the control region. For example, the higher layer signaling may include the information set forth in Table 11 below.

In Table 11, tci-StatesPDCCH (simply referred to as transmission configuration indication (TCI) state) configuration information may include information for one or more SS/PBCH block indexes QCLed with the DMRS transmitted in a corresponding control region or channel state information reference signal (CSI-RS) index information.

For example, each piece of control information included in DCI format 1_1 that is scheduling control information (DL grant) for downlink data may be as follows.

Carrier indicator: indicates which carrier the data scheduled by DCI is transmitted on—0 or 3 bits Identifier for DCI formats: indicates the DCI format. Specifically, an indicator for identifying whether the corresponding DCI is for downlink or uplink.—[1] bits Bandwidth part indicator: indicates a change in bandwidth part, if any.—0, 1 or 2 bits Frequency domain resource assignment: Resource allocation information indicating frequency domain resource allocation. The resource expressed varies depending on whether the resource allocation type is 0 or 1.

Time domain resource assignment: Resource allocation information indicating time domain resource allocation. This may indicate one configuration of a predefined PDSCH time domain resource allocation list or higher layer signaling—1, 2, 3, or 4 bits VRB-to-PRB mapping: indicates a mapping relationship between the virtual resource block (VRB) and the physical resource block (PRB)—0 or 1 bit PRB bundling size indicator: indicates the size of physical resource block bundling assuming that the same precoding is applied—0 or 1 bit Rate matching indicator: indicates which rate match group is applied among the rate match groups configured via a higher layer applied to PDSCH—0, 1, or 2 bits ZP CSI-RS trigger: triggers the zero power channel state information reference signal—0, 1, or 2 bits

TABLE 11

```
ControlResourceSet ::=            SEQUENCE {
    -- Corresponds to L1 parameter 'CORESET-ID'
    controlResourceSetId          ControlResourceSetId,
    (Control region identity)
    frequencyDomainResources      BIT STRING (SIZE (45)),
    (Frequency-axis resource allocation information)
    duration                      INTEGER (1..maxCoReSetDuration),
    (Time-axis resource allocation information)
    cce-REG-MappingType           CHOICE {
    (CCE-to-REG mapping scheme)
        interleaved               SEQUENCE {
            reg-BundleSize        ENUMERATED {n2, n3, n6},
            (REG bundle size)
            precoderGranularity   ENUMERATED {sameAsREG-
bundle, allContiguousRBs},
            interleaverSize       ENUMERATED {n2, n3, n6}
            (Interleaver size)
            shiftindex
        INTEGER(0..maxNrofPhysicalResourceBlocks-1)
        OPTIONAL
            (Interleaver shift)
        },
        nonInterleaved            NULL
    },
    tci-StatesPDCCH               SEQUENCE(SIZE  (1..maxNrofTCI-
StatesPDCCH)) OF TCI-StateId     OPTIONAL,
    (QCL configuration information)
    tci-PresentInDCI              ENUMERATED {enabled}
             OPTIONAL,    -- Need S
}
```

Transport block (TB)-related configuration information: indicates modulation and coding scheme (MCS), new data indicator (NDI) and redundancy version (RV) for one or two TBs.

Modulation and coding scheme (MCS): indicate the coding rate and modulation scheme used for data transmission. In other words, this may indicate the coding rate value that may indicate TBS and channel coding information along with information for whether it is QPSK, 16QAM, 64QAM, or 256QAM.

New data indicator: indicates whether HARQ initial transmission or re-transmission.

Redundancy version: indicates the redundancy version of HARQ.

HARQ process number: indicates HARQ process number applied to PDSCH—4 bits

Downlink assignment index: An index for generating a dynamic HARQ-ACK codebook when reporting HARQ-ACK for PDSCH—0 or 2 or 4 bits TPC command for scheduled PUCCH: Power control information applied to PUCCH for HARQ-ACK report for PDSCH—2 bits PUCCH resource indicator: Information indicating the resource of PUCCH for HARQ-ACK report for PDSCH—3 bits PDSCH-to-HARQ_feedback timing indicator: Configuration information for the slot in which PUCCH for HARQ-ACK report for PDSCH is transmitted—3 bits Antenna ports: Information indicating the antenna port of the PDSCH DMRS and the DMRS CDM group in which the PDSCH is not transmitted—4, 5 or 6 bits Transmission configuration indication: Information indicating beam-related information for PDSCH—0 or 3 bits SRS request: Information requesting SRS transmission—2 bits CBG transmission information: Information indicating which code block group (CBG) of data is transmitted through PDSCH when code block group-based retransmission is configured—0, 2, 4, 6, or 8 bits CBG flushing out information: Information indicating whether the code block group previously received by the terminal may be used for HARQ combining—0 or 1 bit DMRS sequence initialization: indicates DMRS sequence initialization parameter—1 bit In the case of data transmission through PDSCH or PUSCH, time domain resource assignment may be transferred by information for a slot in which PDSCH/PUSCH is transmitted and the number L of symbols in which PDSCH/PUSCH is mapped with the start symbol position S in the slot. Here, S may be a relative position from the start of the slot, L may be the number of contiguous symbols, and S and L may be determined from a start and length indicator value (SLIV) defined as in Equation 1 below.

if $(L-1) \leq 7$ then $SLIV = 14 \cdot (L-1) + S$ else $SLIV = 14 \cdot (14-L+1) + (14-1-S)$ where $0 < L \leq 14-S$  Equation 1

In the NR system, the terminal may be configured with information for the slot in which PDSCH/PUSCH is transmitted and PDSCH/PUSCH mapping type and SLIV value in one row via RRC configuration (e.g., the information may be configured in the form of a table). Thereafter, in the time domain resource allocation of the DCI, the base station may transfer, to the terminal, the SLIV value, PDSCH/PUSCH mapping type, and information for the slot in which PDSCH/PUSCH is transmitted by indicating the index value in the configured table.

In the NR system, type A and type B are defined as PDSCH mapping types. In PDSCH mapping type A, the first symbol among DMRS symbols is located in the second or third OFDM symbol of the slot. In PDSCH mapping type B, the first symbol among DMRS symbols of the first OFDM symbol in the time domain resource allocated by PUSCH transmission is located.

Downlink data may be transmitted on PDSCH, which is a physical channel for downlink data transmission. PDSCH may be transmitted after the control channel transmission period, and the specific mapping position in the frequency domain, modulation scheme, or other scheduling information are determined based on the DCI transmitted through the PDCCH.

Through the MCS among the control information constituting the DCI, the base station notifies the terminal of the modulation scheme that has applied to the PDSCH to be transmitted and the size of data to be transmitted (transport block size; TBS). In an embodiment, the MCS may be composed of 5 bits or more or fewer bits. The TBS corresponds to the size before applying channel coding for error correction to the data (transport block; TB) to be transmitted by the base station.

In the disclosure, a transport block (TB) may include a medium access control (MAC) header, a MAC control element, one or more MAC service data units (SDUs), and padding bits. Alternatively, TB may denote a unit of data delivered from the MAC layer to the physical layer or a MAC protocol data unit (PDU).

The NR system supports the following modulation schemes: quadrature phase shift keying (QPSK), 16 quadrature amplitude modulation (16QAM), 64QAM, and 256 QAM, and their respective modulation orders (Qm) are 2, 4, 6, and 8. In other words, QPSK, 16QAM, 64QAM, and 256QAM may transmit 2 bits per symbol, 4 bits per symbol, 6 bits per symbol, and 8 bits per symbol, respectively.

Figure 3:
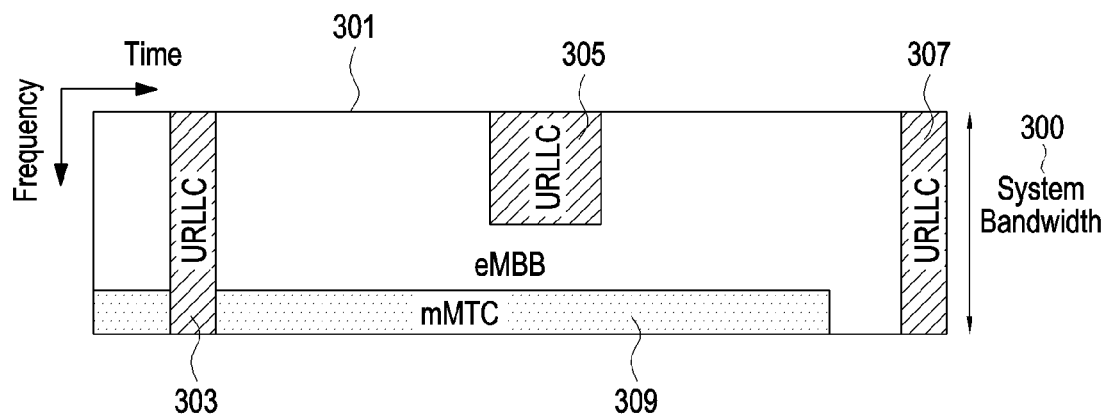
FIG. 3 is a diagram illustrating an example in which enhanced mobile broadband (eMBB), ultra-reliable and low-latency communications (URLLC), and massive machine type communications (mMTC) data are allocated in an entire system frequency band according to an embodiment of the disclosure.
Figure 4:
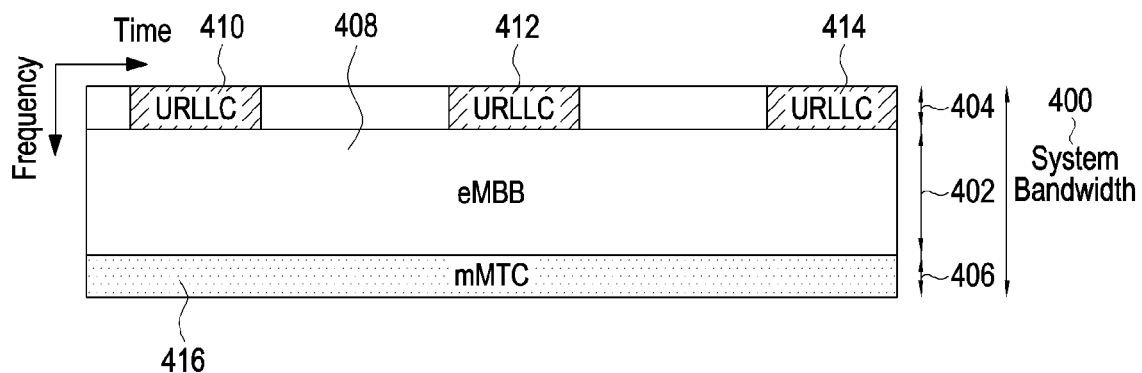
FIG. 4 is a diagram illustrating an example in which an eMBB, a URLLC, and an mMTC data are allocated, with a system frequency band divided according to an embodiment of the disclosure.

FIGS. 3 and 4 are diagrams illustrating an example in which data of eMBB, URLLC, and mMTC data, which are services considered in 5G or NR systems, are allocated in frequency-time resources.

Referring to FIGS. 3 and 4, it may be identified how frequency and time resources are allocated for information transmission in each system.

FIG. 3 is a diagram illustrating an example in which eMBB, URLLC, and mMTC data are allocated in an entire system frequency band according to an embodiment of the disclosure.

Referring to FIG. 3, it illustrates an example in which data for eMBB, URLLC, and mMTC are allocated in the entire system frequency band 300. If URLLC data 303, 305, and 307 needs to be generated and transmitted while eMBB 301 and mMTC 309 are allocated in a specific frequency band and transmitted, URLLC data 303, 305, and 307 may be transmitted with the portions, in which eMBB 301 and mMTC 309 have already been allocated, emptied or not transmitted. Among the above services, URLLC requires a decrease in latency time. Thus, URLLC data may be allocated (303, 305, and 307) in the portion of the resource (e.g., eMBB 301), in which eMBB has been allocated. If URLLC is additionally allocated and transmitted in the eMBB-allocated resource, eMBB data may not be transmitted in the duplicate frequency-time resource, so that the transmission performance of eMBB data may be lowered. In other words, a failure to transmit eMBB data may occur due to the allocation of the URLLC.

FIG. 4 is a diagram illustrating an example in which eMBB, URLLC, and mMTC data are allocated, with the system frequency band divided according to an embodiment of the disclosure.

Referring to FIG. 4, the entire system frequency band 400 may be divided into subbands 402, 404, and 406 which may be used for transmitting data and services. The information related to configuration of the subbands may be predetermined, and the information may be transmitted from the base station to the terminal through higher level signaling. Alternatively, the system frequency band may be divided into the subbands by the base station or a network node in an arbitrary manner, so that services may be provided without transmitting separate subband configuration information to the terminal. FIG. 4 illustrates an example in which subbands 402, 404, and 406 are used for transmission of eMBB data 408, URLLC data 410, 412 and 414, and mMTC data 416, respectively.

To describe the methods and devices proposed in the embodiment, the terms "physical channel" and "signal" in the NR system may be used. However, the content of the disclosure may be applied to other wireless communication systems than the NR system.

Hereinafter, embodiments of the disclosure are described in detail with reference to the accompanying drawings. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

According to the disclosure, downlink (DL) refers to a wireless transmission path of signal transmitted from the base station to the terminal, and uplink (UL) refers to a wireless transmission path of signal transmitted from the terminal to the base station.

Although NR system is described in connection with embodiments of the disclosure, as an example, embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

In the disclosure, the terms "physical channel" and "signal" may be used interchangeably with "data" or "control signal." For example, PDSCH is a physical channel through which data is transmitted, but in the disclosure, PDSCH may be data.

As used herein, the term "higher layer signaling" may refer to a method for transmitting signals from the base station to the terminal using a downlink data channel of the physical layer or from the terminal to the base station using an uplink data channel of the physical layer and may be interchangeably used with "RRC signaling" or MAC control element (CE)."

FIG. 5 is a diagram illustrating an example process in which one transport block is divided into several code blocks and a CRC is added according to an embodiment of the disclosure.

Referring to FIG. 5, a CRC 503 may be added to the head or tail of one transport block (TB) 501 which is to be transmitted on uplink or downlink. The CRC 503 may have a fixed number of bits, e.g., 16 bits or 25 bits, or a variable number of bits depending on, e.g., channel context, and be used to determine whether channel coding succeeds. The CRC (503)-added TB 501 may be divided into several code blocks (CBs) 507, 509, 511, and 513 in operation 505. The maximum sizes of the code blocks may be previously determined and, in this case, the last code block 513 may be smaller than the other code blocks 507, 509, and 511. However, this is only an example, and according to another example, 0, a random value, or 1 may be inserted into the last code block 513, so that the last code block 513 and the other code blocks 507, 509 and 511 have the same length.

CRCs 517, 519, 521, and 523 may be added to the code blocks 507, 509, 511, and 513, respectively (515). The CRC may have a fixed number of bits, e.g., 16 bits or 24 bits, and be used to determine whether channel coding succeeds.

The TB 501 and a cyclic generator polynomial may be used to generate the CRC 503, and the cyclic generator polynomial may be defined in various ways. For example, assuming that a cyclic generator polynomial for a 24-bit CRC meets: gCRC24A(D)=D24+D23+D18+D17+D14+D11+D10+D7+D6+D5+D4+D3+D+1, and L=24, for TB data $a_0, a_1, a_2, a_3, \ldots, a_{A-1}$, CRC $p_0, p_1, p_2, p_3, \ldots, p_{L-1}$ may be determined as the value whose remainder is 0 when $a_0 D^{A+23}+a_1 D^{A+22}+ \ldots +a_{A-1}D^{24}+p_0 D^{23}+p_1 D^{22}+ \ldots +p_{22}D^1+p_{23}$ is divided by gCRC24A(D). In the above-described example, it is assumed that the CRC length L is 24 as an example, but the CRC length L may be determined to have a different value, e.g., 12, 16, 24, 32, 40, 48, or 64.

After the CRC is added to the TB through this process, the TB+CRC may be divided into N CBs 507, 509, 511, and 513. CRCs 517, 519, 521, and 523 may be added to the CBs 507, 509, 511, and 513, respectively (515). The CRCs added to the CBs may have different lengths than the CRC added to the TB, or a different cyclic generator polynomial may be used to generate the CRC. The CRC 503 added to the TB and the CRCs 517, 519, 521, and 523 added to the codeblocks may be omitted depending on the type of channel code to be applied to the codeblocks. For example, if an LDPC code, not turbo code, is applied to the codeblocks, the CRCs 517, 519, 521, and 523 to be added to the codeblocks may be omitted.

However, even when the LDPC is applied, the CRCs 517, 519, 521, and 523 may be added to the codeblocks. Further, when a polar code is used, the CRCs may also be added or omitted.

As described above in connection with FIG. 5, the maximum length of one codeblock is determined depending on the type of channel coding applied to the TB to be transmitted, and depending on the maximum length of the codeblock, the TB and the CRC added to the TB may be divided into codeblocks.

In legacy LTE systems, CB CRCs are added to the divided CBs, and the data bits of the CBs and the CRCs are encoded with channel code, so that coded bits are determined, and the number of bits to be rate-matched is determined as previously agreed on coded bits.

In NR systems, the TB size (TBS) may be calculated by the following steps.

Step 1: $N_{RE}'$ which is the number of REs allocated for PDSCH mapping in one PRB in the allocated resource is calculated.

$N_{RE}'$ may be calculated as $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by the overhead in one PRB configured by higher signaling, and may be set to one of 0, 6, 12, and 18 Thereafter, the total number $N_{RE}$ of REs allocated to the PDSCH may be calculated. $N_{RE}$ is calculated as min(156, $N_{RE}'$)·$n_{PRB}$, and $n_{PRB}$ denotes the number of PRBs allocated to the terminal.

Step 2: $N_{info}$, which is the number of bits of temporary information, may be calculated as $N_{RE}*R*Q_m*v$. Here, R is the code rate, Qm is the modulation order, and information for this value may be transmitted using the MCS bit field of DCI and a pre-arranged table. v is the number of allocated layers. If $N_{info} \le 3824$, the TBS may be calculated through step 3 below. Otherwise, the TBS may be calculated through step 4.

Step 3: By $$N_{info}' = \max\left(24, 2^n * \left\lfloor \frac{N_{info}}{2^n} \right\rfloor\right)$$

and n=max(3, $\lfloor \log_2 (N_{info}) \rfloor - 6$, $N_{info}'$ may be calculated. The TBS may be determined to be a value closest to $N_{info}'$ among values not smaller than $N_{info}'$ in Table 12 below.

TABLE 12

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 132 |
| 37 | 456 |
| 38 | 480 |
| 39 | 501 |
| 40 | 528 |
| 41 | 552 |
| 42 | 576 |
| 43 | 608 |
| 44 | 640 |

TABLE 12-continued

| Index | TBS |
| --- | --- |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: By $$N_{info}' = \max\left(3840, 2^n \times \text{round}\left(\frac{N_{info} - 24}{2^n}\right)\right)$$

and n=$\lfloor \log_2 (N_{info}-24) \rfloor -5$, $N_{info}'$ may be calculated. The TBS may be determined by $N_{info}'$ and [pseudo-code 1] below. In the following, C corresponds to the number of code blocks included in one TB.

Start of Pseudo-code 1
 if R ≤ 1/4

$$TBS = 8 * C * \left\lceil \frac{N_{info}' + 24}{8 * C} \right\rceil - 24, \text{ where } C = \left\lceil \frac{N_{info}' + 24}{3816} \right\rceil$$

else
  if $N_{info}' > 8424$

-continued $$TBS = 8*C*\left\lceil\frac{N'_{info}+24}{8*C}\right\rceil - 24, \text{ where } C = \left\lceil\frac{N'_{info}+24}{8424}\right\rceil$$

else $$TBS = 8*\left\lceil\frac{N'_{info}+24}{8}\right\rceil - 24$$

end if
end if
End of Pseudo-code 1

When one CB is input to the LDPC encoder in the NR system, it may be output, with parity bits added. In this case, the amount of parity bits may vary depending on an LDCP base graph. A method for sending all of the parity bits generated by LDPC coding for a specific input may be referred to as full buffer rate matching (FBRM), and a method for limiting the number of transmittable parity bits may be referred to as limited buffer rate matching (LBRM). When a resource is allocated for data transmission, the output of the LDPC encoder is created as a circular buffer, and the bits of the created buffer are repeatedly transmitted as much as the allocated resource. In this case, the length of the circular buffer may be designated $N_{cb}$.

When the number of all of the parity bits generated by LDPC coding is N, in the FBRM method, $N_{cb}$=N. In the LBRM method, $N_{cb}$ is min (N, $N_{ref}$), $N_{ref}$ is given as $$\left\lfloor\frac{TBS_{LBRM}}{C \cdot R_{LBRM}}\right\rfloor,$$

and $R_{LBRM}$ may be determined as 2/3. To obtain $TBS_{LBRM}$, the above-described method for obtaining TBS is used, assuming the maximum number of layers and maximum modulation order supported by the terminal in the cell. The maximum modulation order Qm is assumed to be 8, if an MCS table supporting 256QAM is used for at least one BWP in the cell, or otherwise, 6 (64QAM). The code rate is assumed to be the maximum code rate, i.e., 948/1024. $N_{RE}$ is assumed to be 156·$n_{PRB}$, and $n_{PRB}$ is assumed to be $n_{PRB, LBRM}$. $n_{PRB, LBRM}$ may be given in Table 13 below.

TABLE 13

| Maximum number of PRBs across all configured DL BWPs and UL BWPs of a carrirer for DL-SCH and UL-SCH, respectively | $N_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by the terminal in the NR system may be determined through Equation 2 below.

$$\text{data rate (in Mbps)} = 10^{-6} \cdot \sum_{j=1}^{J}\left(v^{(j)}_{Layers} \cdot Q^{(j)}_m \cdot f^{(j)} \cdot R_{max} \cdot \frac{N^{BW(j),\mu}_{PRB} \cdot 12}{T^{\mu}_s} \cdot (1 - OH^{(j)})\right) \quad \text{Equation 2}$$

In Equation 2, J is the number of carriers bundled by carrier aggregation, $R_{max}$=948/1024, $v^{(j)}_{Layers}$ is the maximum number of layers, is the maximum modulation order, $f^{(j)}$ is the scaling index, and μ is the subcarrier spacing. As $f^{(j)}$, one of 1, 0.8, 0.75, and 0.4 may be reported by the terminal and μ may be given in Table 14 below.

TABLE 14

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^\mu$ is the average OFDM symbol length, $T_s^\mu$ may be calculated as $$\frac{10^{-3}}{14 \cdot 2^\mu},$$

and $N_{PR}^{BW(j),\mu}$ is the maximum number of RBs in BW(j). $OH^{(j)}$ as an overhead value, may be given as 0.14 for downlink and 0.18 for uplink in FR1 (band below 6 GHz), and as 0.08 for downlink and 0.10 for uplink in FR2 (band above 6 GHz). Through Equation 2, the maximum data rate in downlink in a cell having a 100 MHz frequency bandwidth at a 30 kHz subcarrier spacing may be calculated as Table 15 below.

TABLE 15

| $f^{(j)}$ | $v_{layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate that the terminal may measure in actual data transmission may be a value obtained by dividing the amount of data by the data transmission time. This may be a value obtained by dividing TBS by the TTI length for 1 TB transmission or dividing the sum of TBSs by the TTI length for 2 TB transmission. As an example, as assumed to obtain Table 15, the maximum actual data rate in downlink in the cell having the 100 MHz frequency band in the 30 kHz subcarrier spacing may be determined as shown in Table 16 according to the number of PDSCH symbols allocated.

TABLE 16

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,781 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30570 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.28 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified via Table 7, and the actual data rate following the allocated TBS may be identified via Table 8. In some cases, the actual data rate may be larger than the maximum data rate depending on scheduling information.

In wireless communication systems, in particular new radio (NR) systems, a data rate supportable by the terminal may be agreed on between the base station and the terminal. This may be calculated using, e.g., the maximum frequency band, maximum modulation order, and maximum number of layers supported by the terminal. However, the calculated data rate may be different from a value calculated from the size of the transport block (TB) (transport block size (TBS) and transmission time interval (TTI) used for actual data transmission.

Thus, the terminal may be assigned a larger TBS than the value corresponding to the data rate supported by the terminal and, to prevent this, a limit may be imposed on the TBS schedulable depending on the data rate supported by the terminal.

Figure 6:
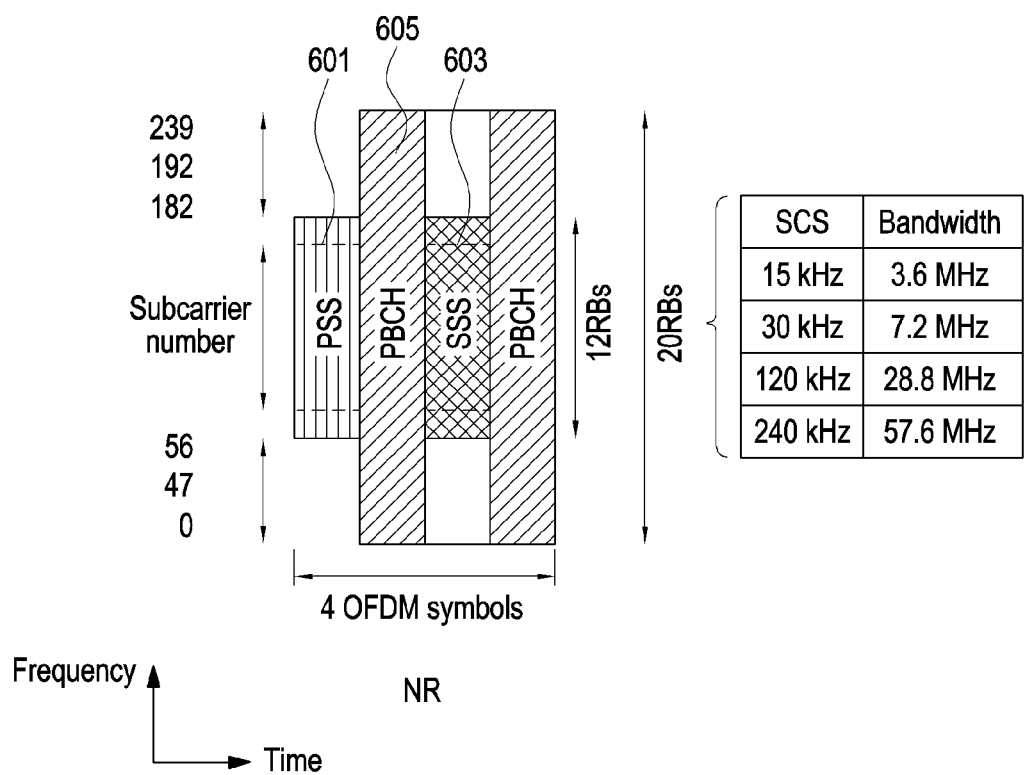
FIG. 6 is a diagram illustrating a state in which a synchronization signal (SS) and a physical broadcast channel (PBCH) of an NR system are mapped in a frequency and time domain according to an embodiment of the disclosure.

FIG. 6 is a diagram illustrating an example in which a synchronization signal (SS) and a physical broadcast channel (PBCH) of an NR system are mapped in a frequency and time domain according to an embodiment of the disclosure.

Referring to FIG. 6, a primary synchronization signal (PSS) 601, a secondary synchronization signal (SSS) 603, and a PBCH 605 are mapped over 4 OFDM symbols, and the PSS and SSS are mapped to 12 RBs, and the PBCH is mapped to 20 RBs. How the frequency band of 20 RBs changes according to subcarrier spacing (SCS) is illustrated in FIG. 6. The resource region in which the PSS, SSS, and PBCH are transmitted may be referred to as an SS/PBCH block. The SS/PBCH block may be referred to as an SSB block.

Figure 7:
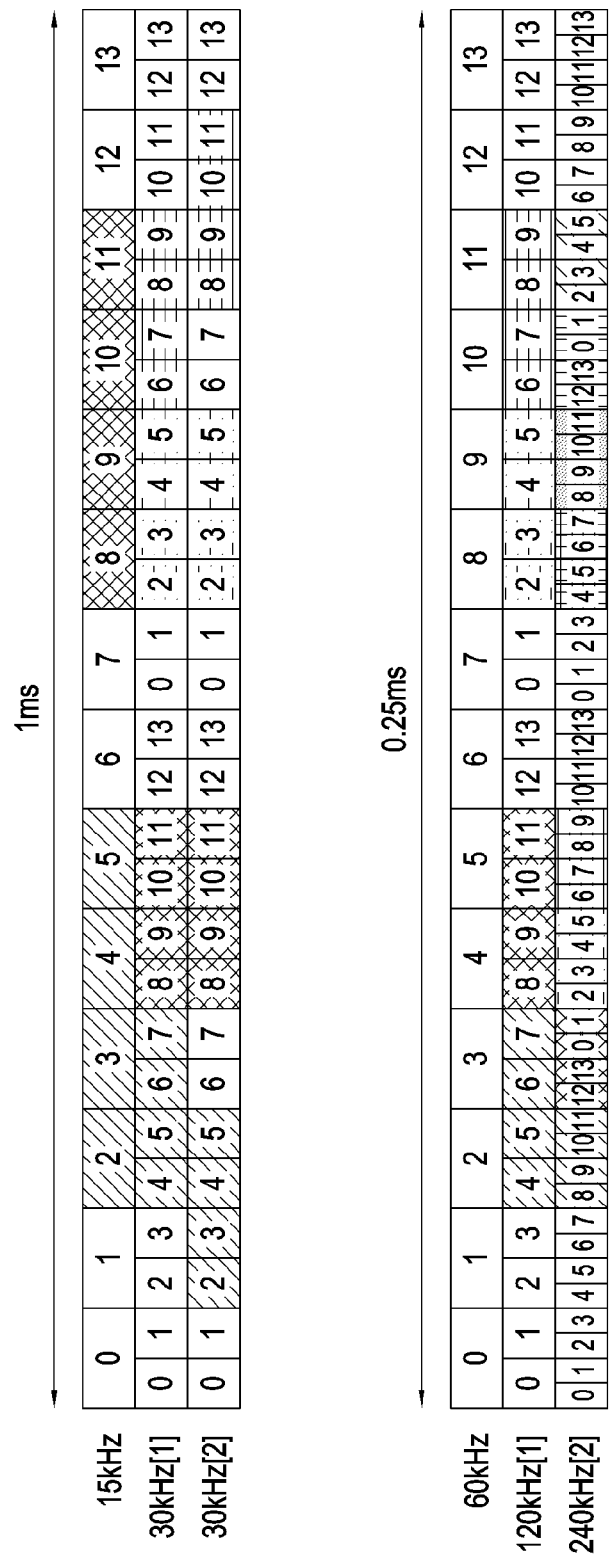
FIG. 7 is a diagram illustrating a symbol in which a synchronization signal/physical broadcast channel (SS/PBCH) block may be transmitted according to subcarrier spacing according to an embodiment of the disclosure.

FIG. 7 is a diagram illustrating a symbol in which an SS/PBCH block may be transmitted according to a subcarrier spacing according to an embodiment of the disclosure.

Referring to FIG. 7, the subcarrier spacing may be set to 15 kHz, 30 kHz, 120 kHz, or 240 kHz, and the position of the symbol in which the SS/PBCH block (or SSB block) may be positioned may be determined according to each subcarrier spacing. FIG. 7 illustrates the position of the symbol in which the SSB may be transmitted according to the subcarrier spacing in the symbols within 1 ms, and the SSB need not be always transmitted in the region shown in FIG. 7. The position in which the SSB block is transmitted may be configured in the terminal through system information or dedicated signaling.

Since the terminal is generally far from the base station, the signal transmitted from the terminal is received by the base station after a propagation delay. The propagation delay time is a value obtained by dividing the path through which a radio wave is transmitted from the terminal to the base station by the speed of light, and may typically be a value obtained by dividing the distance between the terminal and the base station by the speed of light. According to an embodiment, if the terminal is located 100 km away from the base station, a signal transmitted from the terminal is received by the base station after about 0.34 msec. The signal transmitted from the base station is also received by the terminal after about 0.34 msec. As described above, the arrival time of a signal transmitted from the terminal to the base station may vary depending on the distance between the terminal and the base station. Therefore, when multiple terminals in different locations transmit signals simultaneously, the times when the signals arrive at the base station may differ from each other. To allow the signals from several terminals to simultaneously arrive at the base station, the time of transmission of uplink signal may be rendered to differ per terminal. In 5G, NR and LTE systems, this is called timing advance.

Figure 8:
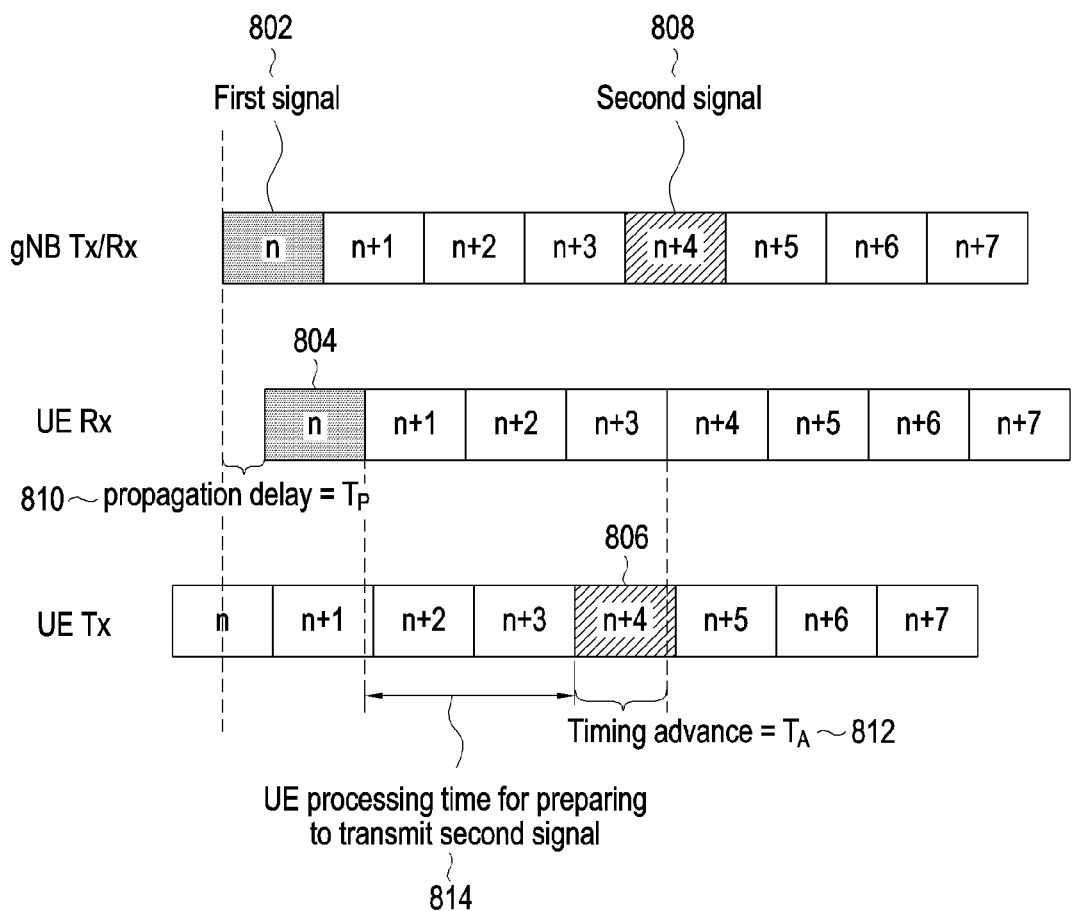
FIG. 8 is a diagram illustrating processing time of a terminal according to a timing advance when the terminals receives a first signal and the terminal transmits a second signal to the first signal in a 5G or NR system according to an embodiment of the disclosure.

FIG. 8 is a diagram illustrating processing time of a terminal according to a timing advance when the terminals receives a first signal and the terminal transmits a second signal to the first signal in a 5G or NR system according to an embodiment of the disclosure.

Hereinafter, the processing time of the terminal according to the timing advance is described in detail. Referring to FIG. 8, when the base station transmits an uplink scheduling grant (UL grant) or a downlink control signal and data (DL grant and DL data) to the terminal at slot n 802, the terminal may receive the uplink scheduling grant or downlink control signal and data at slot n 804. In this case, the terminal may receive the signal, a propagation delay (Tp) 810 later than the time the base station transmits the signal. In this embodiment, when the terminal receives a first signal at slot n 804, the terminal transmits a second signal at slot n+4 806. When the terminal transmits a signal to the base station, the terminal may transmit an HARQ ACK/NACK for the uplink data or downlink data at a timing 806 which is a timing advance (TA) 812 earlier than slot n+4 for the signal received by the terminal to allow the signal to arrive at the base station at a specific time. Thus, according to the instant embodiment, the time during which the terminal may prepare to transmit uplink data after receiving the uplink scheduling grant or the terminal may prepare to transfer an HARQ ACK or NACK after receiving downlink data may be a time corresponding to three slots except for TA (814).

To determine the above-described timing, the base station may calculate the absolute value of the TA of the terminal. The base station may calculate the absolute value of the TA by adding to, or subtracting from, the TA first transferred to the terminal in the random access phase, variation in the subsequent TA transferred via higher layer signaling, when the terminal initially accesses the base station. In the disclosure, the absolute value of the TA may be a value obtained by subtracting the start time of the nth TTI for reception by the terminal from the start time of the nth TTI for transmission by the terminal.

Meanwhile, one of the important criteria for performance of a cellular wireless communication system is packet data latency. In LTE systems, signal transmission/reception is performed in units of subframes which have a transmission time interval (TTI) of 1 ms. The LTE system operated as described above may support terminals (e.g., short-TTI terminals) having a shorter TTI than 1 ms. Meanwhile, in 5G or NR systems, the TTI may be shorter than 1 ms. Short-TTI terminals are suitable for services, such as voice over LTE (VoLTE) services and remote control services where latency is important. Further, the short-TTI terminal becomes a means capable of realizing mission-critical Internet of things (IoT) on a cellular basis.

In the 5G or NR system, when the base station transmits a PDSCH including downlink data, the DCI for scheduling the PDSCH indicates the K1 value, which is a value corresponding to information for the timing when the terminal transmits HARQ-ACK information for the PDSCH Unless it is instructed to transmit HARQ-ACK information earlier than symbol L1 including the timing advance, the terminal may transmit it to the base station. In other words, the HARQ-ACK information may be transmitted from the terminal to the base station at the same time, or later than, the symbol L1 including the timing advance. When it is instructed to transmit HARQ-ACK information earlier than symbol L1 including the timing advance, the HARQ-ACK information may not be valid HARQ-ACK information in HARQ-ACK transmission from the terminal to the base station.

Symbol L1 may be the first symbol at which cyclic prefix (CP) begins $T_{proc,1}$ after the last time of the PDSCH. $T_{proc,1}$ may be calculated as in Equation 3 below.

$$T_{proc,1} = ((N_1 + d_{1,1} + d_{1,2})(2048 + 144) \cdot \kappa 2^{-\mu}) \cdot T_C \qquad \text{Equation 3}$$

In Equation 3 above, N1, d1,1, d1,2, K, μ, and TC may be defined as follows.

If HARQ-ACK information is transmitted over PUCCH (uplink control channel), d1,1=0, and if HARQ-ACK information is transmitted over PUSCH (uplink shared channel, data channel), d1,1=1.

When the terminal is configured with a plurality of activated configuration carriers or carriers, the maximum timing difference between carriers may be reflected in the second signal transmission.

In the case of PDSCH mapping type A, that is, when the first DMRS symbol position is the third or fourth symbol of the slot, if the position index i of the last symbol of the PDSCH is less than 7, d1,2=7−i.

In the case of PDSCH mapping type B, that is, when the first DMRS symbol position is the first symbol of the PDSCH, if the length of the PDSCH is 4 symbols, d1,2=3, and if the length of the PDSCH is 2 symbols, d1,2=3+d, where d is the number of symbols in which the PDSCH and the PDCCH including the control signal for scheduling the corresponding PDSCH overlap.

N1 is defined as in Table 17 below according to μ. μ=0, 1, 2, and 3 mean subcarrier spacing is 15 kHz, 30 kHz, 60 kHz, and 120 kHz, respectively.

TABLE 17

| | PDSCH decoding time $N_1$ [symbols] | |
| --- | --- | --- |
| μ | No additional PDSCH DMRS configured | additional PDSCH DMRS configured |
| 0 | 8 | 13 |
| 1 | 10 | 13 |
| 2 | 17 | 20 |
| 3 | 20 | 24 |

For the N1 value provided in Table 17 above, a different value may be used according to UE capability. The following definitions are used:

$T_c = 1/(\Delta f_{max} \cdot N_f)$, $\Delta f_{max} = 480 \cdot 10^3$ Hz, $N_f = 4096$, $\kappa = T_s/T_c = 64$, $T_s = 1/(\Delta f_{ref} \cdot N_{f,ref})$, $\Delta f_{ref} = 15 \cdot 10^3$ Hz, $N_{f,ref} = 2048$ Further, in the 5G or NR system, when the base station transmits control information including an uplink scheduling grant, the K2 value corresponding to information for the timing when the terminal transmits uplink data or PUSCH may be indicated.

Unless it is instructed to transmit PUSCH earlier than symbol L2 including the timing advance, the terminal may transmit it to the base station. In other words, the PUSCH may be transmitted from the terminal to the base station at the same time, or later than, the symbol L2 including the timing advance. When it is instructed to transmit the PUSCH earlier than symbol L2 including the timing advance, the terminal may disregard the uplink scheduling grant control information from the base station.

Symbol L2 may be the first symbol at which the CP of the PUSCH symbol, which needs to be transmitted $T_{proc,2}$ after the last time of the PDCCH including the scheduling grant, begins. $T_{proc,2}$ may be calculated as in Equation 4 below.

$$T_{proc,2} = ((N_2 + d_{2,1})(2048 + 144) \cdot \kappa 2^{-\mu}) \cdot T_C \qquad \text{Equation 4}$$

In Equation 4 above, N2, d2,1, K, μ, and TC may be defined as follows.

If the first symbol among PUSCH-allocated symbols includes only DMRS, $d_{2,1}=0$, otherwise $d_{2,1}=1$.

When the terminal is configured with a plurality of activated configuration carriers or carriers, the maximum timing difference between carriers may be reflected in the second signal transmission.

N2 is defined as in Table 18 below according to μ. μ=0, 1, 2, and 3 mean subcarrier spacing is 15 kHz, 30 kHz, 60 kHz, and 120 kHz, respectively.

TABLE 18

| μ | (PUSCH preparation time) $N_2$ [symbols] |
|---|---|
| 0 | 10 |
| 1 | 12 |
| 2 | 23 |
| 3 | 36 |

For the N2 value provided in Table 18 above, a different value may be used according to UE capability. The following definitions are used:
$T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ The 5G or NR system may configure a frequency band part (BWP) within one carrier to allow a specific terminal to transmit and receive within the configured BWP. This may be so intended to reduce power consumption of the terminal. The base station may configure a plurality of BWPs, and may change the activated BWP in the control information. The time which the terminal may use when the BWP is changed may be defined as shown in Table 19 below.

TABLE 19

| Frequency Range | Scenario | Type 1 delay (us) | Type 2 delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 19, frequency range 1 means a frequency band below 6 GHz, and frequency range 2 means a frequency band above 6 GHz. In the above-described embodiment, type 1 and type 2 may be determined according to UE capability. Scenarios 1, 2, 3, and 4 in the above-described embodiment are given as illustrated in Table 20 below.

TABLE 20

|  | Center frequency variable | Center frequency fixed |
|---|---|---|
| Frequency bandwidth variable | Scenario 3 | Scenario 2 |
| Frequency bandwidth fixed | Scenario 1 | Scenario 4 if subcarrier spacing is changed |

Figure 9:
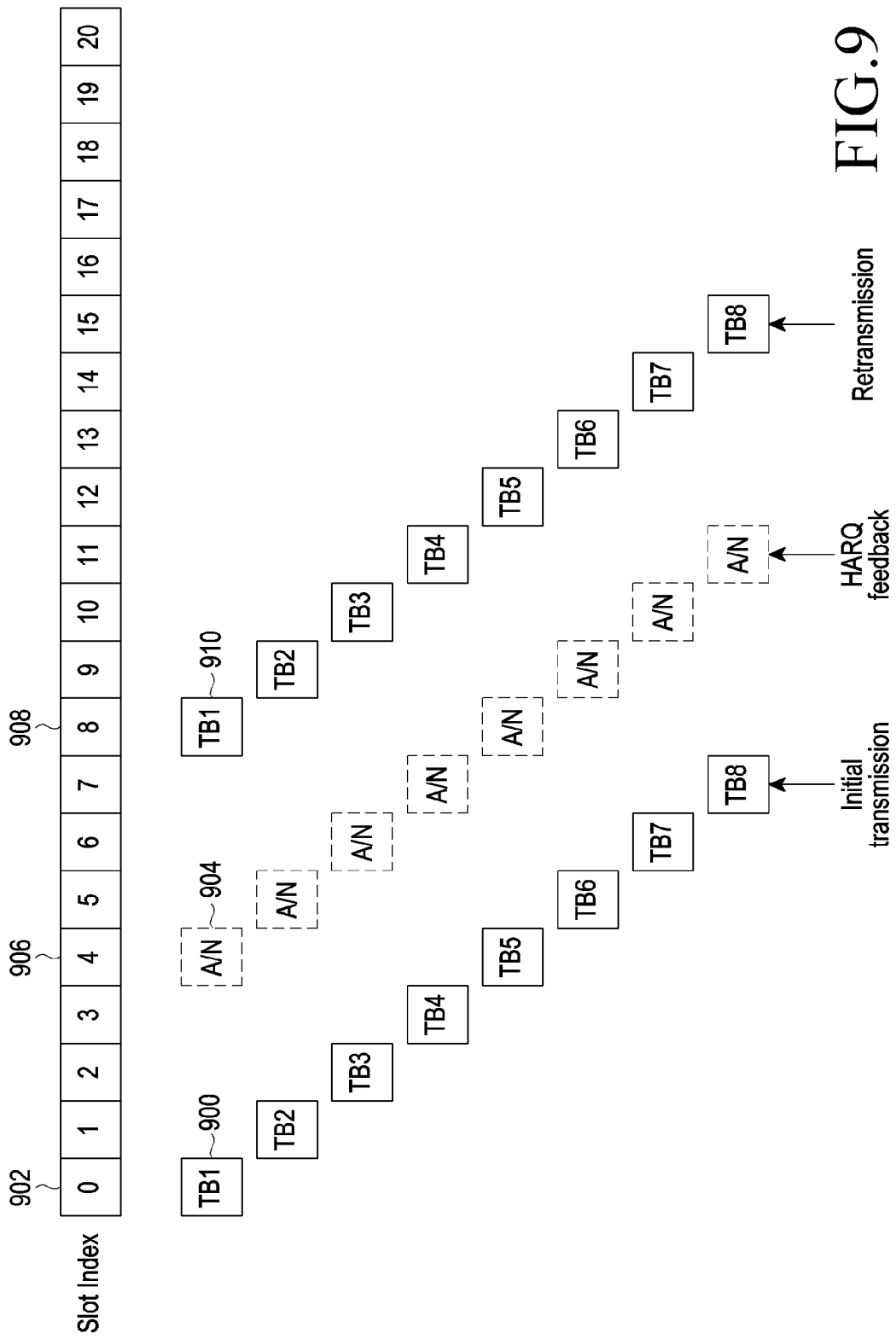
FIG. 9 is a diagram illustrating an example in which data (e.g., TBs) is scheduled and transmitted according to a slot, a hybrid automatic repeat request-acknowledgment (HARQ-ACK) feedback for the corresponding data is received, and retransmission is performed according to the feedback according to an embodiment of the disclosure.

FIG. 9 is a diagram illustrating an example in which data (e.g., TBs) are scheduled and transmitted according to a slot, an HARQ-ACK feedback for the corresponding data is received, and retransmission is performed according to the feedback according to an embodiment of the disclosure. Referring to FIG. 9, TB1 900 is initially transmitted in slot 0 902, and an ACK/NACK feedback 904 therefor is transmitted in slot 4 906. If the initial transmission of TB1 fails and a NACK is received, retransmission 910 for TB1 may be performed in slot 8 908. In the above, the time point at which the ACK/NACK feedback is transmitted and the time point at which the retransmission is performed may be predetermined or may be determined according to a value indicated by control information and/or higher layer signaling.

FIG. 9 illustrates an example in which TB1 to TB8 are sequentially scheduled and transmitted from slot 0 to TB8. For example, TB1 to TB8 may be transmitted, with HARQ process ID 0 to HARQ process ID 7 assigned thereto. If only four HARQ process IDs may be used by a base station and a terminal, it may be impossible to consecutively transmit eight different TBs.

Figure 10:
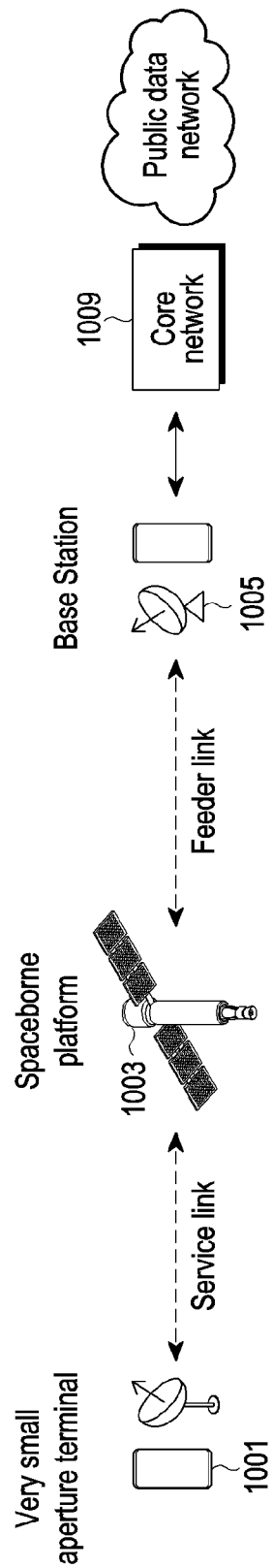
FIG. 10 is a diagram illustrating an example of a communication system using a satellite according to an embodiment of the disclosure.

FIG. 10 is a diagram illustrating an example of a communication system using a satellite according to an embodiment of the disclosure.

Referring to FIG. 10, for example, if a terminal 1001 transmits a signal to a satellite 1003, the satellite 1003 may transmit the signal to the base station 1005, and the base station 1005 may process the received signal to generate a signal including a request for a subsequent operation for the received signal and transmit the generated signal to the terminal 1001 via the satellite 1003. Because a distance between the terminal 1001 and the satellite 1003 is long, and a distance between the satellite 1003 and the base station 1005 is also long, time required for data transmission and reception from the terminal 1001 to the base station 1005 is long. The base station 1005 communicates with the core network 1009.

Figure 11:
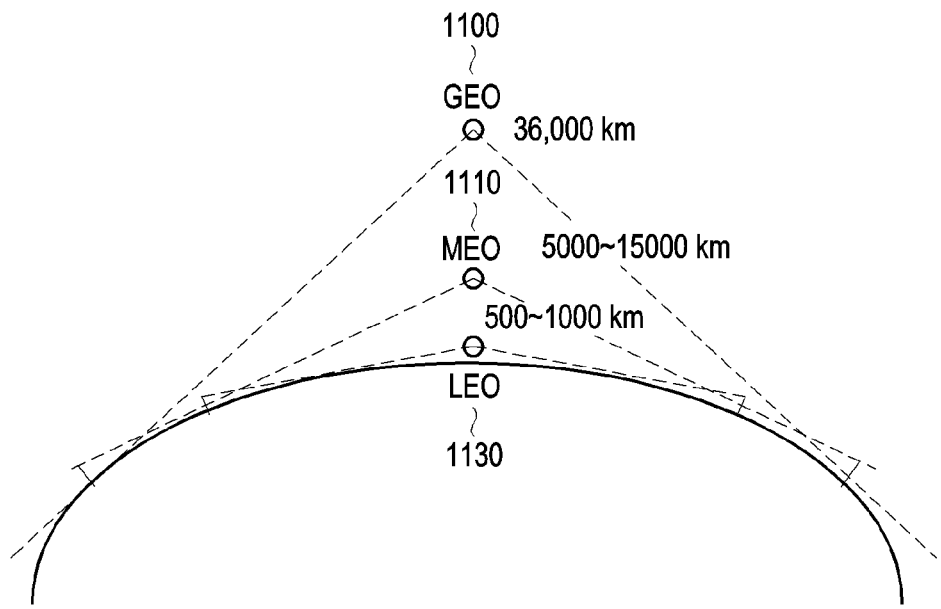
FIG. 11 is a diagram illustrating an earth revolution period of a satellite according to an altitude or height of the satellite according to an embodiment of the disclosure.

FIG. 11 is a diagram illustrating an earth revolution period of a satellite according to an altitude or height of the satellite according to an embodiment of the disclosure.

Referring to FIG. 11, satellites for a communication may be classified into a low earth orbit (LEO), a middle earth orbit (MEO), a geostationary earth orbit (GEO), and/or the like according to orbits of the satellites. Generally, a GEO 1100 refers to a satellite at an altitude of approximately 36000 km, an MEO 1110 refers to a satellite at an altitude of 5000 to 15000 km, and a LEO 1130 refers to a satellite at an altitude of 500 to 1000 km. An earth revolution period varies according to each altitude. In a case of the GEO 1100, the earth revolution period is about 24 hours, in a case of the MEO 1110, the earth revolution period is about 6 hours, and in a case of the LEO 1130, the earth revolution period is about 90 to 120 minutes. A low orbit (~2,000 km) satellite has a relatively low altitude, and has an advantage over a geostationary orbit (36,000 km) satellite in terms of propagation delay time (which may be understood as time it takes for a signal transmitted from a transmitter to reach a receiver) and loss. A non-GEO satellite may be referred to as a non-geostationary orbit (NGSO).

Figure 12:
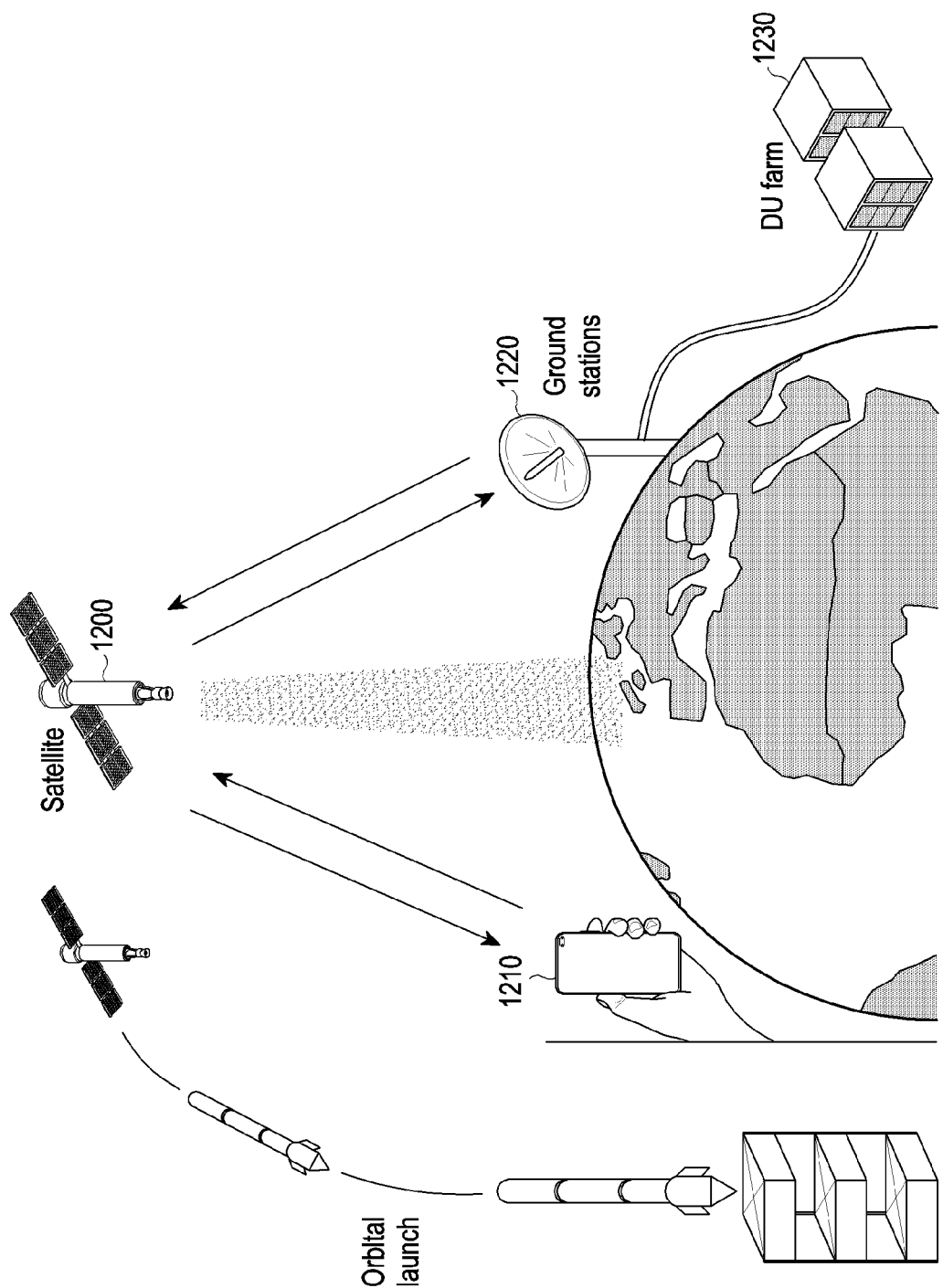
FIG. 12 is a diagram illustrating a concept of a satellite-terminal direct communication according to an embodiment of the disclosure.

FIG. 12 is a diagram illustrating a concept of a satellite-terminal direct communication according to an embodiment of the disclosure.

Referring to FIG. 12, a satellite 1200 located at an altitude of 100 km or more by a rocket transmits and receives a signal to and from a terminal 1210 on the ground, and transmits and receives a signal to and from a ground station 1220 connected to a base station (e.g., distributed unit (DU) farms 1230).

Figure 13:
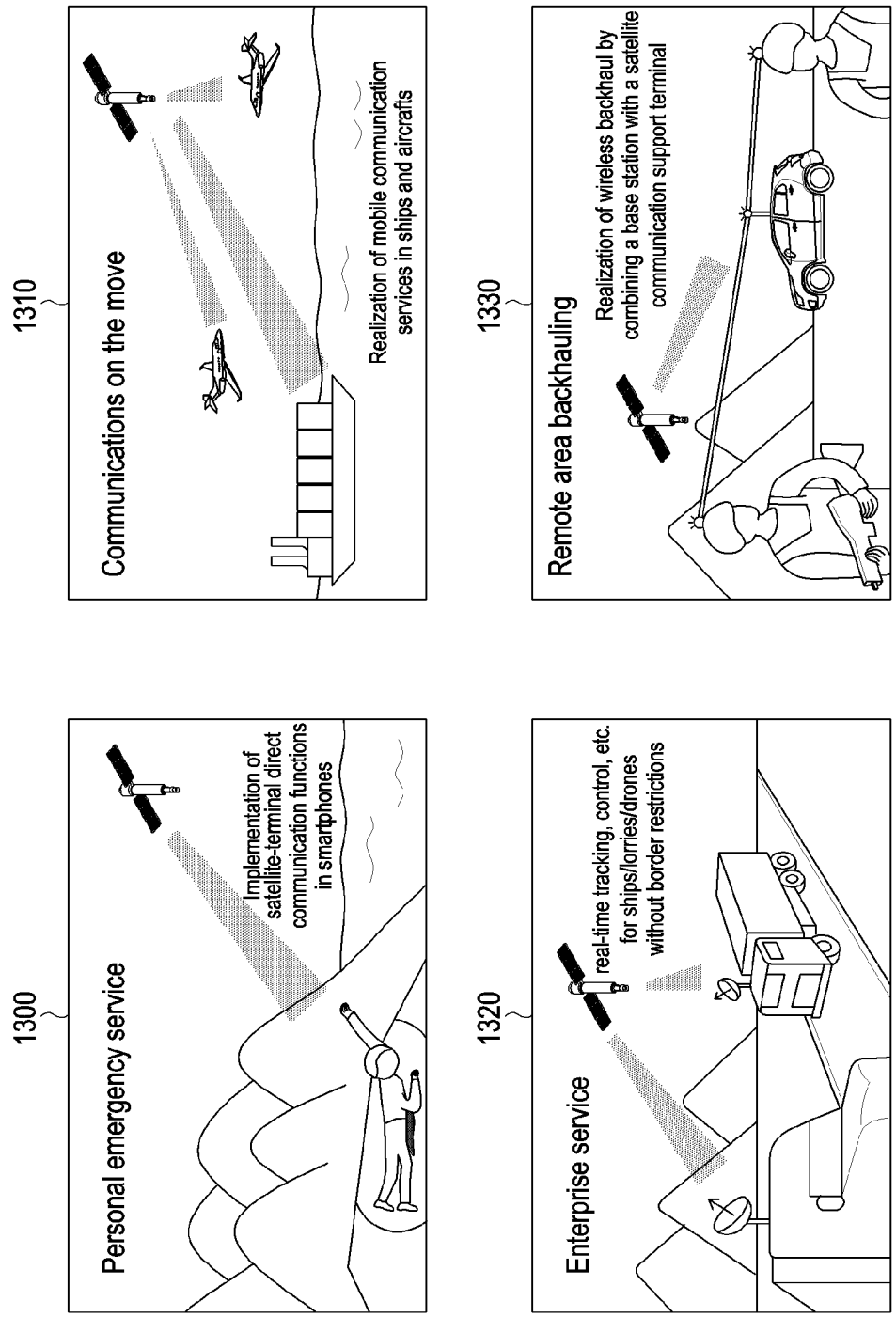
FIG. 13 is a diagram illustrating a utilization scenario of a satellite-terminal direct communication according to an embodiment of the disclosure.

FIG. 13 is a diagram illustrating a utilization scenario of a satellite-terminal direct communication according to an embodiment of the disclosure.

Referring to FIG. 13, a satellite-terminal direct communication may support a communication service with a specialized purpose in a form of supplementing a coverage limit of a terrestrial network. For example, by implementing a satellite-terminal direct communication function in a user terminal, it is possible to transmit and receive an emergency rescue of a user and/or a disaster signal in a place which is not a terrestrial network coverage (1300), to provide a mobile communication service to the user at an area where a terrestrial network communication is impossible such as a ship and/or an air plane (1310), and to track and control a location of a ship, a freight car, a drone, and/or the like in real time without border restrictions (1320). In addition, by supporting a satellite communication function to a base station, a satellite communication may function as a backhaul of the base station, so it is possible to use a satellite communication to perform a backhaul function if the user terminal is physically distant from the base station (1330).

Figure 14:
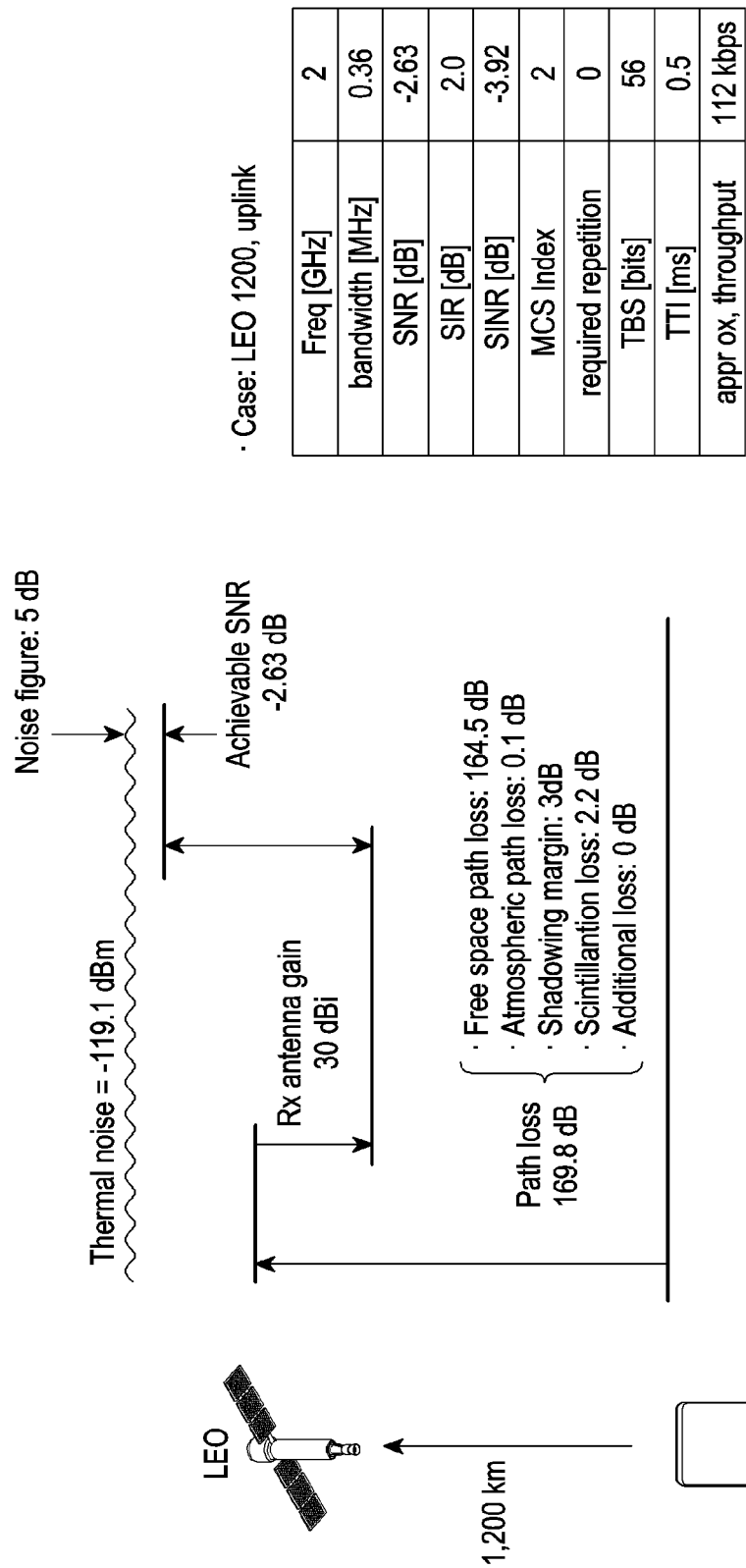
FIG. 14 is a diagram illustrating an example of calculating an expected data rate (or throughput) in an uplink when a low earth orbit (LEO) satellite at an altitude of 1200 km and a terminal on the ground perform a direct communication according to an embodiment of the disclosure.

FIG. 14 is a diagram illustrating an example of calculating an expected data rate (or throughput) in an uplink when a LEO satellite at an altitude of 1200 km and a terminal on the ground perform a direct communication according to an embodiment of the disclosure.

Referring to FIG. 14, in an uplink, if transmission power effective isotropic radiated power (EIRP) of a terminal on the ground is 23 dBm, a path loss of a radio channel to a satellite is 169.8 dB, and a satellite reception antenna gain is 30 dBi, an achievable signal-to-noise ratio (SNR) is estimated at −2.63 dB. In this case, the path loss may include a path loss in an outer space, a loss in an atmosphere, and/or the like. Assuming a signal-to-interference ratio (SIR) of 2 dB, a signal-to-interference and noise ratio (SINR) is calculated as −3.92 dB. At this time, if 30 kHz subcarrier spacing and a frequency resource of one PRB are used, it may be possible to achieve a data rate of 112 kbps.

Figure 15:
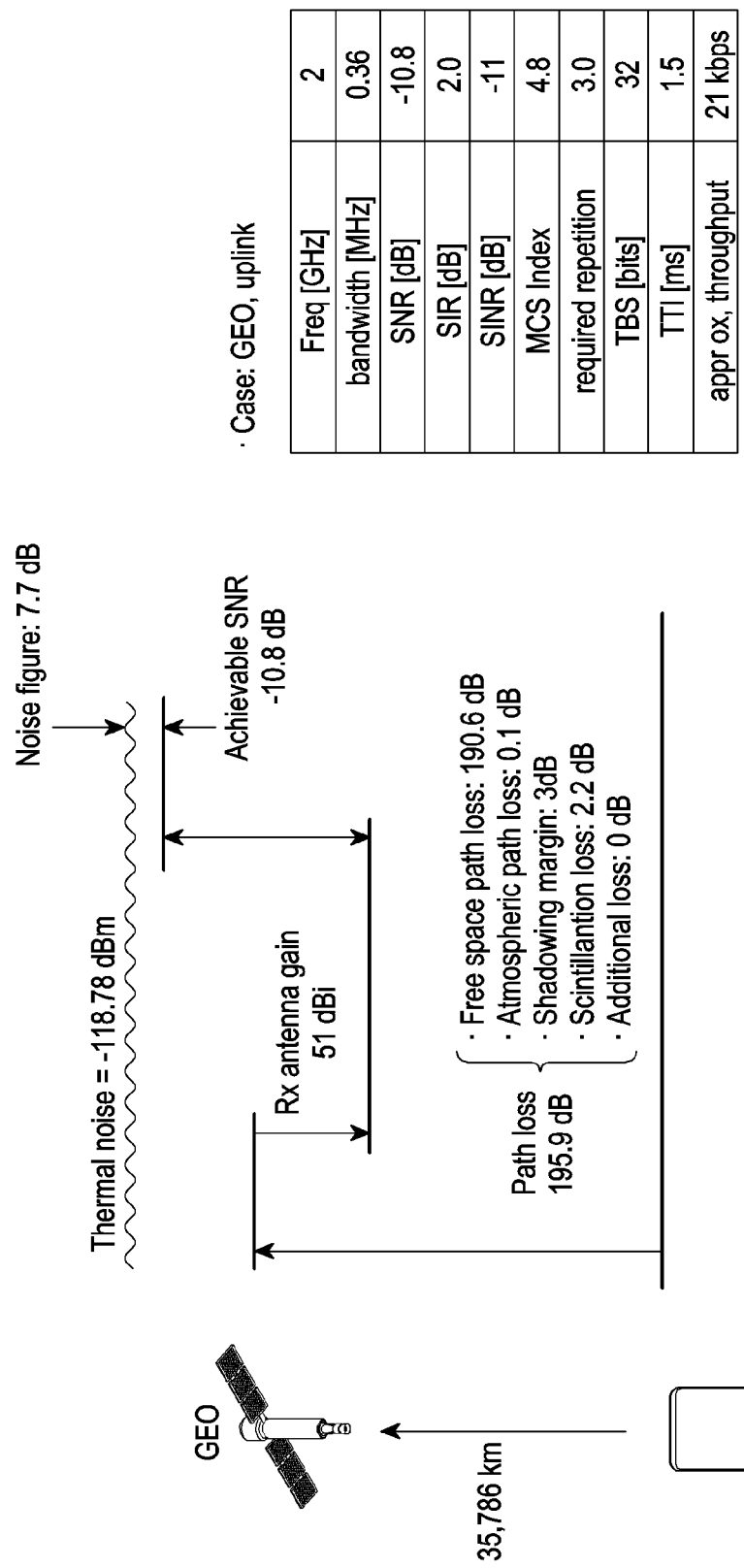
FIG. 15 is a diagram illustrating an example of calculating an expected data rate (or throughput) in an uplink when a geostationary earth orbit (GEO) satellite at an altitude of 35,786 km and a terminal on the ground perform a direct communication according to an embodiment of the disclosure.

FIG. 15 is a diagram illustrating an example of calculating an expected data rate (or throughput) in an uplink when a GEO satellite at an altitude of 35,786 km and a terminal on the ground perform a direct communication according to an embodiment of the disclosure.

Referring to FIG. 15, in an uplink, if transmission power EIRP of a terminal on the ground is 23 dBm, a path loss of a radio channel to a satellite is 195.9 dB, and a satellite reception antenna gain is 51 dBi, an achievable SNR is estimated at −10.8 dB. In this case, the path loss may include a path loss in an outer space, a loss in an atmosphere, and/or the like. Assuming an SIR of 2 dB, an SINR is calculated as −11 dB. At this time, if 30 kHz subcarrier spacing and a frequency resource of one PRB are used, it may be possible to achieve a data rate of 21 kbps, and this may be a result of performing three repeated transmissions.

Figure 16:
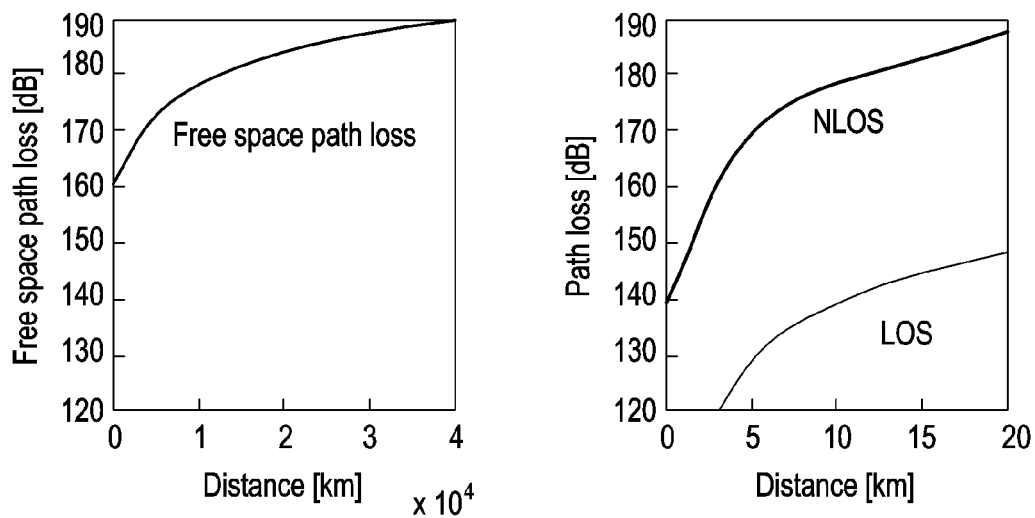
FIG. 16 is a diagram illustrating a path loss value according to a path loss model between a terminal and a satellite, and a path loss according to a path loss model between the terminal and a terrestrial network communication base station according to an embodiment of the disclosure.

FIG. 16 is a diagram illustrating a path loss value according to a path loss model between a terminal and a satellite, and a path loss according to a path loss model between the terminal and a terrestrial network communication base station according to an embodiment of the disclosure.

Referring to FIG. 16, d represents a distance and $f_c$ represents a frequency of a signal. In an outer space (e.g., a free space) where a communication between a terminal and a satellite is performed, a path loss FSPL 1600 is inversely proportional to a square of a distance. But, a path loss $PL_2$ 1610 or $PL'_{Uma-NLOS}$ 1620 on the ground where an air via which a communication between the terminal and a terrestrial network communication base station (e.g., a terrestrial gNB) is performed exists is inversely proportional to a fourth power of a distance. Here, $d_{3D}$ represents a straight line distance between the terminal and the base station, $h_{BS}$ represents a height of the base station, and $h_{UT}$ is a height of the terminal. Further, $d'_{BP} = 4 \times h_{BS} \times h_{UT} \times f_c/c$, $f_c$ represents a center frequency in Hz, and c represents a speed of light in m/s.

In satellite communications (or a non-terrestrial network), Doppler shift, i.e., frequency shift (or offset) of a transmission signal, occurs as a satellite continuously moves rapidly.

Figure 17:
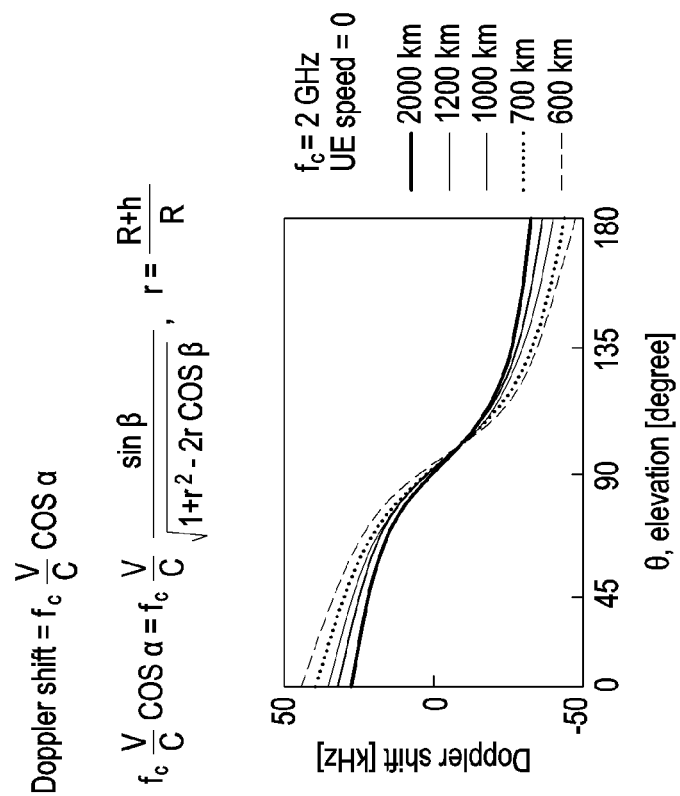
FIG. 17 is a diagram illustrating equations and results for calculating amount of Doppler shift experienced by a signal which is transmitted from a satellite is received in a user terminal on the ground according to an altitude and a location of the satellite, and a location of the user terminal on the ground according to an embodiment of the disclosure.
Figure 17:
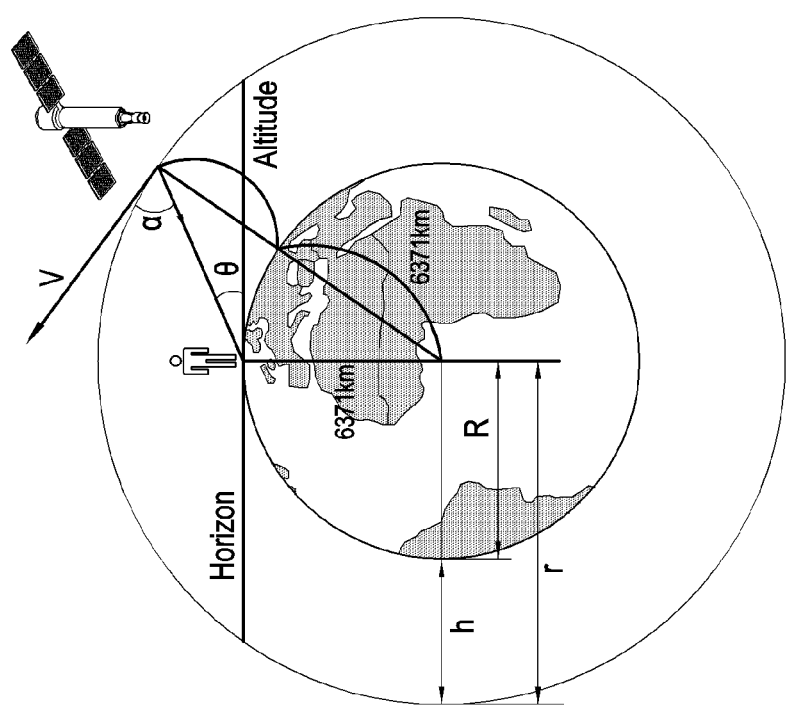

FIG. 17 is a diagram illustrating equations and results for calculating amount of Doppler shift experienced by a signal which is transmitted from a satellite is received in a user terminal on the ground according to an altitude and a location of the satellite, and a location of the user terminal on the ground according to an embodiment of the disclosure.

Referring to FIG. 17, R represents a radius of an earth, h represents an altitude of a satellite, v represents a speed at which the satellite orbits the earth, and $f_c$ represents a frequency of a signal. The speed of the satellite may be calculated from the altitude of the satellite, may be a speed at which gravity, which is a force that the earth pulls on the satellite, and a centripetal force generated as the satellite orbits become the same, and may be calculated as shown in FIG. 18.

Figure 18:
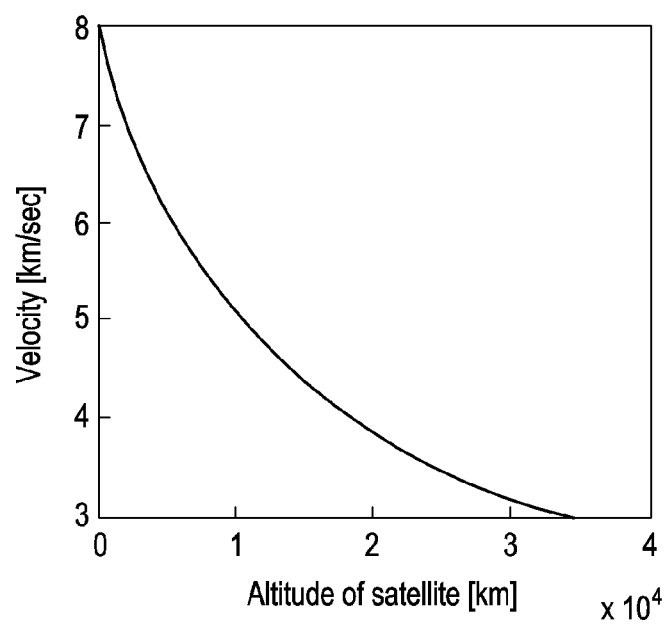
FIG. 18 is a diagram illustrating a speed of a satellite calculated at an altitude of the satellite according to an embodiment of the disclosure.

FIG. 18 is a diagram illustrating a speed of a satellite calculated at an altitude of the satellite according to an embodiment of the disclosure.

Referring to FIG. 18, as shown in FIG. 17, an angle α is determined by an elevation angle θ, a value of Doppler shift is determined according to the elevation angle θ.

Figure 19:
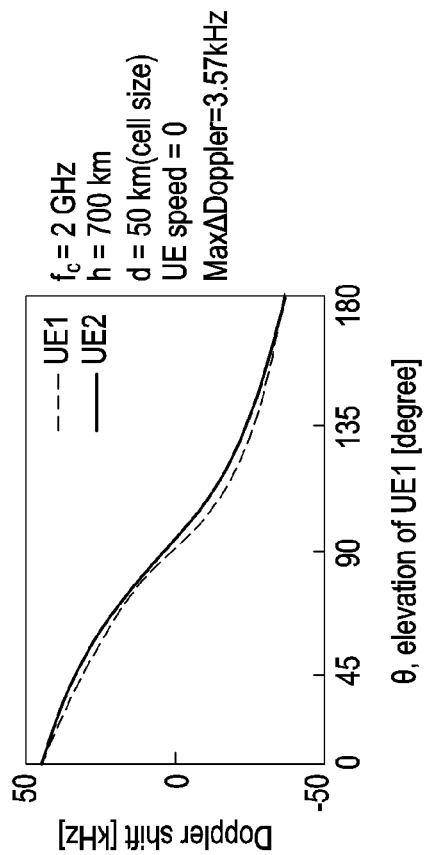
FIG. 19 is a diagram illustrating Doppler shift experienced by different terminals in one beam transmitted by a satellite to the ground according to an embodiment of the disclosure.
Figure 19:
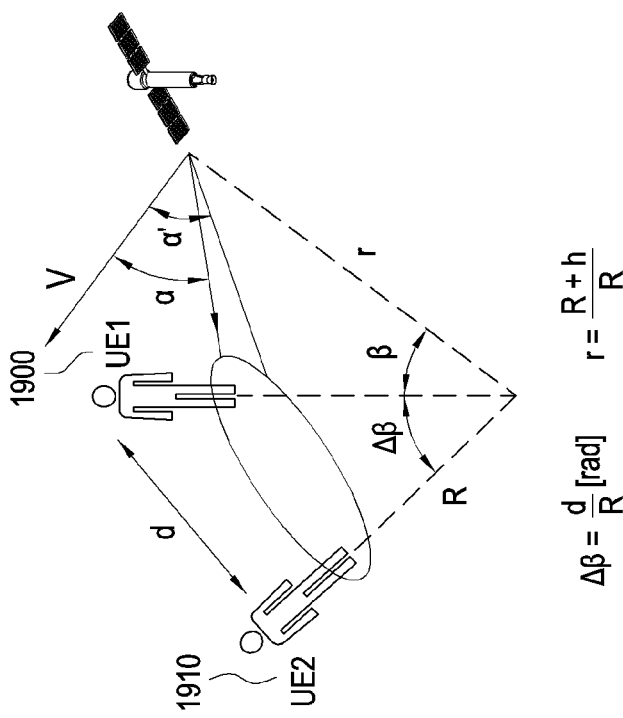

FIG. 19 is a diagram illustrating Doppler shift experienced by different terminals in one beam transmitted by a satellite to the ground according to an embodiment of the disclosure.

Referring to FIG. 19, Doppler shift experienced by a terminal 1 1900 and Doppler shift experienced by a terminal 2 1910 according to an elevation angle θ are calculated. Such Doppler shift is a calculation result if it is assumed that a center frequency is 2 GHz, a satellite altitude is 700 km, a diameter of one beam is 50 km on the ground, and a speed of a terminal is 0. In addition, an effect of a rotation speed of the earth is not reflected in the Doppler shift calculated in the disclosure. This is why it may be considered that the effect of the rotation speed of the earth is small because the rotation speed of the earth is slower than a speed of a satellite.

Figure 20:
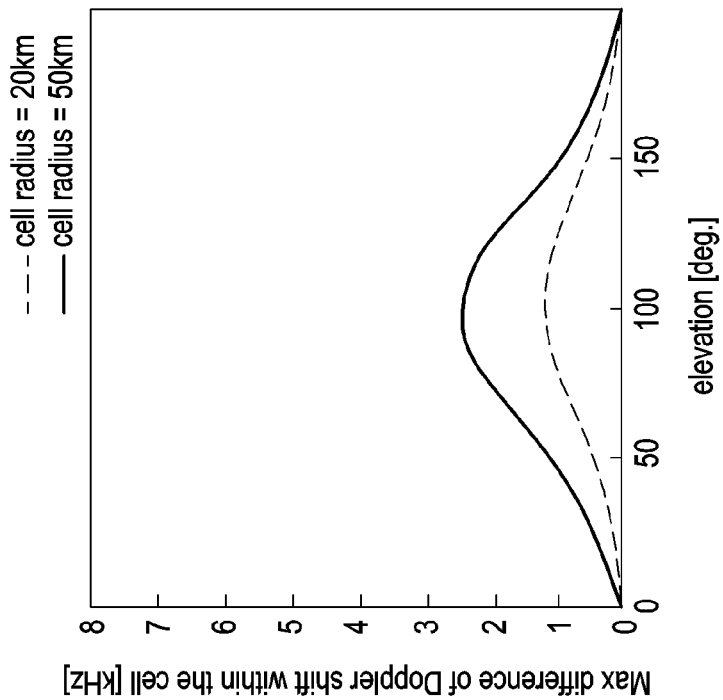
FIG. 20 is a diagram illustrating a difference in Doppler shift which occurs within one beam according to a location of a satellite determined from an elevation angle according to an embodiment of the disclosure.
Figure 20:
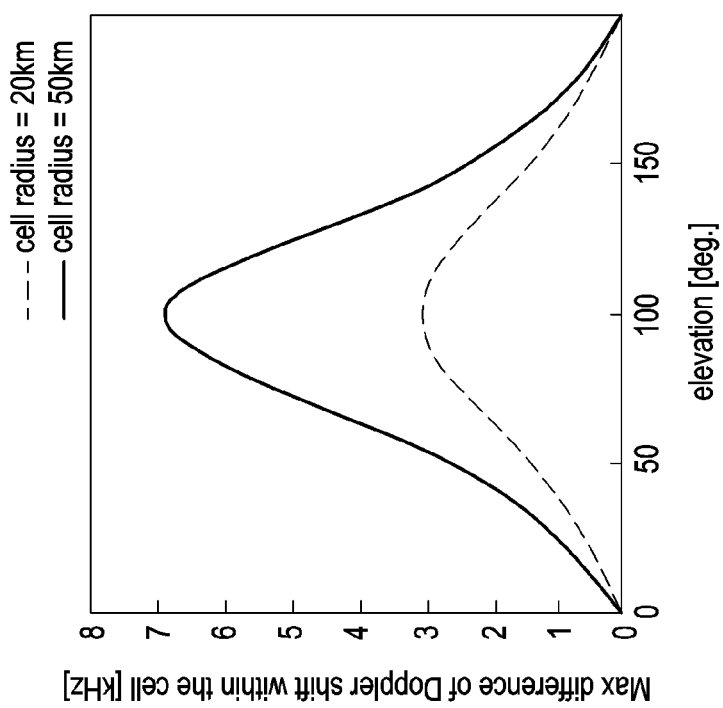

FIG. 20 is a diagram illustrating a difference in Doppler shift which occurs within one beam according to a location of a satellite determined from an elevation angle according to an embodiment of the disclosure.

Referring to FIG. 20, when a satellite is located directly above a beam, that is, when an elevation angle is 90 degrees, it may be seen that a difference in Doppler shift within the beam (or cell) is greatest. This may be because when the satellite is above a center, Doppler shift values at one end of the beam and at the other of the beam have positive and negative values, respectively.

Meanwhile, in a satellite communication, a satellite is far from a user on the ground, so large delay time occurs compared to a terrestrial network communication.

Figure 21:
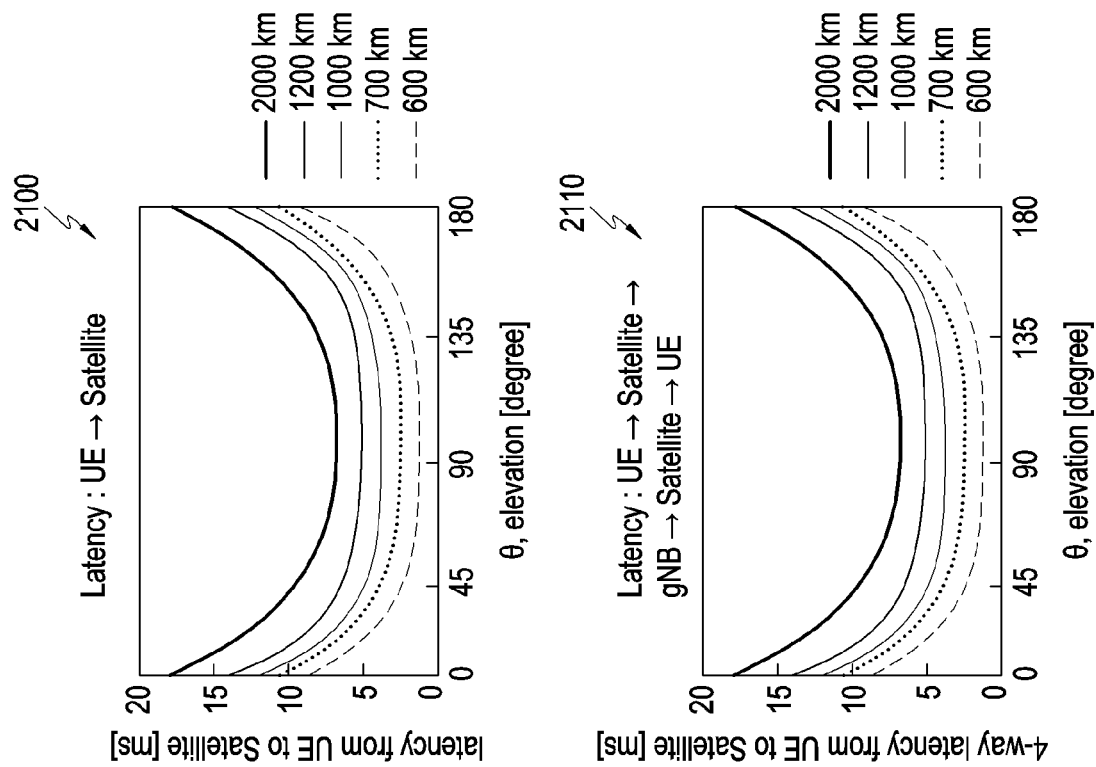
FIG. 21 is a diagram illustrating delay time taken from a terminal to a satellite and round trip time among the terminal, the satellite and a base station according to a location of the satellite determined according to an elevation angle according to an embodiment of the disclosure.
Figure 21:
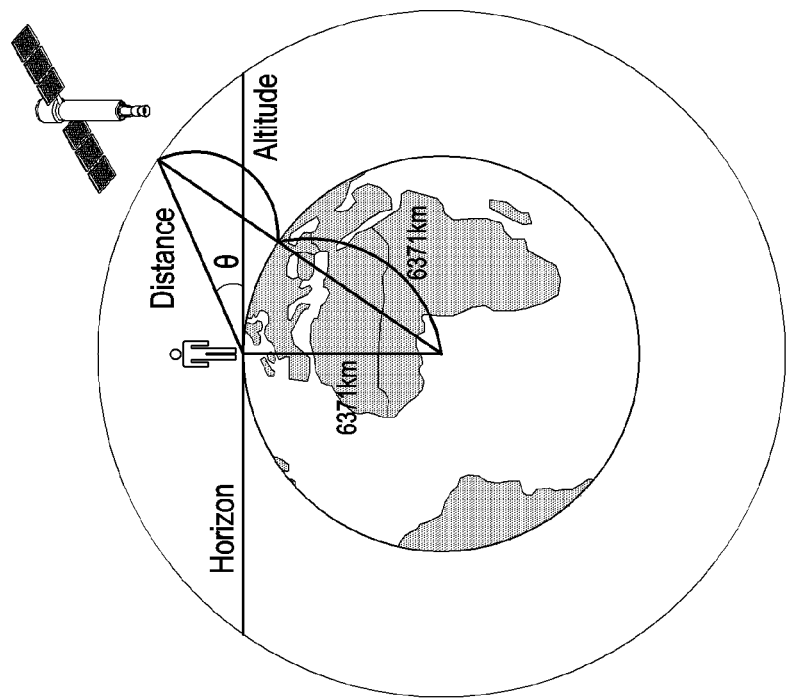

FIG. 21 is a diagram illustrating delay time taken from a terminal to a satellite and round trip time among the terminal, the satellite and a base station according to a location of the satellite determined according to an elevation angle according to an embodiment of the disclosure.

Referring to FIG. 21, a reference sign 2100 shows delay time taken from a terminal to a satellite, and a reference sign 2110 shows round trip time among the terminal, the satellite and a base station. At this time, it is assumed that delay time between the satellite and the base station is equal to delay time between the terminal and the satellite.

Figure 22:
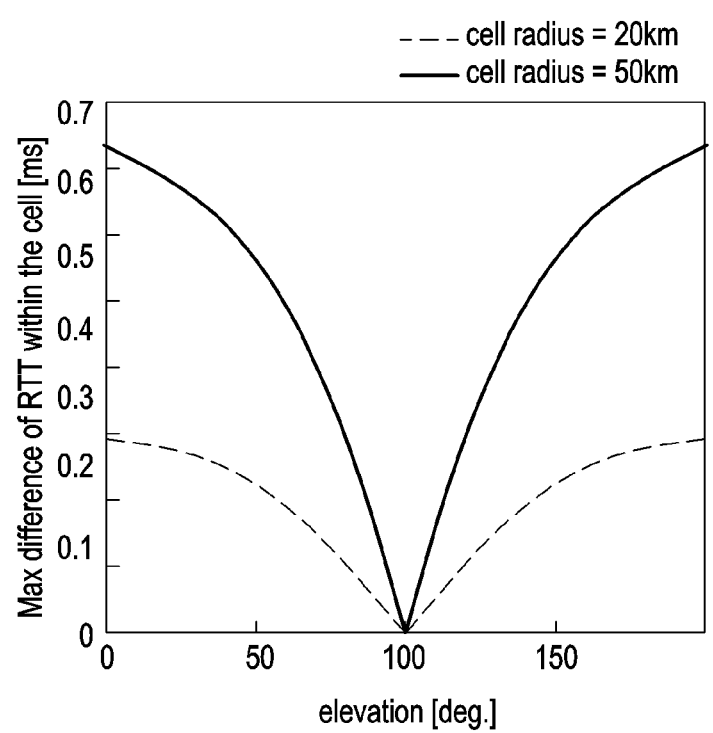
FIG. 22 is a diagram illustrating a maximum difference value of round trip time which varies according to a location of a user within one beam according to an embodiment of the disclosure.

FIG. 22 is a diagram illustrating a maximum difference value of round trip time which varies according to a location of a user within one beam according to an embodiment of the disclosure.

Referring to FIG. 22, if a beam radius (or a cell radius) is 20 km, it may be regarded that a difference in round trip time to a satellite which terminals whose locations are different within a beam differently experience may be equal to or less than about 0.28 ms.

In a satellite communication, a case that a terminal transmits and receives a signal to and from a base station may be a case that the signal is transmitted via a satellite. That is, in a downlink, the satellite may receive a signal transmitted by the base station to the satellite, and then transfer the signal to the terminal. In an uplink, the satellite may receive a signal transmitted by the terminal and then transfer the signal to the base station. In the above, after receiving the signal, the satellite may perform frequency shift on the signal to transmit the frequency shifted signal, or may perform signal processing such as decoding, re-encoding, etc. based on the received signal to transmit the signal processed signal.

In a case of LTE or NR, a terminal may access a base station according to the following procedure.

Step 1: The terminal receives a synchronization signal (or a synchronization signal block (SSB) which may include a broadcast signal) from the base station. The synchronization signal may include a primary synchronization signal (PSS), a secondary synchronization signal (SSS), and a physical broadcast channel (PBCH). The synchronization signal may include information such as a slot boundary and a frame number of a signal transmitted by the base station, downlink and uplink configuration, and/or the like. In addition, based on the synchronization signal, the terminal may obtain a subcarrier offset, scheduling information for system information transmission, and/or the like.

Step 2: The terminal receives system information (e.g., a system information block (SIB)) from the base station. The SIB may include information for performing an initial access and a random access. The information for performing the random access may include resource information for transmitting a random access preamble.

Step 3: The terminal may transmit a random access preamble (or a message 1 (msg1)) via a random access resource configured in Step 2. The random access preamble may be a signal determined based on information configured in Step 2 using a predetermined sequence. The base station receives the random access preamble transmitted by the terminal. The base station attempts to receive the random access preamble via a resource configured by the base station without knowing which terminal transmits the random access preamble. If reception of the random access preamble is successful, the base station may know that at least one terminal transmits the random access preamble.

Step 4: If the random access preamble is received in Step 3, the base station transmits a random access response (RAR) (or a message 2 (msg2)) in response to the random access preamble. The terminal which transmits the random access preamble in Step 3 may attempt to receive the RAR transmitted by the base station in Step 4. The RAR is transmitted on a PDSCH, and a PDCCH scheduling the PDSCH is transmitted together with the PDSCH or before the PDSCH. A CRC scrambled with an RA-RNTI is added to DCI which schedules the RAR, the DCI (and the CRC) is channel-encoded and then mapped to the PDCCH, and the PDCCH to which the channel-encoded DCI is mapped is transmitted. The RA-RNTI may be determined based on time and frequency resources via which the random access preamble in Step 3 is transmitted.

Maximum limit time until the terminal which transmits the random access preamble in Step 3 receives the RAR in Step 4 may be configured in the SIB transmitted in Step 2. The maximum limit time may be configured limitedly, for example, up to 10 ms, 40 ms, and/or the like. That is, if the terminal which transmits the random access preamble in Step 3 does not receive the RAR within time determined based on, for example, 10 ms which is the configured maximum limit time, the terminal may retransmit the random access preamble. The RAR may include scheduling information for allocating a resource of a signal to be transmitted by the terminal in Step 5, which is the next step.

Figure 23:
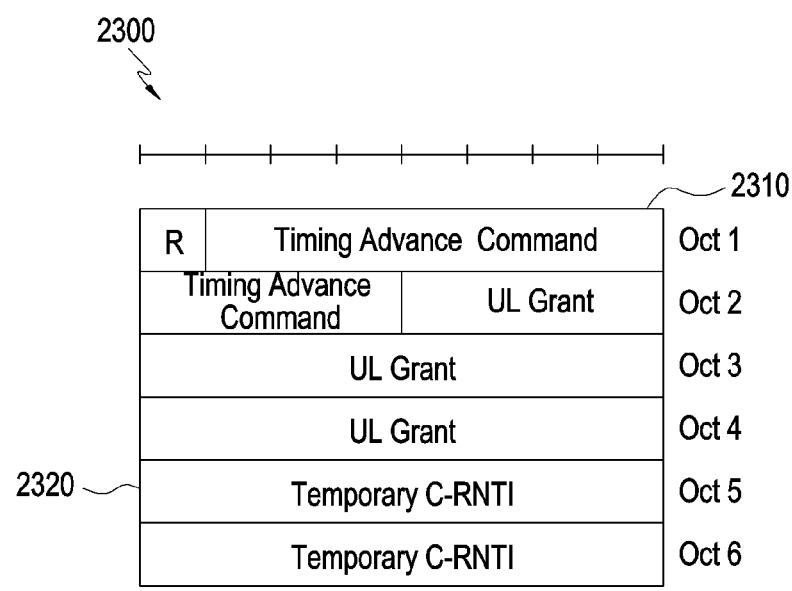
FIG. 23 is a diagram illustrating an example of an information structure of a random access response (RAR) according to an embodiment of the disclosure.

FIG. 23 is a diagram illustrating an example of an information structure of an RAR according to an embodiment of the disclosure.

Referring to FIG. 23, an RAR 2300 may be, for example, a MAC PDU, and may include information 2310 about timing advance (TA) to be applied by a terminal and a temporary C-RNTI value 2320 to be used from the next step.

Step 5: The terminal receiving the RAR in Step 4 transmits a message 3 (msg3) to the base station according to the scheduling information included in the RAR. The terminal may include ID information (e.g., a unique ID value) of the terminal into the msg3 to transmit the msg3. The base station may attempt to receive the msg3 according to the scheduling information transmitted by the base station in Step 4.

Step 6: The base station receives the msg3, identifies the ID information of the terminal, generates a message 4 (msg4) including the ID information of the terminal, and transmits the msg4 to the terminal. After transmitting the msg3 in Step 5, the terminal may attempt to receive the msg4 to be transmitted in Step 6. After receiving the msg4, the terminal may compare an ID value included in the msg4 with an ID value transmitted by the terminal in Step 5 after decoding to identify whether the msg3 transmitted by the terminal is received in the base station. There may be a constraint on time from time at which the terminal transmits the msg3 in Step 5 to time at which the terminal receives the msg4 in Step 6, and the constraint on the time may also be configured via the SIB in Step 2.

If the initial access procedure using the above steps is applied to a satellite communication, propagation delay time required for the satellite communication may become a problem. For example, an interval, i.e., maximum time (e.g., a random access window) from time at which the terminal transmits the random access preamble (or the PRACH preamble) in Step 3 to time at which the terminal receives the RAR in Step 4 may be configured via ra-Response Window. The maximum time may be set to about 10 ms in an LTE system or a 5G NR system according to the related art.

Figure 24:
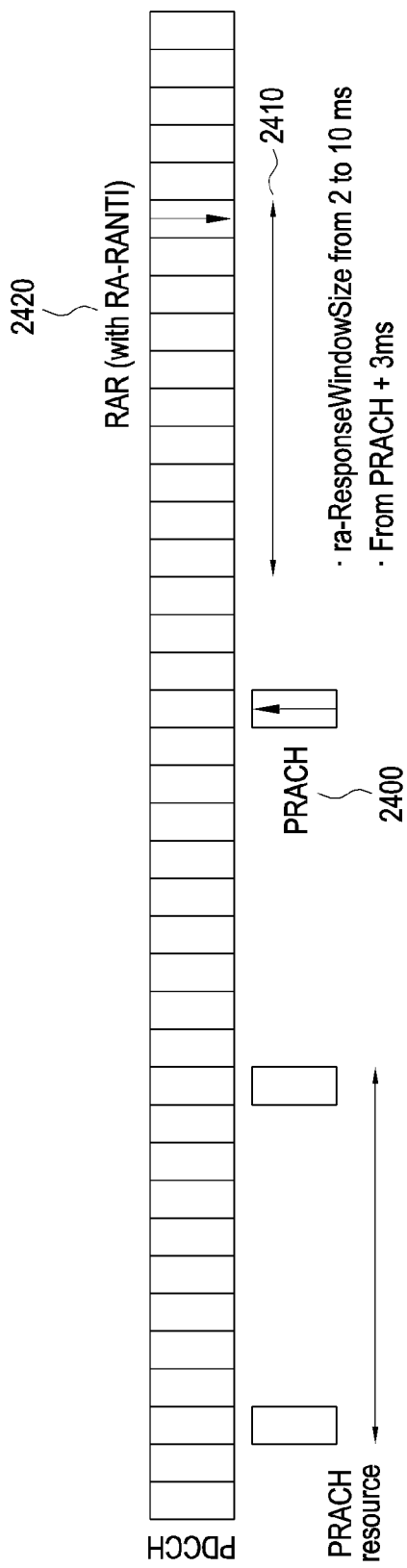
FIG. 24 is a diagram showing an example of relationship between a physical random access channel (PRACH) preamble configuration resource and a RAR reception time point in a long term evolution (LTE) system according to an embodiment of the disclosure.

FIG. 24 is a diagram showing an example of relationship between a PRACH preamble configuration resource and an RAR reception time point in an LTE system according to an embodiment of the disclosure.

Figure 25:
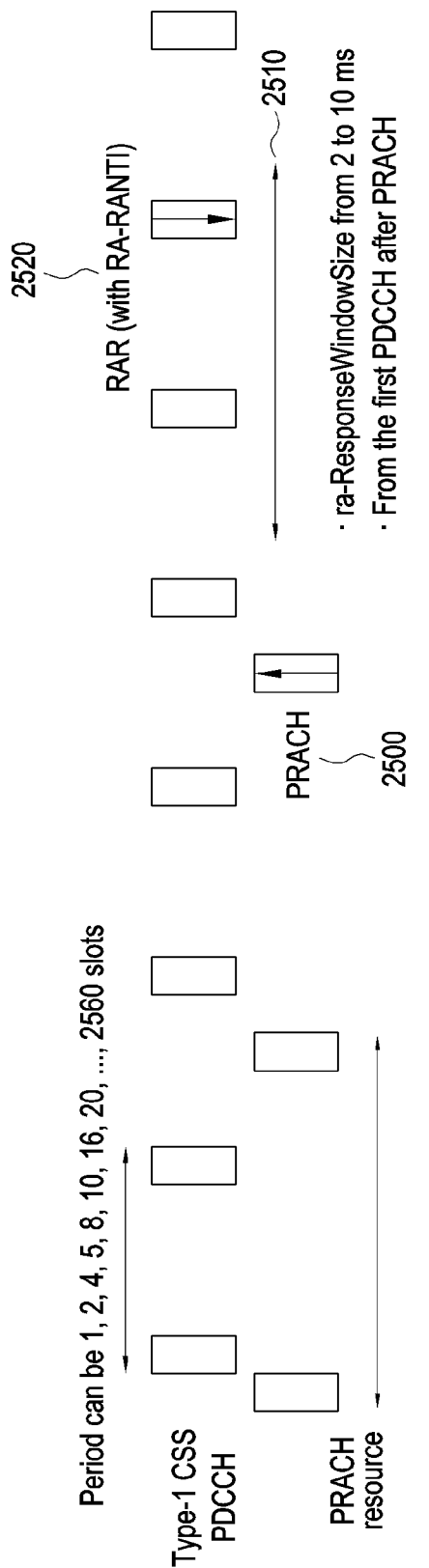
FIG. 25 is a diagram illustrating an example of relationship between a PRACH preamble configuration resource and an RAR reception time point in a 5G NR system according to an embodiment of the disclosure.

FIG. 25 is a diagram illustrating an example of relationship between a PRACH preamble configuration resource and an RAR reception time point in a 5G NR system according to an embodiment of the disclosure.

Referring to FIG. 24, in a case of LTE, a random access window 2410 starts after 3 ms from a time point at which a PRACH (or a random access preamble) is transmitted (2400). If an RAR is received (2420) within the random access window 2410, a terminal may identify that transmission of the PRACH (or the random access preamble) is successful.

Referring to FIG. 25, in a case of NR, a random access window 2510 starts from a control information area for RAR scheduling which appears first after a PRACH (or a random access preamble) is transmitted (2500). If a terminal receives (2520) an RAR within the random access window 2510, it may be determined that transmission of the PRACH (or the random access preamble) is successful.

For example, a TA for uplink transmission timing in a 5G NR system may be determined as follows. First, $T_c=1/(\Delta f_{max} \cdot N_f)$, where $\Delta f_{max}=480 \cdot 10^3$ Hz and $N_f=4096$. In addition, $\kappa=T_s/T_c=64$, $T_s=1/(\Delta f_{ref} \cdot N_{f,ref})$, $\Delta f_{ref}=15 \cdot 10^3$ Hz, and $N_{f,ref}=2048$.

Figure 26:
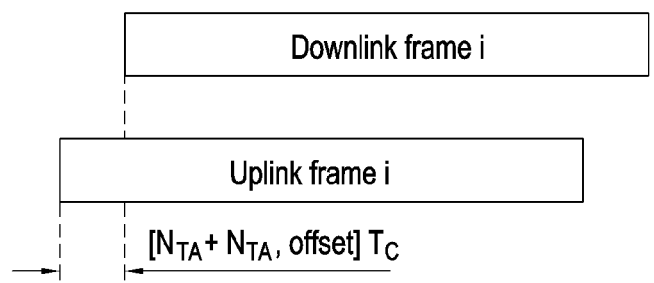
FIG. 26 is a diagram illustrating an example of downlink frame timing and uplink frame timing in a terminal according to an embodiment of the disclosure.

FIG. 26 is a diagram illustrating an example of downlink frame timing and uplink frame timing in a terminal according to an embodiment of the disclosure.

Referring to FIG. 26, a terminal may advance an uplink frame by $T_{TA}=(N_{TA}+N_{TA,\ offset})T_c$ based on downlink frame timing to perform uplink transmission. In the above, a value of $N_{TA}$ may be transmitted via an RAR or may be determined based on a MAC CE, and $N_{TA,\ offset}$ may be a value configured to the terminal or determined based on a predetermined value.

An RAR of a 5G NR system may indicate a TA value, and in this case, TA may indicate one of 0, 1, 2, . . . , 3846. In this case, if subcarrier spacing (SCS) of the RAR is $2^\mu \cdot 15$ kHz, $N_{TA}$ is determined as $N_{TA}=T_A \cdot 16 \cdot 64/2^\mu$. After a terminal completes a random access process, a changed value of TA is indicated by a base station, and the changed value of TA may be indicated via a MAC CE, and/or the like. TA information indicated via the MAC CE may indicate one of 0, 1, 2, . . . , 63, which is added to or subtracted from an existing TA value and used for calculating a new TA value. As a result, the TA value may be newly calculated as $N_{TA\_new}=N_{TA\_old}+(T_A-31) \cdot 16 \cdot 64/2^\mu$. The indicated TA value may be applied to uplink transmission by the terminal after predetermined time.

Figure 27A:
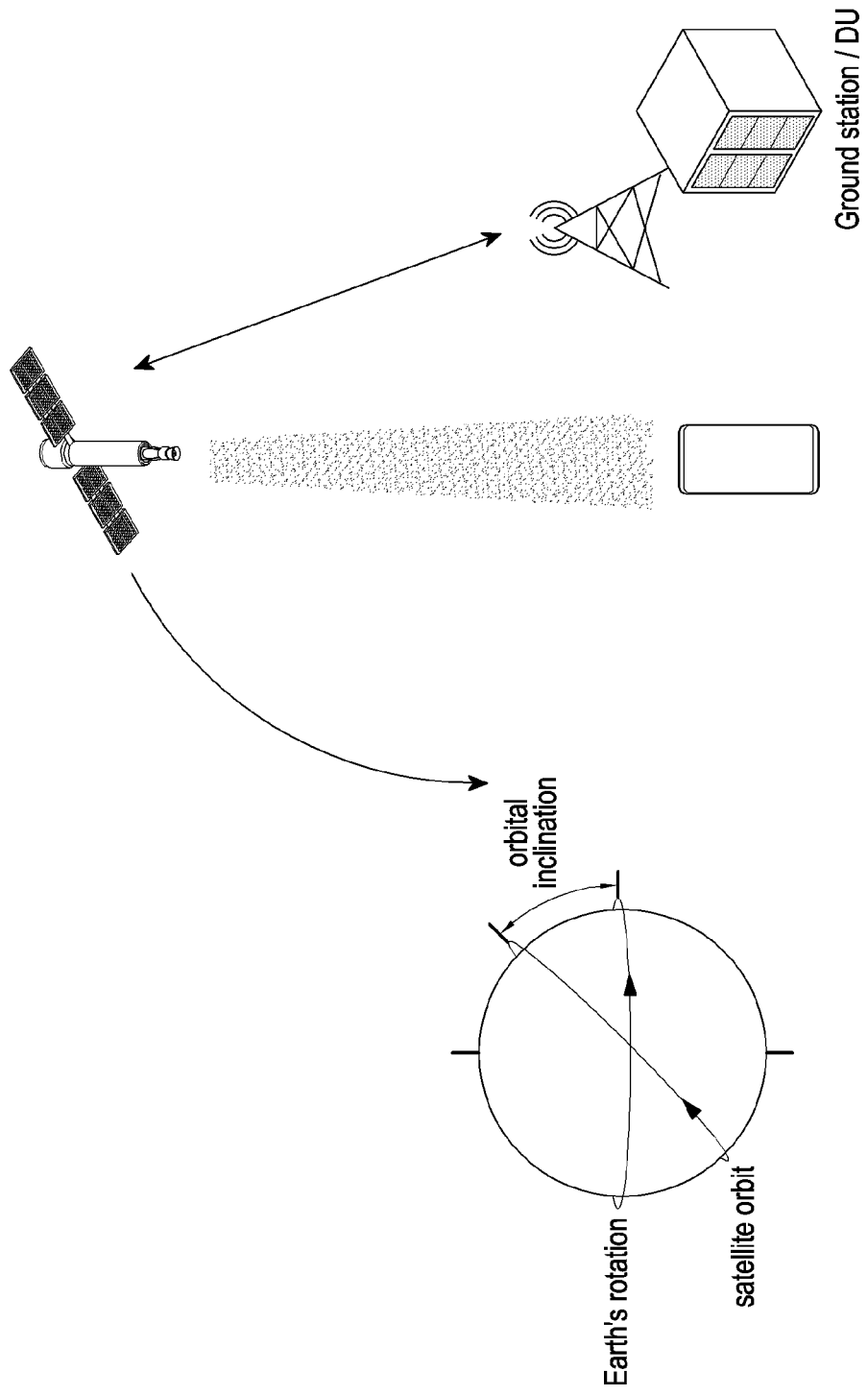
FIG. 27A is a diagram illustrating an example of continuous movement of a satellite in a terminal located on the ground or on the earth as the satellite revolves around the earth along a satellite orbit according to an embodiment of the disclosure.

FIG. 27A is a diagram illustrating an example of continuous movement of a satellite in a terminal located on the ground or on the earth as the satellite revolves around the earth along a satellite orbit according to an embodiment of the disclosure.

Referring to FIG. 27A, a distance between a terminal and a satellite varies according to an elevation angle at which the terminal looks at the satellite, so delay time (e.g., propagation delay) among the terminal, the satellite, and the base station varies.

Figure 27B:
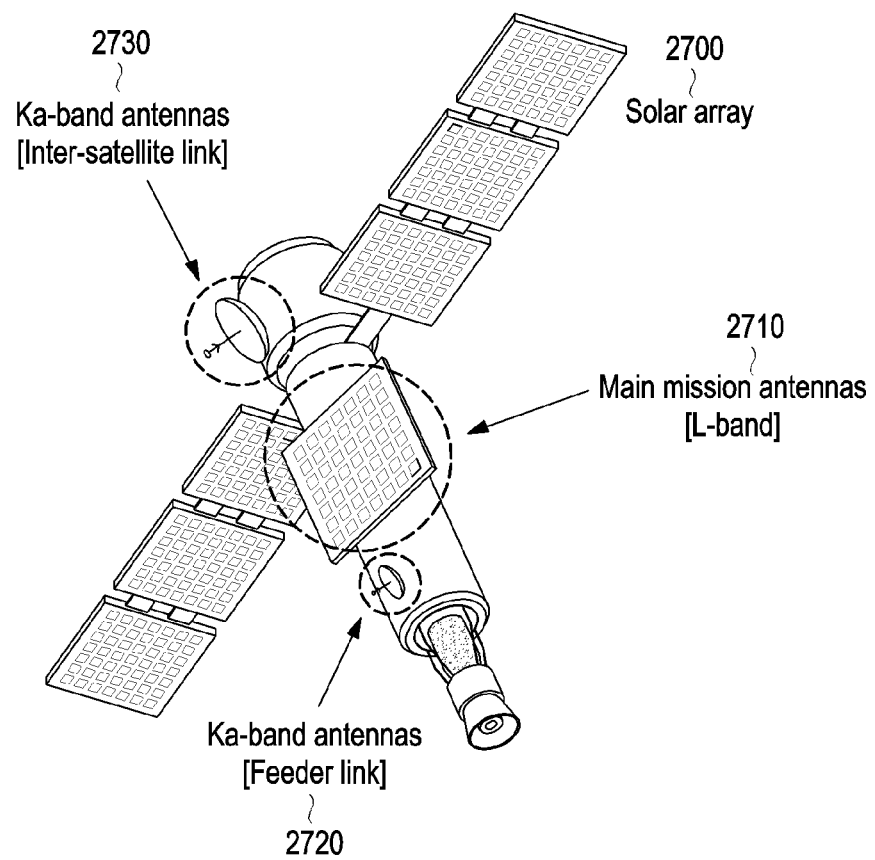
FIG. 27B is a diagram showing an example of a structure of an artificial satellite according to an embodiment of the disclosure.

FIG. 27B is a diagram showing an example of a structure of an artificial satellite according to an embodiment of the disclosure.

Referring to FIG. 27B, a satellite may include a solar panel or solar array (2700) for photovoltaic or solar power generation, a transmission/reception (e.g., a main mission antenna) 2710 for a communication with a terminal, and a transmission/reception (e.g., a feeder link antenna) 2720 for a communication with a ground station, a transmission/reception antenna for an inter-satellite communication (e.g., an inter-satellite link) 2730, a processor for controlling transmission and reception and performing signal processing, and/or the like. If the inter-satellite communication is not supported, the transmission/reception antenna for the inter-satellite communication 2730 may not be included in the satellite. FIG. 27B shows that an L band of 1 to 2 GHz is used for a communication with the terminal, but high-frequency bands such as a K band (18 to 26.5 GHz), a Ka band (26.5 to 40 GHz), and a Ku band (12 to 18 GHz) may also be used.

Meanwhile, various embodiments of the disclosure propose a method and apparatus for adjusting uplink timing in a communication system, and this will be described in detail as follows.

In various embodiments of the disclosure, in order for uplink signals transmitted from different terminals to arrive at a base station at the same time for time synchronization, a time point at which an uplink signal is transmitted may be set differently for each terminal according to a location, and a timing advance (TA) is used for this. For example, the TA is used for adjusting uplink timing, for example, uplink frame timing with respect to downlink timing, for example, downlink frame timing.

In various embodiments of the disclosure, a TA may be transmitted via a MAC CE, for example, a timing advance command MAC CE, an absolute timing advance command MAC CE, and/or the like.

Various embodiments of the disclosure propose an apparatus and method for transmitting and receiving a signal based on a TA in a communication system.

Various embodiments of the disclosure propose an apparatus and method for transmitting and receiving a signal based on a TA when a non-terrestrial network (NTN) is considered in a communication system.

Various embodiments of the disclosure propose a scheme in which a terminal performs an uplink transmission operation based on a TA in a communication system. Accordingly, it may be necessary for a base station to transmit information for assisting the terminal in applying the TA in advance, or to receive an uplink signal transmitted by the terminal by applying the TA.

Various embodiments of the disclosure consider a case in which a terminal transmits and receives a signal to and from a base station via a satellite, and propose a scheme in which the terminal applies a TA based on information provided from the base station and a satellite, global navigation satellite system (GNSS) information, and/or the like to transmit and receive a signal Further, in various embodiments of the disclosure, the term "base station (BS)" may refer to any component (or a set of components) configured to provide wireless access, such as a transmission point (TP), a transmit-receive point (TRP), an enhanced node B (eNodeB or eNB), a 5G base station (gNB), a macrocell, a femtocell, Wi-Fi access point (AP), or other wireless-enabled devices, based on the type of the wireless communication system. In various embodiments of the disclosure to be described below, the term "BS" will be interchangeable with the term "TP", "TRP", "eNodeB", "eNB", "gNB", "macrocell", "femtocell", "WiFi AP", or "wireless-enabled device". Base stations may provide wireless access according to one or more radio protocols, e.g., 5G 3GPP new radio interface/access (NR), long-term evolution (LTE), LTE advanced (LTE-A), high-speed packet access (HSPA), or Wi-Fi 802.11a/b/g/n/ac.

Further, in various embodiments of the disclosure, the term "terminal" may refer to any component, such as "user equipment (UE)," "mobile station," "subscriber station," "remote terminal," "wireless terminal," "receive point," or "user device." In various embodiments of the disclosure to be described below, the term "terminal" will be interchangeable with the term "mobile station," "subscriber station," "remote terminal," "wireless terminal," "receive point," or "user device." For convenience, the term "UE" is used to refer to a device that accesses a base station regardless of whether it needs to be considered as a mobile device (such as a mobile phone or a smart phone) or a stationary device (such as a desktop computer or vending machine).

Further, in various embodiments of the disclosure, the term "TA" will be interchangeable with "TA information", "TA value", "TA index", and/or the like.

In various embodiments of the disclosure, data or control information transmitted from a base station to a terminal may be referred to as a first signal, and an uplink signal associated with the first signal may be referred to as a second signal. For example, the first signal may include DCI, a UL grant, a PDCCH, a PDSCH, an RAR, and/or the like, and the second signal associated with the first signal may include a PUCCH, a PUSCH, a msg3, and/or the like.

Also, there may be association between the first signal and the second signal. For example, if the first signal is a PDCCH including an UL grant for uplink data scheduling, the second signal corresponding to the first signal may be a PUSCH including uplink data. Meanwhile, a gap between a time point at which the first signal is transmitted/received and a time point at which the second signal is transmitted/received may be a predetermined value between the terminal and the base station. Alternatively, the difference between the time point at which the first signal is transmitted/received and the time point at which the second signal is transmitted/received may be determined by indication from the base station or may be determined by a value transmitted via higher layer signaling.

Meanwhile, a satellite navigation system may also be referred to as a GNSS, and the GNSS may include, for example, a GPS of the U.S.A., a GLONASS of Russia, a Galileo of the EU, Beidou of China, and/or the like. The GNSS may include a regional navigation satellite system (RNSS), and the RNSS may include, for example, an IRNSS of India, a QZSS of Japan, a KPS of Korea, and/or the like. Meanwhile, a signal transmitted from the GNSS may include at least one of auxiliary navigation information, a normal operation state of a satellite, satellite time, a satellite ephemeris, an altitude of the satellite, reference time, and information about various compensation materials.

Meanwhile, in a terminal-satellite direct communication, a distance between a terminal and a satellite and a distance between the satellite and a base station are long, and the satellite continuously moves, so a time offset due to propagation delay time, etc. occurs when a signal transmitted from the base station or the terminal is received in the terminal or the base station.

Accordingly, various embodiments of the disclosure propose a method and apparatus for a base station to indicate time offset information to compensate for a time offset, and a terminal to compensate for the time offset according to the time offset information. In various embodiments of the disclosure, a communication between the terminal, a satellite, and the base station existing on the ground is assumed, but it will be noted that a case in which a satellite base station and the terminal communicate is not excluded.

Also, it will be noted that, in various embodiments of the disclosure, a time offset may be interchangeable with a TA. In various embodiments of the disclosure, A satellite may be an object located high above the ground, and may be a concept including an airplane, an airship, and/or the like.

First Embodiment

A first embodiment of the disclosure provides a scheme in which a terminal directly determines (for example, calculates) a TA value when the terminal transmits an uplink signal to a satellite or a base station, and applies the determined TA value.

First, an uplink transmission operation in a case that a terminal directly calculates a TA value in a communication system according to various embodiments of the disclosure will be described with reference to FIG. 28.

Figure 28:
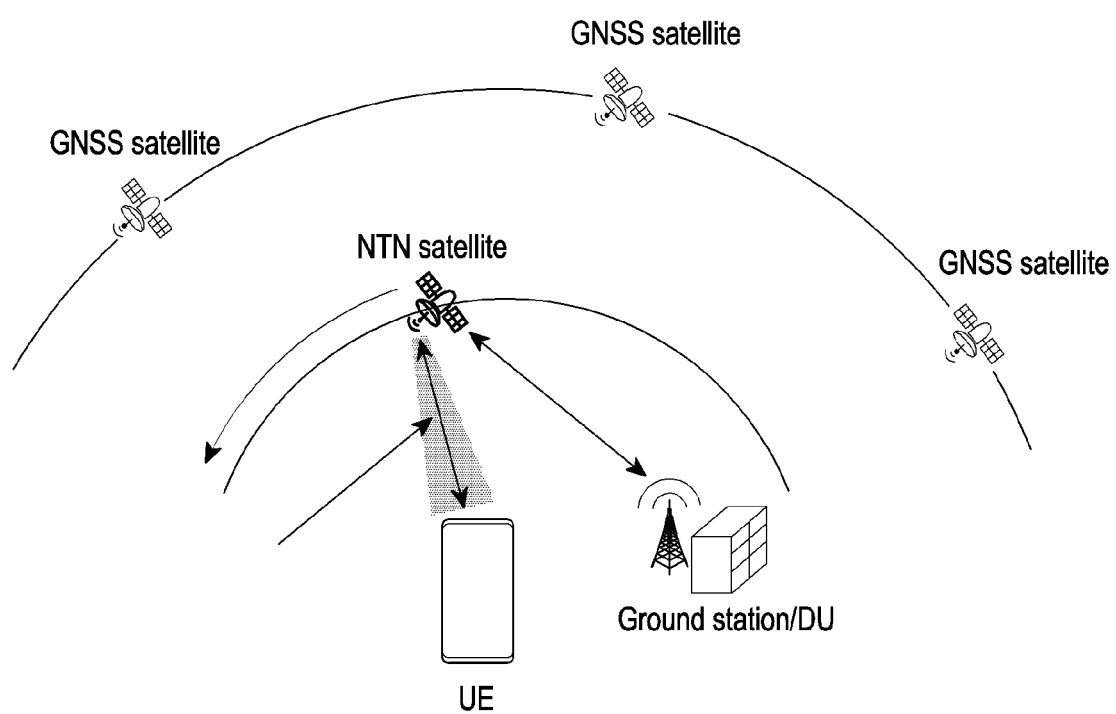
FIG. 28 is a diagram schematically illustrating an uplink transmission operation in a case that a terminal directly calculates a timing advance (TA) value in a communication system according to an embodiment of the disclosure.

FIG. 28 is a diagram schematically illustrating an uplink transmission operation in a case that a terminal directly calculates a TA value in a communication system according to an embodiment of the disclosure.

Referring to FIG. 28, a terminal may estimate propagation delay time between a satellite and the terminal based on a location of the terminal and a location of the satellite, compensate for the estimated propagation delay time by itself, and then perform an uplink transmission operation. For example, the satellite may transmit information about the location of the satellite via broadcast information, and the terminal may receive the information about the location of the satellite transmitted by the satellite and compare the location of the satellite and the location of the terminal. The terminal may identify the location of the terminal by using, for example, a global positioning system (GPS) and/or the like. A scheme of identifying the location of the terminal may be implemented in various forms, and a detailed description thereof will be omitted.

The terminal may estimate propagation delay time required for a radio wave to be transferred from the terminal to the satellite based on a result of comparing the location of the satellite with the location of the terminal, and calculate uplink transmission time based on the estimated propagation delay time. For example, if it is assumed that the terminal receives a downlink signal in a slot n via a downlink at a specific time point and needs to transmit an uplink signal corresponding to the received downlink signal in a slot n+k, the terminal may transmit the uplink signal earlier than the slot n+k by set time, for example, by 2*Td. Here, Td may correspond to propagation delay time from the terminal to the satellite calculated based on the location of the satellite and the location of the terminal. Here, the propagation delay time Td may be, for example, a value obtained by dividing a distance between the terminal and the satellite by a speed of light. In addition, the location of the satellite may be a value calculated based on the slot n+k in which the terminal transmits the uplink signal. The reason why the location of the satellite is set to be the value calculated based on the slot n+k in which the terminal transmits the uplink signal is that a location of the satellite in the slot n may be different from a location of the satellite in the slot n+k due to a movement of the satellite.

Meanwhile, in various embodiments of the disclosure, a satellite navigation system such as a GPS includes one or more satellites, and each of the one or more satellites transmits a signal including information such as time, a location, and/or the like. A terminal may receive a signal from each of the one or more satellites of the satellite navigation system, and identify a location of the terminal, etc. based on the signal received from each of the one or more satellites.

Meanwhile, in various embodiments of the disclosure, an NTN satellite may be a communication satellite serving to transmit a signal so that a terminal connects to a base station. In addition, in various embodiments of the disclosure, a GNSS satellite may be a satellite transmitting a signal of a satellite navigation system. Meanwhile, it will be noted that referring to FIG. 28, a terminal is expressed as a UE, and a base station is expressed as a ground station/DU, and/or the like.

An example of a difference in propagation delay time in a terrestrial network and propagation delay time in a satellite network in a communication system according to various embodiments of the disclosure will be described with reference to FIG. 29.

Figure 29:
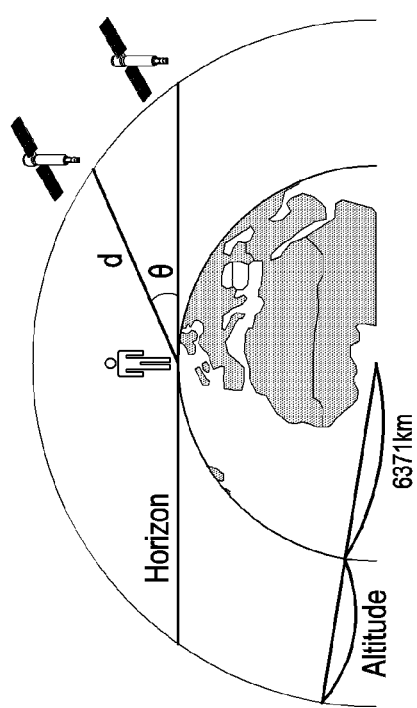
FIG. 29 is a diagram schematically illustrating an example of a difference in propagation delay time in a terrestrial network and propagation delay time in a satellite network in a communication system according to an embodiment of the disclosure.

FIG. 29 is a diagram schematically illustrating an example of a difference in propagation delay time in a terrestrial network and propagation delay time in a satellite network in a communication system according to an embodiment of the disclosure.

Referring to FIG. 29, in a terrestrial network, a distance between a terminal and a base station is considered to be, for example, up to about 100 km, and therefore, propagation delay time of 1 ms or less may occur between the terminal and the base station.

However, in a satellite network, a distance between the terminal and a satellite may be several thousand km, and a distance between the satellite and the base station may also be several thousand km, so propagation delay time in the satellite network may be much larger than propagation delay time in the terrestrial network.

Meanwhile, in a satellite network communication, propagation delay time may vary depending on an altitude and an elevation angle of the satellite. FIG. 29 shows a distance between the terminal and the satellite and delay time (e.g., round trip time (RTT)) it takes for a radio wave to travel back and forth according to an altitude angle in a case that an altitude of the satellite is, for example, 700 km. In the satellite network shown in FIG. 29, a low-orbit satellite is assumed, and therefore, it is shown that radio round trip time (radio RTT) may occur from 40.9 ms to 9.3 ms if an elevation angle is 0° to 180°. Here, the radio RTT may include RTT required for a signal to be transmitted/received between a transmitter and a receiver and a processing time at a counterpart node.

An example of applying a TA in a terrestrial network and a satellite network in a communication system according to various embodiments of the disclosure will be described with reference to FIG. 30.

Figure 30:
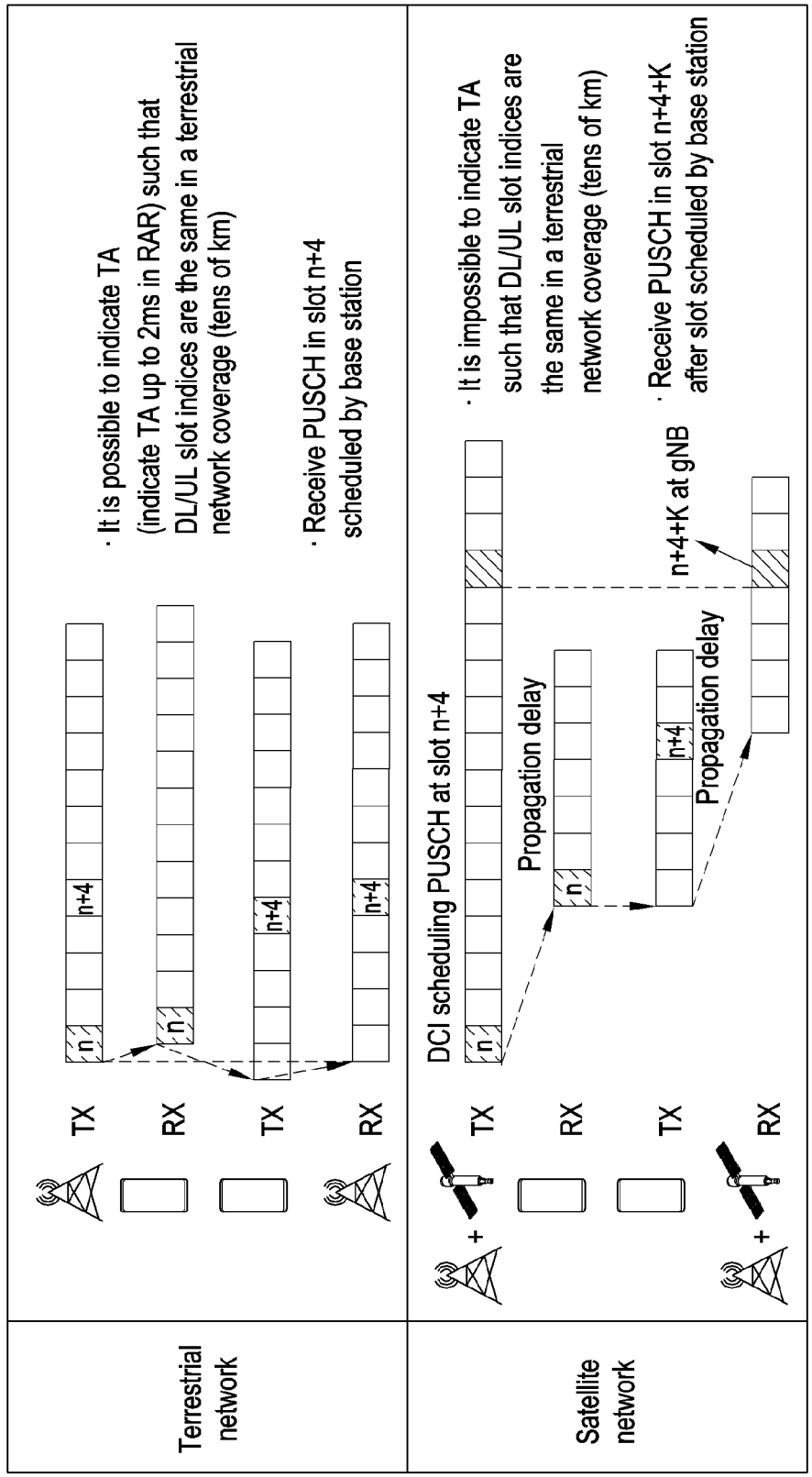
FIG. 30 is a diagram schematically illustrating an example of applying a TA in a terrestrial network and a satellite network in a communication system according to an embodiment of the disclosure.

FIG. 30 is a diagram schematically illustrating an example of applying a TA in a terrestrial network and a satellite network in a communication system according to an embodiment of the disclosure.

Referring to FIG. 30, maximum propagation delay time is within 1 or 2 ms in a terrestrial network, so slot timing at which a base station transmits a downlink signal and slot timing at which the base station receives an uplink signal may match based on a TA function provided by LTE and 5G NR systems. That is, a downlink slot index and an uplink slot index may match. That is, if a terminal transmits an uplink signal earlier than a downlink time point by a TA value indicated by a base station, when the uplink signal transmitted by the terminal is received by the base station, a time point at which the uplink signal is received coincides with the downlink time point of the base station. FIG. 30 shows a case that, in a terrestrial network, the base station indicates a TA value via an RAR, the terminal transmits a PUSCH signal in slot n+4 scheduled by the base station based on the TA value, and the base station receives the PUSCH signal transmitted by the terminal in the slot n+4.

Meanwhile, in a satellite network, it may be impossible to match a slot timing for a base station to transmit a downlink signal and a slot timing for the base station to receive an uplink signal based on a TA provided by LTE and 5G NR systems according to the related art. This is why propagation delay time that occurs in the satellite network is much longer than propagation delay time that occurs in a terrestrial network by tens of ms, and therefore, this propagation delay time is longer than a maximum value of a TA considered in the LTE and 5G NR systems according to the related art. FIG. 30 shows a case that, in the satellite network, it is impossible for the base station to indicate a TA value to the terminal, so the base station does not receive a PUSCH signal from the terminal in a slot n+4 scheduled by the base station, and receives the PUSCH signal transmitted from the terminal in slot a n+4+K delayed by K slots.

An example of a maximum RTT difference in a case that a plurality of terminals are located in one beam supported by a satellite in a communication system according to various embodiments of the disclosure will be described with reference to FIG. 31.

Figure 31:
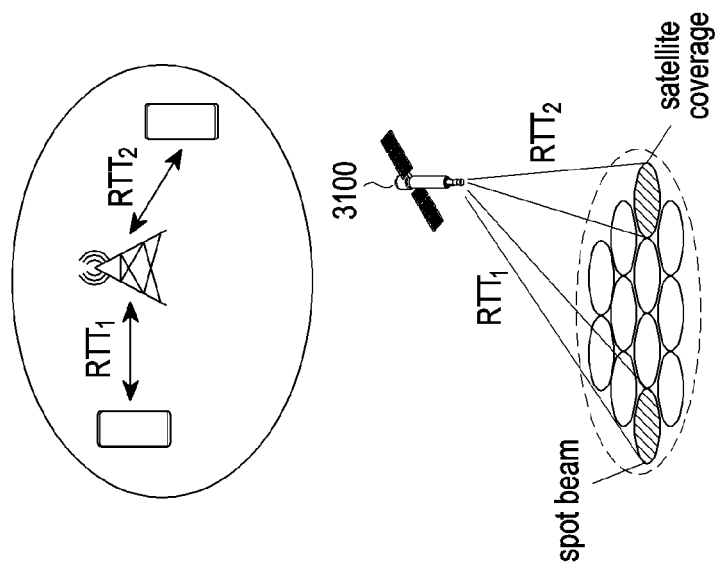
FIG. 31 is a diagram schematically illustrating an example of a maximum round trip time (RTT) difference in a case that a plurality of terminals are located in one beam supported by a satellite in a communication system according to an embodiment of the disclosure.

FIG. 31 is a diagram schematically illustrating an example of a maximum RTT difference in a case that a plurality of terminals are located in one beam supported by a satellite in a communication system according to an embodiment of the disclosure.

Referring to FIG. 31, a satellite 3100 may support a plurality of beams, and a plurality of terminals may be located in one of the plurality of beams supported by the satellite 3100. An example of a maximum difference value among difference values in RTT among a terminal, a satellite, and a base station is shown in FIG. 31.

As shown in FIG. 31, it may be seen that, in a satellite network, the smaller the beam size (for example, a beam diameter) is, the smaller the maximum difference value of the RTT according to an elevation angle experienced by a terminal is.

On the contrary, it may be seen that the maximum difference value of the RTT is reduced according to a radius of a cell in a terrestrial network.

An example of a radio RTT between a terminal and a base station which varies according to a movement of a satellite in a communication system according to various embodiments of the disclosure will be described with reference to FIG. 32A.

Figure 32A:
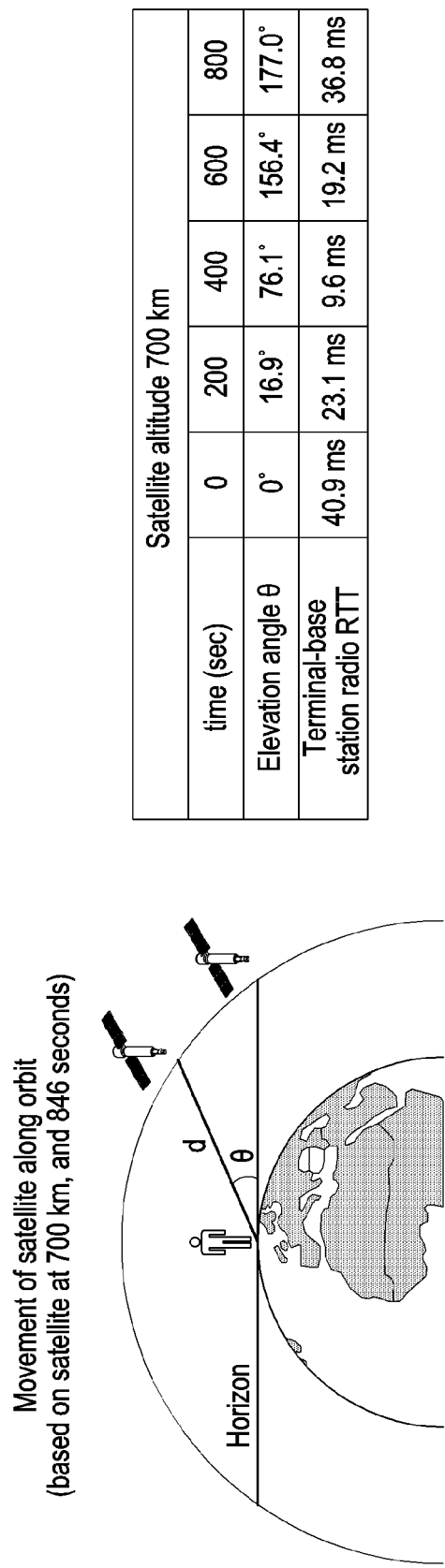
FIG. 32A is a diagram schematically illustrating an example of a radio RTT between a terminal and a base station which varies according to a movement of a satellite in a communication system according to an embodiment of the disclosure.

FIG. 32A is a diagram schematically illustrating an example of a radio RTT between a terminal and a base station which varies according to a movement of a satellite in a communication system according to an embodiment of the disclosure.

Referring to FIG. 32A, a satellite moves along an orbit, and RTT between a terminal and a base station may change according to the movement of the satellite. Referring to FIG. 32A, the satellite moves along the orbit, so the RTT between the terminal and the base station may change as time elapses. That is, it may be seen that, in a terrestrial network, although time elapses, in general, RTT between the terminal and the base station changes equal to or less than certain time, so change amount of the RTT between the terminal and the base station is small, whereas, in a satellite network, RTT between the terminal and the base station changes greatly according to a movement of the satellite as time elapses, so change amount of the RTT between the terminal and the base station is very large.

Meanwhile, a terminal may receive a signal from each of one or more GNSS satellites, calculate a location of the terminal based on the signal received from each of the one or more GNSS satellites, and identify reference time at each of the one or more GNSS satellites. If it is possible for the terminal to calculate a plurality of locations of the terminal based on signals received from a plurality of GNSS satellites, the terminal may calculate an actual location of the terminal based on an average of the plurality of locations, a location corresponding to a received signal with the strongest strength among the plurality of locations, an average value of the plurality of locations which is based on signal strength (for example, a method of applying a weight to a location corresponding to a signal whose signal strength is strong), and/or the like. Here, a scheme in which the terminal calculates the location of the terminal based on the signals received from the plurality of GNSS satellites may be implemented in various forms, and a detailed description thereof will be omitted.

As described above, the terminal may calculate time required for a signal to be transferred from an NTN satellite to the terminal based on the location of the terminal calculated by the terminal and a location of the NTN satellite received from the NTN satellite, and determine a TA value based on the time required for the signal to be transferred from the NTN satellite to the terminal. When the terminal determines the TA value, the terminal may consider a distance from the NTN satellite to a base station on the ground, and a distance from the NTN satellite to another NTN satellite in a case that the signal is transferred to the base station on the ground via the other NTN satellite.

Alternatively, the terminal may obtain reference time information from information transmitted by a GNSS satellite, compare time information transmitted by the NTN satellite with the reference time information obtained from the GNSS satellite, and calculate time (e.g., propagation delay) taken from the NTN satellite to the terminal based on the comparison result.

Second Embodiment

In a first embodiment of the disclosure, a scheme in which a terminal determines a TA value by itself, and applies the determined TA value to transmit an uplink signal has been described.

Contrary to this, a second embodiment of the disclosure provide a scheme in which a base station or a satellite indicates, to a terminal, a TA value to be applied when the terminal transmits an uplink signal to the base station or the satellite, and the terminal applies the indicated TA value to transmit an uplink signal.

A satellite may indicate, to a terminal, time offset information, for example, a TA value, based on the following methods, for example, methods 1 to 7, and the terminal may compensate for transmission time based on the time offset information indicated according to the following methods and perform a transmission/reception operation for a downlink signal or an uplink signal.

Hereinafter, detailed methods, i.e., the methods 1 to 7, for the satellite to indicate the time offset information, for example, the TA value, to the terminal will be described.

(1) Method 1

In Method 1, a size of a bit field for an indication range for propagation delay time, an indication of the propagation delay time or a TA value may be determined based on a frequency area or a frequency band (or spectrum). For example, an RAR MAC CE may include 12-bit TA information for a frequency area with a center frequency of 1 GHz or less, and include 16-bit TA information for a frequency area with a center frequency greater than 1 GHz.

(2) Method 2

A base station may indicate a rate of change of a TA.

A satellite moves regularly with time based on an orbit, so propagation delay time may change linearly in a specific time interval. Accordingly, a base station may indicate, to a terminal, how to change a TA in the future by indicating, to the terminal, propagation delay time or a rate of change of the TA.

A rate of change of a time offset (or the TA) may correspond to amount of change in a TA to be applied at a specific time point in the future. While indicating the rate of change of the time offset, the base station may configure, to the terminal, a time period and a time point for applying the rate of change of the time offset via L1 control information (e.g., DCI) or higher layer signaling. Alternatively, the base station may configure, to the terminal, the time period and the time point for applying the rate of change of the time offset via the L1 control information (e.g., the DCI) or the higher layer signaling before indicating the rate of change of the time offset. The higher layer signaling may be, for example, a MAC CE or RRC signaling rather than a physical layer signal.

(3) Method 3

In Method 3, a TA or a rate of change of the TA may be indicated to one or more terminals on a group basis (e.g., group-common) via the same DCI or the same MAC CE.

According to Method 3, the TA or the rate of change of the TA may be indicated to the one or more terminals via the same indication information field, or the TA or the rate of change of the TA may be indicated to each terminal via a different indication information field. If a TA or a rate of change of the TA is indicated to different terminals via different indication information fields, a location of a bit field which a corresponding terminal needs to interpret or an offset value of the location of the bit field may be pre-configured. The corresponding terminal may identify a value of the bit field to be applied to the corresponding terminal based on the location of the bit field or the offset value of the location of the bit field.

An example of an operation of indicating a TA in a group unit in a case that a plurality of terminals are located in one beam supported by one satellite in a communication system according to various embodiments of the disclosure will be described with reference to FIG. 32B.

Figure 32B:
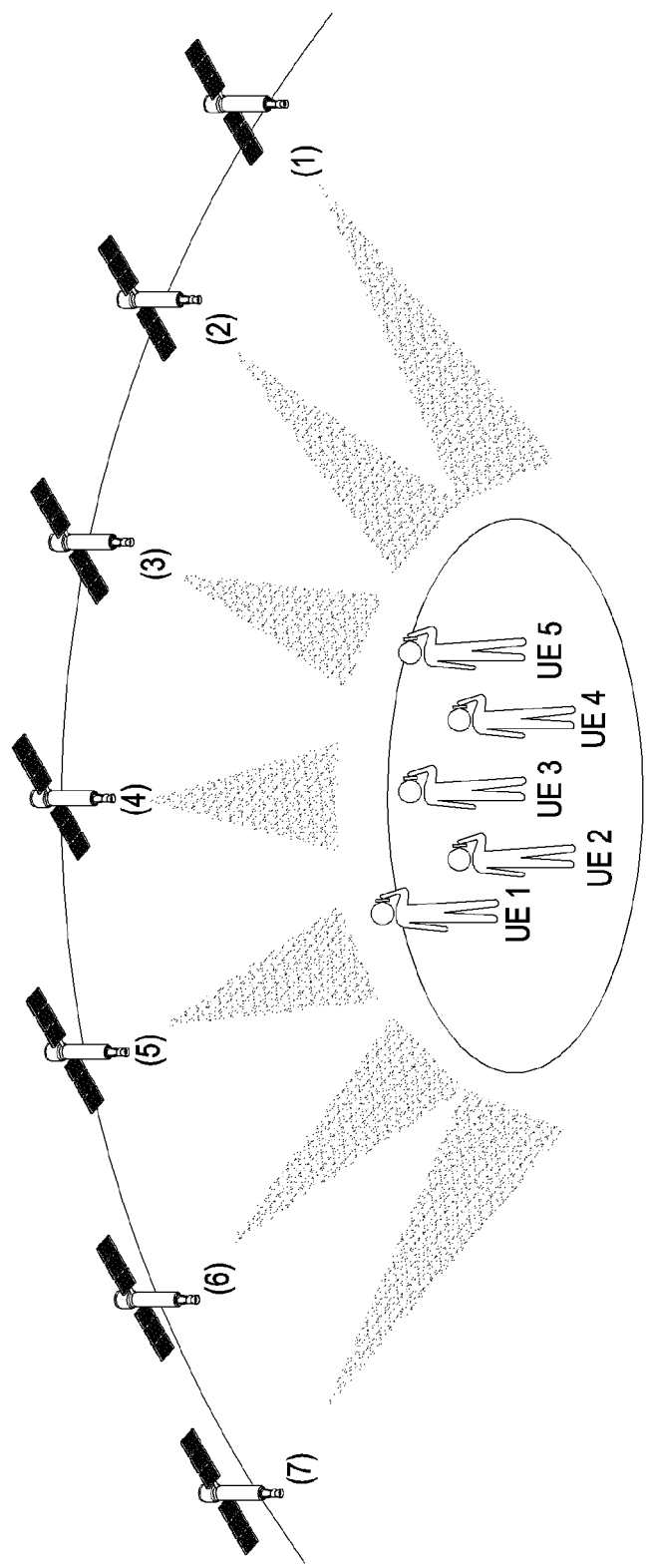
FIG. 32B is a diagram schematically illustrating an example of an operation of indicating a TA in a group unit in a case that a plurality of terminals are located in one beam supported by one satellite in a communication system according to an embodiment of the disclosure.

FIG. 32B is a diagram schematically illustrating an example of an operation of indicating a TA in a group unit in a case that a plurality of terminals are located in one beam supported by one satellite in a communication system according to an embodiment of the disclosure.

Referring to FIG. 32B, terminals located within one beam provided by one satellite transmit and receive signals to and from the same satellite, so propagation delay time and change values of Doppler shift of the terminals may be similar. Therefore, terminals, for example, a UE1, a UE2, a UE3, a UE4, and a UE5 which are located in one beam in FIG. 32B may perform a time offset compensation operation for compensating for propagation delay time or TA values based on the same indication information.

An example of an operation of indicating a time offset to terminals included in one group in a communication system according to various embodiments of the disclosure will be described with reference to FIG. 32C.

Figure 32C:
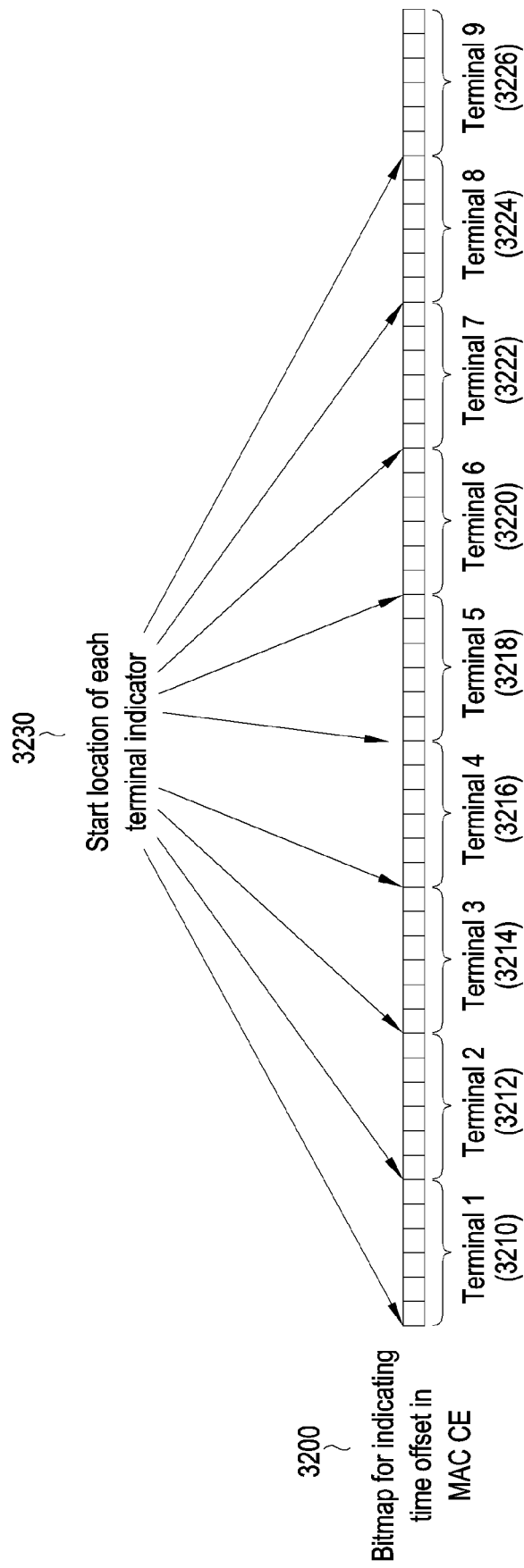
FIG. 32C is a diagram schematically illustrating an example of an operation of indicating a time offset to terminals included in one group in a communication system according to an embodiment of the disclosure.

FIG. 32C is a diagram schematically illustrating an example of an operation of indicating a time offset to terminals included in one group in a communication system according to an embodiment of the disclosure.

Referring to FIG. 32C, a case that a time offset is indicated to a plurality of terminals included in one group by using, for example, one MAC CE is illustrated.

Referring to FIG. 32C, if a time offset is indicated to terminals 3210, 3212, 3214, 3216, 3218, 3220, 3222, 3224, and 3226 included in one group in a group unit by using the same MAC CE 3200, the same MAC CE 3200 may include time offset indication information, for example, a time offset indicator for the terminals 3210, 3212, 3214, 3216, 3218, 3220, 3222, 3224, and 3226. Here, a start location 3230 of a time offset indicator for each terminal may be configured in advance via higher layer signaling.

In addition, time offset indication information may be transmitted to terminals in a group unit via DCI as well as a MAC CE. At this time, a bit field indicating a plurality of TAs may be a part of the DCI. For example, a DCI format including the bit field indicating the plurality of TAs may be used. In this case, the terminals in a group may perform blind decoding by using a value of an RNTI which is predefined or configured by higher layer signaling.

(4) Method 4

In Method 4, a TA value to be commonly applied by a terminal which corresponds to a specific beam may be indicated in system information via an SIB. For example, a time offset TA_offset may be calculated as TA_offset1+ TA_offset2, where TA_offset1 may be a value commonly configured or indicated to terminals belonging to a corresponding beam, and TA_offset2 may be a value configured or indicated to a specific terminal. Here, TA_offset2 may be configured by using at least one of Methods 1 to 3.

(5) Method 5

In Method 5, a base station may configure a unit of a time offset to a terminal via RRC configuration. If the base station indicates the unit of the time offset via the RRC configuration and indicates the number of units of the time offset via a MAC CE or DCI, the terminal may calculate an accurate time offset value by using the unit of the time offset.

Alternatively, the base station may indicate candidate values of the unit of the time offset via RRC configuration, and indicate one of the candidate values via MAC CE or DCI. Here, the candidate values of the unit of the time offset may be configured via RRC signaling within a predetermined range. If one candidate value is configured as the candidate values of the unit of the time offset, even though the base station does not transmit additional information via the MAC CE or DCI, the terminal may calculate an accurate time offset value by applying the configured one candidate value.

(6) Method 6

In Method 6, a time offset value may be configured to a terminal via RRC configuration. Alternatively, the time offset value may be delivered to the terminal based on a combination of the RRC configuration and a MAC CE.

(7) Method 7

In Method 7, a base station may indicate, to a terminal via an SIB, a time offset value (or a TA value, or a common TA value) to be applied by the terminal. In Method 7, the base station may transmit, via, for example, the SIB, the common TA value. Alternatively, the base station may transmit location information of a satellite and reference location information, so the terminal may calculate a distance between the satellite and a reference location based on the location information of the satellite and the reference location information, and calculate the common TA value based on the calculated distance between the satellite and the reference location. Here, the common TA value may be calculated as follows.

common *TA*=(distance between satellite and reference location)×2/speed of light The common TA value may be RTT required for a radio wave to travel back and forth between the satellite and the reference location.

Alternatively, by informing reference time used by the satellite, the terminal may calculate the common TA value based on time of a GNSS system.

In various embodiments of the disclosure, time obtained from a GNSS or time of a base station transmitted by the base station may be based on, for example, coordinated universal time (UTC) time, which may be based on time from 00:00:00 on Jan. 1, 1900 of a Gregorian calendar. The time obtained from the GNSS or the time of the base station transmitted by the base station may vary depending on a type of a GNSS system, and a reference time zone as shown in Table 21 below may be used.

TABLE 21 gnss-DayNumber
This field specifies the sequential number of days (with day count starting at 0) from the origin of the GNSS System Time as follows:
    GPS, QZSS, SBAS - Days from January $6^{th}$ 1980 00:00:00 UTC (USNO);
    Galileo - Days from Galileo System Time (GST) start epoch, defined as 13 seconds before midnight between $21^{st}$ August and $22^{nd}$ August 1999; i.e., GST was equal to 13 seconds at August $22^{nd}$ 1999 00:00:00 UTC;
    GLONASS - Days from December $31^{st}$ 1995 21:00:00 UTC (SU), which is local UTC Moscow
    January $1^{st}$ 1996 00:00:00, defined as UTC(SU) +
3 hours in [9];
    BDS - Days from January $1^{st}$ 2006 00:00:00 UTC (NTSC).
    NavIC - Days from NavIC System Time start epoch, defined as 13 seconds before midnight between 21st
    August and 22nd August 1999; i.e., NavIC System Time was equal to 00:00:00 at August 21st, 1999
    23:55:47 UTC (BIPM).

In Table 21, NavIC may represent NAVigation with Indian Constellation, QZS may represent Quasi Zenith Satellite, QZSS may represent Quasi-Zenith Satellite System, QZST may represent Quasi-Zenith System Time, SBAS may represent Space Based Augmentation System, and BDS may represent BeiDou Navigation Satellite System.

In addition, the base station may indicate, via a satellite, the type of the GNSS system as a reference for a location or time information used by the base station, and may use an indicator as shown in Table 22 below.

TABLE 22

| Value of gnss-TO-ID | Indication |
|---|---|
| 1 | GPS |
| 2 | Galileo |
| 3 | QZSS |
| 4 | GLONASS |
| 5 | BDS |
| 6 | NavIC |
| 7-15 | reserved |

Meanwhile, Methods, i.e., Methods 1 to 7 presented in the second embodiment of the disclosure are not in an alternative relationship to each other, and at least two of Methods 1 to 7 may be used in combination.

Third Embodiment

In a first embodiment of the disclosure, a scheme in which a terminal determines a TA value by itself and applies the determined TA value to transmit an uplink signal has been described.

In a second embodiment of the disclosure, a scheme in which a base station or a satellite indicates, to a terminal, a TA value to be applied when the terminal transmits an uplink signal to the satellite or the base station, and the terminal applies the indicated TA value to transmit the uplink signal has been described.

A third embodiment of the disclosure provides a scheme in which a terminal adaptively determines a TA value to be applied when the terminal transmits an uplink signal to a satellite or a base station. More specifically, the third embodiment of the disclosure provides a scheme in which the terminal adaptively selects one of a method in which the terminal determines the TA value by itself as described in the first embodiment of the disclosure, and a method in which the satellite or the base station indicates the TA value to the terminal and the terminal applies the indicated TA value as described in the second embodiment of the disclosure, and determines the TA value based on the adaptively selected method. In the third embodiment of the disclosure, whether the TA value is determined by the method according to the first embodiment or the method according to the second embodiment may be selected in consideration of various parameters of a communication system.

In various embodiments of the disclosure, a method in which a terminal calculates a TA value by itself based on a location of the terminal and applies the calculated TA value, i.e., a method for determining a TA value according to the first embodiment will be referred to as First Method, and a method in which a base station indicates a TA value or the base station transfers a reference location value and a terminal calculates a TA values, i.e., a method for determining a TA value according to the second embodiment will be referred to as Second Method.

Hereinafter, Methods, i.e., Method A1 to Method A5 according to the third embodiment of the disclosure will be described.

(1) Method A1

In Method A1, a terminal basically applies a TA based on Second Method, but if a value of a bit field indicated by a base station for Second Method is 0, the terminal calculates the TA based on First Method and applies the calculated TA. That is, in Method A1, a default TA determination method is Second Method, and First Method is used if necessary.

(2) Method A2

In Method A2, whether a terminal determines a TA based on First Method or Second Method may be indicated via an SIB, RRC configuration, or one-bit field in DCI. For example, a base station may indicate whether a TA source is a GNSS or indicated, that is, whether the TA source is the base station or a satellite via the SIB.

(3) Method A3

In Method A3, a base station transmits information related to use of First Method and Second Method via an SIB, and a terminal adaptively selects one of First Method and Second Method according to a capability of the terminal to determine a TA value. For example, if the terminal does not have a capability to directly calculate a TA by using a GNSS, the terminal may apply the TA via indication of the base station based on Second Method.

(4) Method A4

In Method A4, a TA value is determined by adaptively selecting one of First Method and Second Method based on reliability of a GNSS signal. For example, if a terminal identifies that the reliability of the GNSS signal is low, the terminal may use Second Method in which the terminal applies a TA based on indication of a base station instead of First Method in which the terminal directly calculates the TA based on the GNSS signal.

In various embodiments of the disclosure, reliability of a GNSS may be identified based on strength of a GNSS signal, and/or the like. That is, in Method A4, a terminal may determine a TA as described in Table 23 below.

TABLE 23

If GNSS is reliable,
    then the UE performs auto-compensation. (a case that First Method is applied)
Else,
    then the UE performs TA according to gNB indication. (a case that Second Method is applied)

Meanwhile, one of First Method and Second Method may be selected based on whether the GNSS is configured as well as the reliability of the GNSS. A procedure for adaptively selecting one of First Method and Second Method based on whether the GNSS is configured is shown in Table 24. That is, in Method A4, as described in Table 24, the terminal may determine a TA.

TABLE 24

If GNSS is reliable and configured,
    then the UE performs auto-compensation. (a case that First Method is applied)
Else,
    then the UE performs TA according to gNB indication. (a case that Second Method is applied)

(5) Method A5

In Method A5, a terminal may apply a TA in a form in which First Method and Second Method are combined. Various parameters may be considered for the form in which First Method and Second Method are combined. For example, the terminal may perform uplink transmission operation by applying a TA value provided from a base station or a satellite (in a case that Second Method is applied), and calculating a distance between a location of the terminal and a reference location, further determining an additional TA value other than the TA value provided from the base station or the satellite based on the distance between the location of the terminal and the reference location, and further applying the additional TA value (in a case that First Method is applied).

(6) Method A6

In Method A6, a terminal adaptively selects one of First Method and Second Method according to whether a serving cell which the terminal currently receives a signal is provided via a satellite network or a terrestrial network to determine a TA value.

In a first embodiment of the disclosure, a scheme in which a terminal determines a TA value by itself and applies the determined TA value to transmit an uplink signal has been described. In a second embodiment of the disclosure, a scheme in which a base station or a satellite indicates, to a terminal, a TA value to be applied when the terminal transmits an uplink signal to the satellite or the base station, and the terminal applies the indicated TA value to transmit the uplink signal has been described. Here, it has been described that a method for determining a TA value according to the first embodiment of the disclosure is First Method, and a method for determining a TA value according to the second embodiment of the disclosure is Second Method.

For example, in First Method, a TA applied when a terminal transmits a PRACH preamble may be a first value, for example, a value greater than zero (0), and in Second Method, the TA applied when the terminal transmits the PRACH preamble may be a second value, for example, may be 0. For example, if the terminal transmits the PRACH preamble in a terrestrial network, the TA is assumed to be 0. Alternatively, if the terminal transmits the PRACH preamble in a satellite network, the TA is assumed to be greater than 0. Here, the TA value greater than 0, i.e., the first value may be a value directly calculated by the terminal based on information of the satellite network.

Accordingly, for example, in a case of a serving cell provided via the satellite network, the terminal applies a TA by itself according to the first embodiment (or First Method) to transmit an uplink signal including a PRACH preamble and an msg3. In a case of a serving cell provided via the terrestrial network, the terminal transmits an uplink signal including an msg3 according to a TA indicated by the base station according to the second embodiment (or Second Method), and transmits a PRACH preamble while assuming that the TA is 0.

In various embodiments of the disclosure, a method for a terminal to determine whether a serving cell is a serving cell provided via a satellite network or a serving cell provided via a terrestrial network may be implemented in various forms. For example, the terminal may identify whether the serving cell is the serving cell provided via the satellite network or the serving cell provided via the terrestrial network according to a frequency, an SIB, or an explicit indicator.

For example, if it is assumed that an SIB providing parameters necessary for satellite network transmission and reception is an SIB-NTN or SIB-xx, when the SIB-NTN or SIB-xx is provided from a base station in a corresponding serving cell, the terminal may identify that the corresponding serving cell is a serving cell provided from a satellite network. Alternatively, if the SIB-NTN or SIB-xx is not provided from the base station in the corresponding serving cell, the terminal may identify that the corresponding serving cell is a serving cell provided from a terrestrial network.

For another example, as an explicit indicator, a parameter indicating whether a serving cell of a terminal is an NTN network (or a satellite network) or a terrestrial network may be transmitted via an SIB. Here, the parameter indicating whether the serving cell is the NTN network or the terrestrial network may be implemented by, for example, a set number of bits, for example, one bit. Here, it will be assumed that the parameter indicating whether the serving cell is the NTN network or the terrestrial network is implemented by 1 bit. A base station may set a value of the parameter to, for example, 1 if the base station itself transmits a signal to the terminal via the satellite network or receives a signal from the terminal via the satellite network. The base station may set a value of the parameter to, for example, 0 if the base station transmits and receives a signal to and from the terminal via the terrestrial network, not the satellite network.

Then, the terminal receives the parameter, and if the value of the parameter is 1, the terminal may identify that the serving cell is a serving cell provided via the satellite network. If the value of the parameter is 0, the terminal may identify that the serving cell is a serving cell provided via the terrestrial network. Here, the parameter may be a parameter transmitted via an MIB or an SIB. Alternatively, the terminal may receive at least one of an MIB, a PBCH, a synchronization signal, or an SIB, and identify a parameter value based on the at least one of the received MIB, PBCH, synchronization signal, or SIB.

Meanwhile, in various embodiments of the disclosure, transmitting and receiving a signal via a satellite (or a satellite network) may include a case that a signal transmitted by a terminal is transferred to the satellite, and the signal is transferred from the satellite to a base station, and a case that a signal transmitted by the base station is transferred to the satellite and the signal is transferred from the satellite to the terminal.

Fourth Embodiment

In a first embodiment of the disclosure, a scheme in which a terminal determines a TA value by itself and applies the determined TA value to transmit an uplink signal has been described.

In a second embodiment of the disclosure, a scheme in which a base station or a satellite indicates, to a terminal, a TA value to be applied when the terminal transmits an uplink signal to the satellite or the base station, and the terminal applies the indicated TA value to transmit the uplink signal has been described.

In a third embodiment of the disclosure, a scheme in which a terminal adaptively determines a TA value to be applied when the terminal transmits an uplink signal to a satellite or a base station has been described.

A fourth embodiment of the disclosure provides a scheme in which a terminal reports (or transfers) information about an applied TA to a base station or a satellite.

First, a terminal may perform an operation of transferring, to a base station, information related to a TA value applied by the terminal or a method used for the terminal to determine the TA value. This is to notify the base station of the TA value applied by the terminal if the terminal determines and applies the TA value by itself without a separate indication from the base station, or to check or identify how the terminal applies the TA value indicated by the base station. For example, if a satellite connected to the terminal is changed, this operation may be performed so that the satellite newly connected to the terminal may check the TA value of the terminal. Meanwhile, the terminal may report, to the base station, information about a method of determining the TA value applied by the terminal. For example, the terminal may report, to the base station, information about whether the terminal determines the TA by First Method or Second Method.

More specifically, the terminal may transfer, to the base station, information such as a type of a GNSS satellite used by the terminal in a process of calculating the TA value, a satellite number of the GNSS satellite, and/or the like. For example, the terminal may report, to the base station, whether the terminal uses a GPS system, a GLONASS system of Russia, a Galileo system of the EU, or a Beidou system of China. In this case, by reporting an index of a GNSS system as shown in Table 25 below, the terminal may repot a type of the GNSS system which is a reference for a location or time information used by the terminal itself, and the following indicator may be used.

TABLE 25

| Value of gnss-TO-ID | Indication |
|---|---|
| 1 | GPS |
| 2 | Galileo |
| 3 | QZSS |
| 4 | GLONASS |
| 5 | BDS |
| 6 | NavIC |
| 7-15 | reserved |

In the fourth embodiment of the disclosure, a terminal may report, to a base station, a TA value or information about a method used for determining the TA value based on the following Method B1 to Method B6.

In addition, the terminal may report, to the base station, the TA value or the information about the method used for determining the TA value based on a combination of at least two of the following Method B1 to Method B6.

(1) Method B1

In Method B1, a base station may trigger TA value reporting of a terminal via DCI. The base station may trigger the TA value reporting via, for example, some bit field values of the DCI or a combination of values of bit fields of the DCI. A field indicating the triggering of the TA value reporting may be included in the DCI. In this case, the terminal may identify that the TA value reporting is triggered if the field in received DCI is set to a specific value. Alternatively, if a value of at least one field (for example, for a different use) included in the received DCI is set to a predetermined value, the terminal may identify that the TA value reporting is triggered. In addition, the terminal may transfer, to the base station, a TA value at a specific time point based on a time point at which the terminal receives the DCI.

(2) Method B2

In Method B2, a base station may trigger TA value reporting of a terminal via a MAC CE. The base station may trigger the TA value reporting by using some bit values or a value of a bit field of the MAC CE, and the terminal may report, to the base station, a TA value at a time point at which the terminal receives the MAC CE or a TA value at a time point after certain time from the time point at which the terminal receives the MAC CE.

(3) Method B3

In Method B3, a base station may indicate which TA value a terminal needs to report via RRC configuration. For example, the base station may include information about a period and an offset value for TA reporting or/and a specific condition in which the terminal reports a TA value into higher layer signaling, so the terminal may at which time point to report the TA value. In this case, the base station may also designate reference TA value application time (i.e., time to which a TA value to be reported is applied) (Hereinafter, referred to as "TA value reference time point").

The specific condition for the terminal to report the TA value may be, for example, a case in which the TA value is greater than or equal to a threshold TA value, or a case in which a distance between the terminal and a satellite is longer than or equal to a threshold distance. Information about the threshold TA value or the threshold distance may be configured via higher layer signaling or transmitted via an SIB, etc., or may be fixed information. For another example, the specific condition for the terminal to report the TA value may be a case in which the TA value is greater than or equal to the threshold TA value, and the distance between the terminal and the satellite is longer than or equal to the threshold distance. The specific condition for the terminal to report the TA value may be implemented in various forms depending on a situation of a communication system.

(4) Method B4

In Method B4, a terminal may report a TA value without a separate trigger from a base station. For example, Method B4 may be that the terminal transmits information indicating the TA value to the base station according to a specific condition. The specific condition is a condition for time for performing TA value reporting, a comparison result for a TA value applied by the terminal and a specific threshold value, and/or the like. The specific condition may be predetermined. Here, the specific condition is a condition configured for the terminal to report a TA value to the base station without signaling such as DCI, a MAC CE, RRC, etc. for a separate trigger from the base station. Various parameters as well as the time for performing TA value reporting, the comparison result for the TA value applied by the terminal and the specific threshold value, and/or the like as described above may be considered for the specific condition.

(5) Method B5

In Method B5, a terminal may report, to a base station, information related to a method used when the terminal calculates a TA value to be applied by the terminal. For example, the terminal may report, to the base station, whether 1) the TA value to be applied by the terminal is set to a value indicated by the base station or 2) the terminal directly calculates and determines the TA value to be applied by the terminal based on a GNSS signal. That is, in Method B5, the terminal may report, to the base station, whether the TA value is determined by using First Method or the TA value is determined by using Second Method.

(6) Method B6

In Method B6, if a terminal calculates and applies a TA value based on a signal received from a GNSS, the terminal may report, to a base station, information about the GNSS or information related to a type of information received from the GNSS.

As described in the fourth embodiment of the disclosure, if a terminal transmits a TA value based on at least one of Method B1 to Method B6, the terminal may transmit the TA value by using a physical channel such as a PUCCH, a PUSCH, and/or the like, or may report, to the base station, the TA value via higher layer signaling. If the terminal reports the TA value to the base station by using the physical channel, information related to a resource to be used for reporting the TA value may be transferred to the terminal via higher layer signaling.

Meanwhile, a reference time point for determining a TA value reported by a terminal and a time point for reporting the TA value may be determined based on a time at which the terminal performs TA value reporting, a time point at which the TA value reporting is triggered, and/or the like.

For example, if the TA value reporting is triggered via DCI in a slot n, the terminal may report a TA value applied or calculated in a slot n−K to the base station. The terminal may report, to the base station, the TA value in a slot n+N. Here, each of K and N may be a value which is determined according to subcarrier spacing or a UE capability, DL/UL configuration of slots, PUCCH resource configuration, and/or the like.

Also, K may be zero (K=0). Here, that K is 0 (K=0) may mean that the terminal reports the TA value based on a time point at which the terminal receives a signal triggering the TA value reporting. Alternatively, K may be a value smaller than 0. This case may mean, for example, that the terminal pre-calculates a TA value at a time point at which the terminal reports the TA value, and generates report information based on the TA which is pre-calculated to report the report information. In addition, K may be a value greater than 0. This may mean that the terminal reports a TA value at a time point before a time point (e.g., the slot n+N) at which the terminal reports the TA value, and this is because there is a need for time required for the terminal to encode information to be reported and prepare transmission.

An operating process of a terminal and an operating process of a base station according to various embodiments of the disclosure will be described with reference to FIGS. 33A and 33B.

Figure 33A:
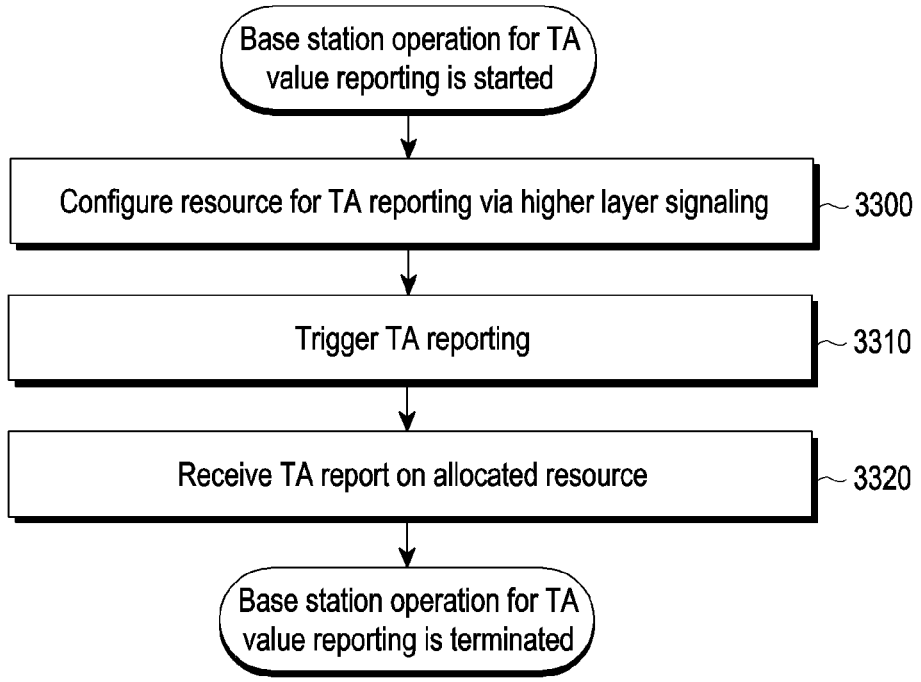
FIG. 33A is a diagram schematically illustrating an example of an operating process of a base station in a communication system according to an embodiment of the disclosure.
Figure 33B:
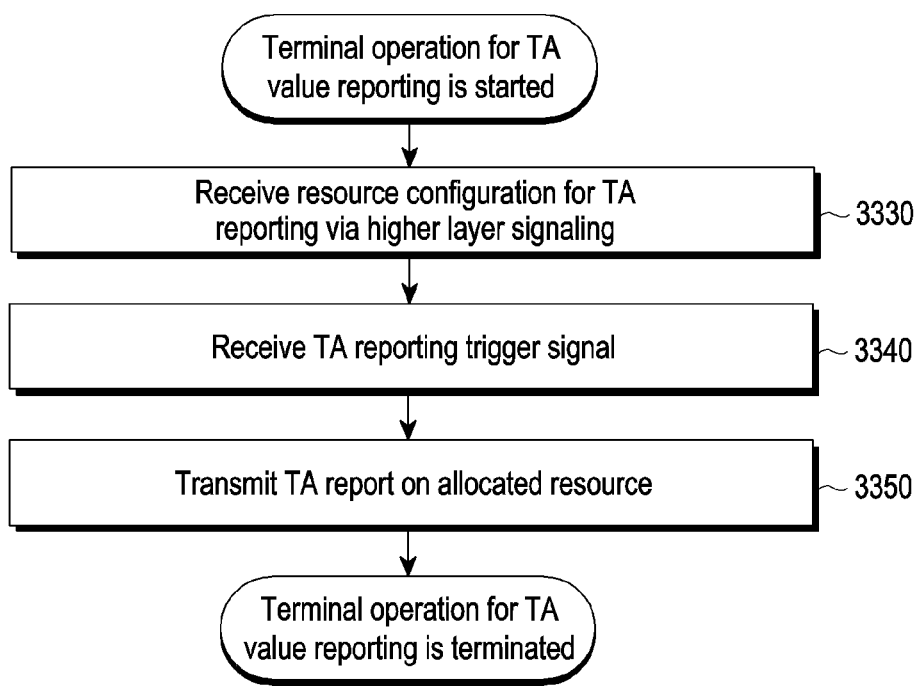
FIG. 33B is a diagram schematically illustrating an example of an operating process of a terminal in a communication system according to an embodiment of the disclosure.

Prior to description of FIGS. 33A and 33B, it will be noted that the operating process of the terminal and the operating process of the base station shown in FIGS. 33A and 33B are the operating process of the terminal and the operating process of the base station related to a case that the terminal reports a TA value according to the fourth embodiment. Prior to description of FIGS. 33A and 33B, in the disclosure, if the terminal reports the TA value, the TA value applied by the terminal may be indicated in ms units, slot units, symbol units, and/or the like, or may be indicated in a form including a value after a decimal point rather than an integer. In the disclosure, a case that the terminal reports, for example, an absolute value of the TA value if the terminal reports the TA value will be described, however, the terminal may also report a TA value indicated from a previous base station, a relative TA value excluding a determined TA value, or amount of change in a TA value (this may be, for example, the amount of change in the TA value for certain time).

An example of an operating process of a base station in a communication system according to various embodiments of the disclosure will be described with reference to FIG. 33A.

FIG. 33A is a diagram schematically illustrating an example of an operating process of a base station in a communication system according to an embodiment of the disclosure.

Referring to FIG. 33A, a base station transmits configuration information related to TA reporting via higher layer signaling at operation 3300. Here, the configuration information related to TA reporting may include, for example, at least one of information for configuring TA reporting such as a period and an offset at which TA reporting is to be performed, a TA reporting trigger condition, TA reference time information, a type of TA to be reported, configuration information about a resource on which TA reporting is to be performed, and/or the like. The information for configuring TA reporting such as the period and the offset at which TA reporting is to be performed, the TA reporting trigger condition, the TA reference time information, the type of TA to be reported, the configuration information about the resource on which TA reporting is to be performed, and/or the like has been described in the fourth embodiment, so a detailed description thereof will be omitted.

The base station triggers TA reporting to the terminal at operation 3310. Here, the TA reporting trigger for the terminal may be performed, for example, via higher layer signaling or DCI, but may be omitted if necessary.

The base station receives a TA report transmitted by the terminal based on the transmitted configuration information related to TA reporting at operation 3320.

An example of an operating process of a terminal in a communication system according to various embodiments of the disclosure will be described with reference to FIG. 33B.

FIG. 33B is a diagram schematically illustrating an example of an operating process of a terminal in a communication system according to an embodiment of the disclosure.

Referring to FIG. 33B, a terminal receives configuration information related to TA reporting transmitted by a base station via higher layer signaling at operation 3330. The configuration information related to TA reporting may include, for example, at least one of information for configuring TA reporting such as a period and an offset at which TA reporting is to be performed, a TA reporting trigger condition, TA reference time information, a type of TA to be reported, configuration information about a resource on which TA reporting is to be performed, and/or the like. The information for configuring TA reporting such as the period and the offset at which TA reporting is to be performed, the TA reporting trigger condition, the TA reference time information, the type of TA to be reported, the configuration information about the resource on which TA reporting is to be performed, and/or the like has been described in the fourth embodiment, so a detailed description thereof will be omitted.

The terminal receives a signal triggering TA reporting which is transmitted by the base station at operation 3340. The signal triggering TA reporting may be transmitted, for example, via the higher layer signaling or DCIs, but may be omitted if necessary.

The terminal transmits a TA report based on the received configuration information related to TA reporting at operation 3350. For example, if the terminal receives the configuration information about the resource on which TA reporting is to be performed, the terminal transmits the TA report on a resource which corresponds to the configuration information about the resource on which TA reporting is to be performed.

Meanwhile, an order of operations shown in FIGS. 33A and 33B may be changed, other operations may be added to the operations, and at least one of the operations may be omitted.

In the above, for convenience of explanation, a method and apparatus for adjusting uplink timing based on a TA in a communication system according to various embodiments of the disclosure have been described separately from a first embodiment to a fourth embodiment, however, the first to fourth embodiments include operations related to each other, so at least two of the first to fourth embodiments may be combined. In addition, methods according to embodiments may not be mutually exclusive, and at least two of the methods may be combined and performed.

Each of a base station, a satellite, and a terminal for performing embodiments of the disclosure may be a transmitting end or a receiving end, each of the base station, the satellite, and the terminal may include a receiver, a processor, and a transmitter, and each of the base station, the satellite, and the terminal operates according to embodiments of the disclosure.

An internal structure of a terminal according to various embodiments of the disclosure is described below with reference to FIG. 34.

Figure 34:
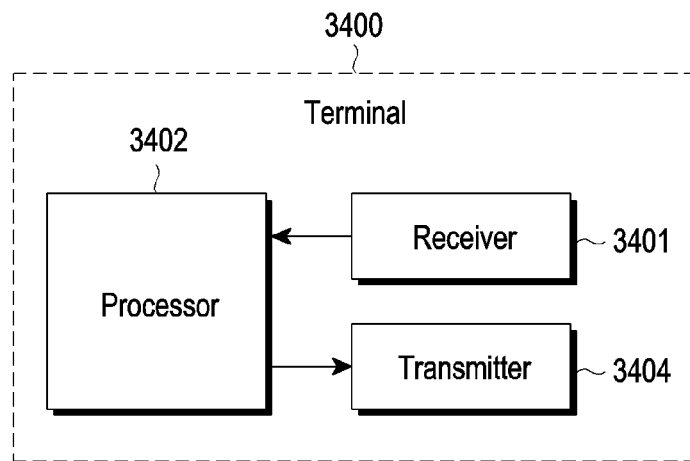
FIG. 34 is a block diagram schematically illustrating an internal structure of a terminal according to an embodiment of the disclosure.

FIG. 34 is a block diagram schematically illustrating an internal structure of a terminal according to an embodiment of the disclosure.

Referring to FIG. 34, a terminal 3400 may include a receiver 3401, a transmitter 3404, and a processor 3402. The receiver 3401 and the transmitter 3404 may collectively be referred to as a transceiver according to an embodiment.

The transceiver may transmit/receive signals to/from a base station. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 3402, and transmit signals output from the processor 3402 via a radio channel.

The processor 3402 may control a series of processes for the terminal 3400 to operate according to the above-described embodiments. The processor 3402 may perform overall operations related to an operation of adjusting uplink timing based on a TA as described in the first embodiment to the fourth embodiment. For example, the receiver 3401 may receive a signal from a satellite or a terrestrial base station, and the processor 3402 may control the transmitter 3404 to transmit a signal to the base station and control the receiver 3401 to receive a signal from the base station. Further, the transmitter 3404 may transmit a determined signal at a determined time point.

An internal structure of a satellite according to various embodiments of the disclosure is described below with reference to FIG. 35.

Figure 35:
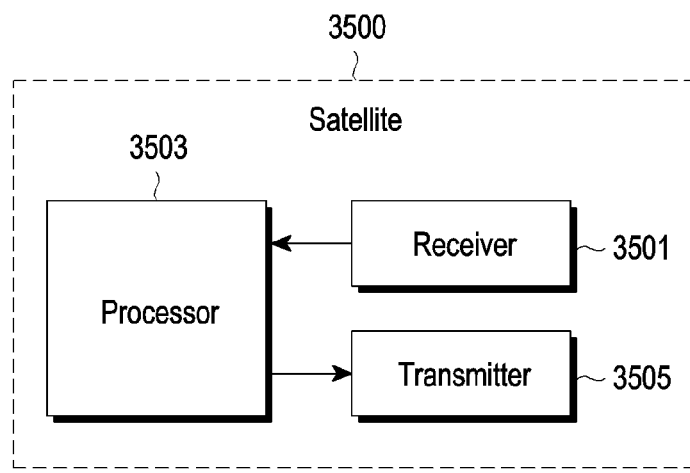
FIG. 35 is a block diagram schematically illustrating an internal structure of a satellite according to an embodiment of the disclosure.

FIG. 35 is a block diagram schematically illustrating an internal structure of a satellite according to an embodiment of the disclosure.

Referring to FIG. 35, a satellite 3500 may include a receiver 3501, a transmitter 3505, and a processor 3503. FIG. 35 shows a case in which a receiver, a transmitter, and a processor are implemented in the singular form such as the receiver 3501, the transmitter 3505, and the processor 3503 for convenience of explanation, but the receiver, the transmitter, and the processor may be implemented in the plural form. For example, a receiver and a transmitter for receiving and transmitting signals from and to a terminal, and a receiver and a transmitter for receiving and transmitting signals from and to a base station may be implemented. Further, a receiver and a transmitter for receiving and transmitting signals from and to another satellite may be implemented.

The receiver 3501 and the transmitter 3505 may collectively be referred to as a transceiver according to an embodiment.

The transceiver may transmit/receive signals to/from the terminal and the base station. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 3503, and transmit signals output from the processor 3503 via a radio channel.

The processor 3503 may include a compensator (or a pre-compensator) for compensating for a frequency offset or Doppler shift, and a device for estimating a location from a GPS, and/or the like. The processor 3503 may include a frequency shift function which may shift a central frequency of a received signal. The processor 3503 may control a series of processes for the satellite 3500, the base station, and the terminal to be able to operate according to the above-described embodiments. The processor 3503 may perform overall operations related to an operation of adjusting uplink timing based on a TA as described in the first embodiment to the fourth embodiment. For example, the processor 3503 may control the receiver 3501 to receive, from the terminal, a PRACH preamble, and control the transmitter 3505 to transmit, to the terminal, an RAR in response to the RAR, and to transmit TA information to the base station. The transmitter 3505 may transmit corresponding signals at a determined time point.

An internal structure of a base station according to various embodiments of the disclosure is described below with reference to FIG. 36.

Figure 36:
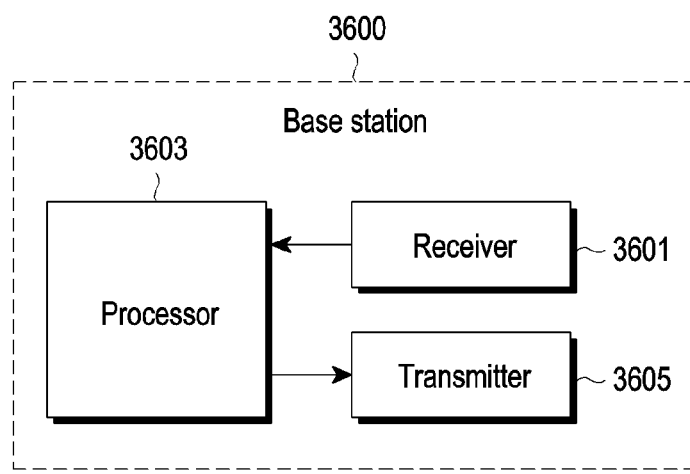
FIG. 36 is a block diagram schematically illustrating an internal structure of a base station according to an embodiment of the disclosure.

FIG. 36 is a block diagram schematically illustrating an internal structure of a base station according to an embodiment of the disclosure.

Referring to FIG. 36, a base station 3600 may include a receiver 3601, a transmitter 3605, and a processor 3603. The base station 3600 may be a terrestrial base station or a part of a satellite. The receiver 3601 and the transmitter 3605 may collectively be referred to as a transceiver according to an embodiment.

The transceiver may transmit/receive signals to/from a terminal. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 3603, and transmit signals output from the processor 3603 via a radio channel.

The processor 3603 may control a series of processes for the base station 3600 to be able to operate according to the above-described embodiments. The processor 3603 may perform overall operations related to an operation of adjusting uplink timing based on a TA as described in the first embodiment to the fourth embodiment. For example, the processor 3603 may transmit, via the transmitter 3605, an RAR including TA information.

A structure of a base station according to an embodiment is described below with reference to FIG. 37.

Figure 37:
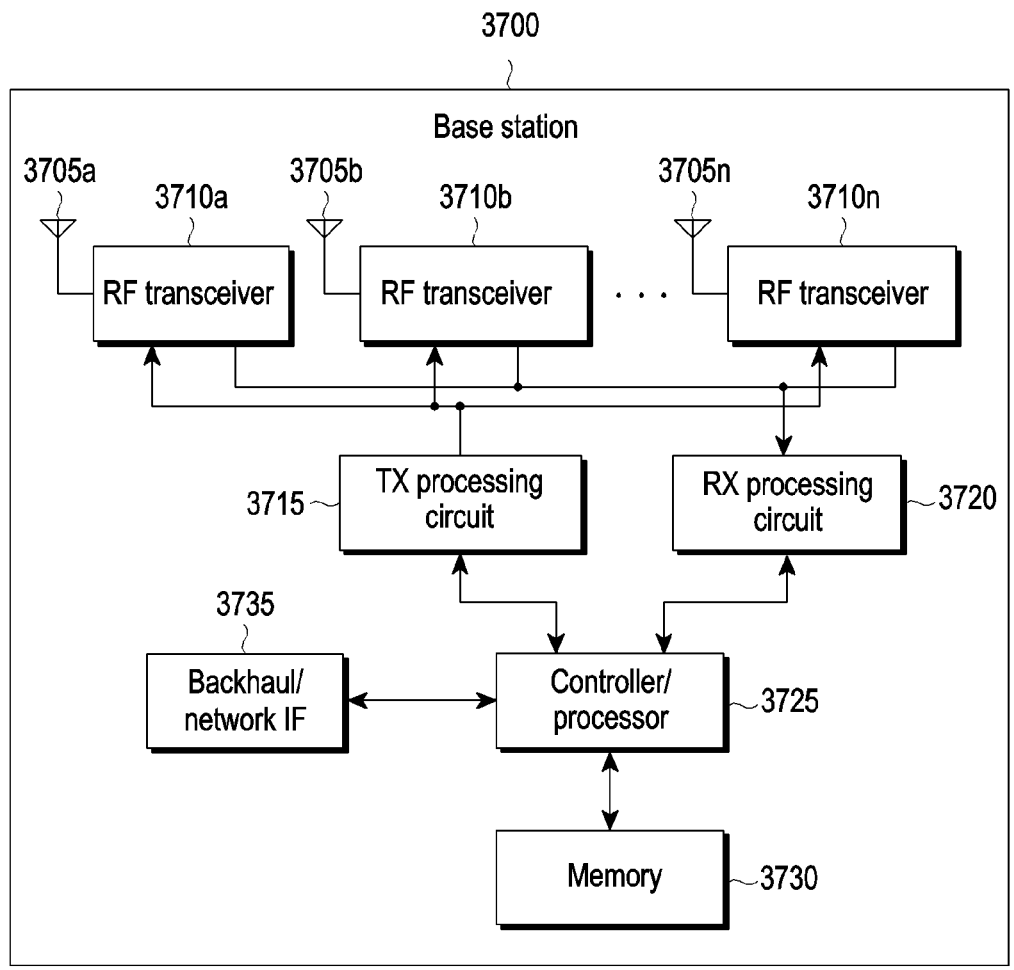
FIG. 37 is a diagram schematically illustrating a structure of an example base station according to an embodiment of the disclosure.

FIG. 37 is a diagram schematically illustrating a structure of an example base station according to an embodiment of the disclosure.

The embodiment of the base station illustrated in FIG. 37 is for illustrative purposes only, and the scope of the disclosure is not limited thereto.

Referring to FIG. 37, a base station 3700 includes a plurality of antennas 3705a to 3705n, a plurality of radio frequency (RF) transceivers 3710a to 3710n, a transmit (TX) processing circuit 3715, and a receive (RX) processing circuit 3720. The base station 3700 further includes a controller/processor 3725, a memory 3730, and a backhaul or network interface 3735.

The RF transceivers 3710a to 3710n receive input RF signals, such as signals transmitted from terminals in the network, through the antennas 3705a to 3705n. The RF transceivers 3710a to 3710n down-convert the input RF signals, generating intermediate frequency (IF) or baseband signals. The IF or baseband signals are transmitted to the RX processing circuit 3720, and the RX processing circuit 3720 filters, decodes, and/or digitizes the baseband or IF signals, generating processed baseband signals. The RX processing circuit 3720 sends the processed baseband signals to the controller/processor 3725 for further processing.

The TX processing circuit 3715 receives analog or digital data, such as speech data, web data, emails, or interactive video game data, from the controller/processor 3725. The TX processing circuit 3715 encodes, multiplexes, and/or digitizes the output baseband data, generating processed baseband or IF signals. The RF transceivers 3710a to 3710n receive the processed baseband or IF signals output from the TX processing circuit 3715 and up-convert the baseband or IF signals into RF signals which are to be transmitted through the antennas 3705a to 3705n.

The controller/processor 3725 may include one or more processors or other processing devices that control the overall operation of the base station 3700. In one example, the controller/processor 3725 may control reception of forward channel signals and transmission of reverse channel signals by the RF transceivers 3710a to 3710n, the RX processing circuit 3720, and the TX processing circuit 3715 according to known principles. The controller/processor 3725 may support additional functions, such as more advanced wireless communication functions.

According to various embodiments, the controller/processor 3725 performs overall operations related to an operation of adjusting uplink timing based on a TA as described in the first embodiment to the fourth embodiment.

Further, the controller/processor 3725 may support beamforming or directional routing operations in which signals output from the plurality of antennas 3705a to 3705n are differently weighted to efficiently steer the signals output in a desired direction. Any of other various functions may be supported by the controller/processor 3725 in the base station 3700.

The controller/processor 3725 may also execute programs and other processes, e.g., operating system (OS), resident in the memory 3730. The controller/processor 3725 may move data as required by a running process to the memory 3730 or the outside of the memory 3730.

The controller/processor 3725 is connected with the backhaul or network interface 3735. The backhaul or network interface 3735 allows the base station 3700 to communicate with other devices or systems over a backhaul connection or over a network. The network interface 3735 may support communications over any appropriate wired or wireless connection(s). For example, when the base station 3700 is implemented as a part of a cellular communication system (such as a cellular communication system supporting 5G, LTE, or LTE-A), the network interface 3735 allows the base station 3700 to communicate with other base stations via a wired or wireless backhaul connection. When the base station 3700 is implemented as an access point, the network interface 3735 allows the base station 3700 to communicate with a larger network (e.g., the Internet) via a wired or wireless local area network or a wired or wireless connection. The network interface 3735 includes an appropriate structure to support communications through a wired or wireless connection, such as Ethernet or RF transceiver.

The memory 3730 is connected to the controller/processor 3725. A portion of the memory 3730 may include a random access memory (RAM), and another portion of the memory 3730 may include a flash memory or a read-only memory (ROM).

Although FIG. 37 illustrates an example base station, various changes may be made thereto. As an example, the base station 3700 may include any number of such components as illustrated in FIG. 37. As an example, an access point may include a plurality of network interfaces 3735, and the controller/processor 3725 may support routing functions to route data between different network addresses. Although FIG. 37 illustrates that the base station 3700 includes a single instance of the TX processing circuit 3715 and a single instance of the RX processing circuit 3720, the base station 3700 may include multiple instances (e.g., one for each RF transceiver). Various components of FIG. 37 may be combined together, or each component may be further divided or some components may be omitted or, as necessary, more components may be added.

A structure of a terminal according to an embodiment is described below with reference to FIG. 38.

Figure 38:
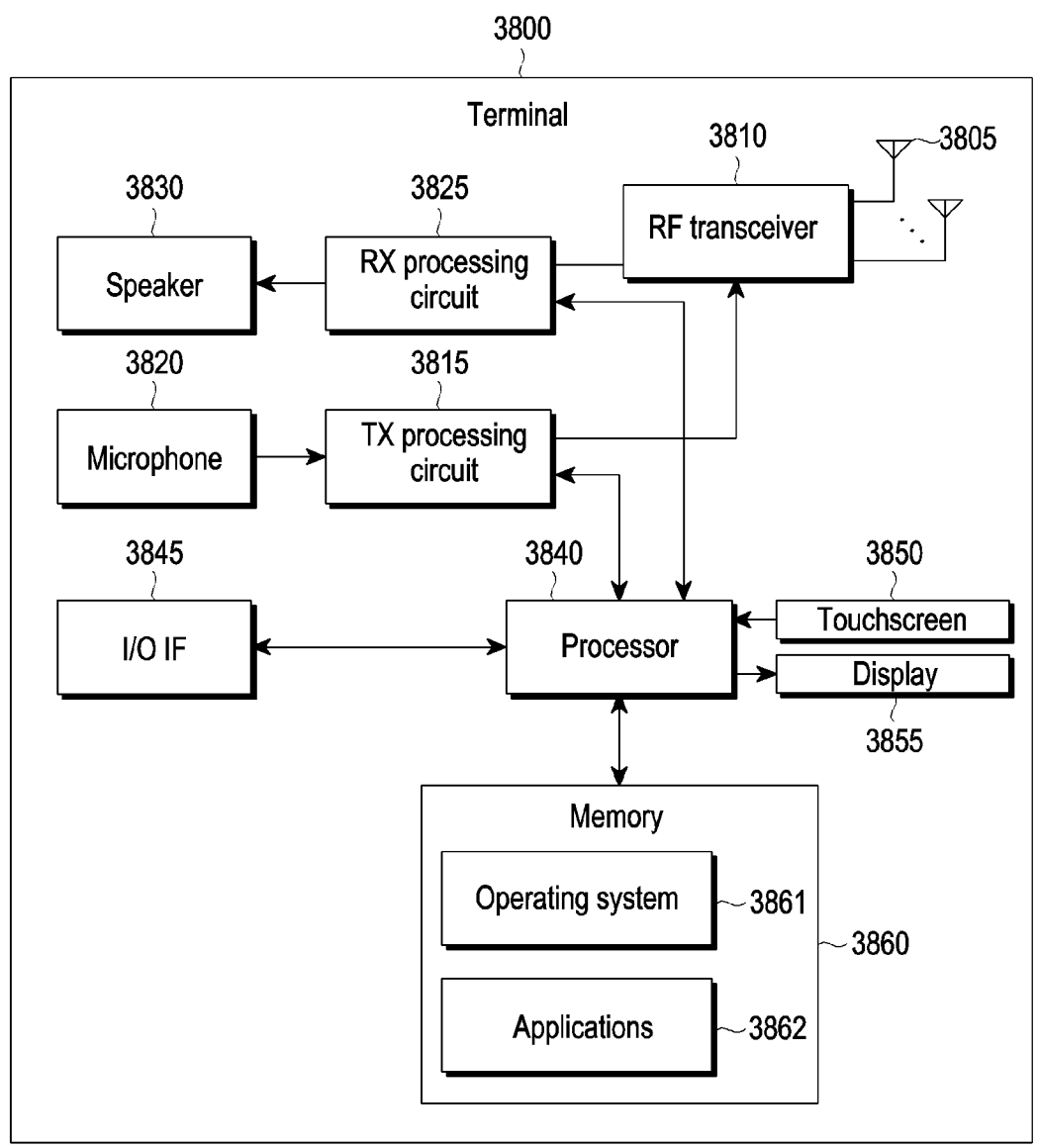
FIG. 38 is a view schematically illustrating a structure of an example terminal according to an embodiment of the disclosure.

FIG. 38 is a view schematically illustrating a structure of an example terminal according to an embodiment of the disclosure.

The embodiment of the terminal illustrated in FIG. 38 is for illustrative purposes only, and the scope of the disclosure is not limited thereto.

Referring to FIG. 38, a terminal 3800 may include an antenna 3805, a radio frequency (RF) transceiver 3810, a transmit (TX) processing circuit 3815, a microphone 3820, and a receive (RX) processing circuit 3825. The terminal 3800 further includes a speaker 3830, a processor 3840, an input/output (I/O) interface (IF) 3845, a touch screen 3850, a display 3855, and a memory 3860. The memory 3860 includes an operating system (OS) 3861 and one or more applications 3862.

The RF transceiver 3810 receives an input RF signal transmitted from a base station in a network, via the antenna 3805. The RF transceiver 3810 down-converts the input RF signal, generating an intermediate frequency (IF) or baseband signal. The IF or baseband signal is transmitted to the RX processing circuit 3825, and the RX processing circuit 3825 filters, decodes, and/or digitizes the baseband or IF signal, generating a processed baseband signal. The RX processing circuit 3825 sends the processed baseband signal to the speaker 3830 (e.g., for speech data) or the processor 3840 (e.g., for web browsing data) for further processing.

The TX processing circuit 3815 receives analog or digital speech data from the microphone 3820 or other output baseband data (e.g., web data, emails, or interactive video game data) from the processor 3840. The TX processing circuit 3815 encodes, multiplexes, and/or digitizes the output baseband data, generating a processed baseband or IF signal. The RF transceiver 3810 receives the processed baseband or IF signal output from the TX processing circuit 3815 and up-converts the baseband or IF signal into an RF signal which is to be transmitted through the antenna 3805.

The processor 3840 may include one or more processors or other processing devices, and may execute the OS 3861 stored in the memory 3860 to control the overall operation of the terminal 3800. As an example, the processor 3840 may control reception of downlink channel signals and transmission of uplink channel signals by the RF transceiver 3810, the RX processing circuit 3825, and the TX processing circuit 3815 according to known principles. According to an embodiment, the processor 3840 includes at least one microprocessor or microcontroller.

According to an embodiment, the processor 3840 performs overall operations related to an operation of adjusting uplink timing based on a TA as described in the first embodiment to the fourth embodiment.

The processor 3840 may execute other processes and programs embedded in the memory 3860. The processor 3840 may move data into or out of the memory 3860 as required by a running process. According to an embodiment, the processor 3840 is configured to execute the applications 3862 based on the OS 3861 or in response to signals received from base stations or the operator. The processor 3840 is coupled to the I/O interface 3845, and the I/O interface 3845 provides the terminal 3800 with connectability to other devices, e.g., laptop computers and handheld computers. The I/O interface 3845 is a communication path between these accessories and the processor 3840.

The processor 3840 is also connected to the touch screen 3850 and the display 3855. The operator of the terminal 3800 may input data into the terminal 3800 using the touch screen 3850. The display 3855 may be a liquid crystal display, a light emitting diode display, or other displays capable of rendering text and/or at least limited graphics, such as from websites.

The memory 3860 is connected to the processor 3840. A portion of the memory 3860 may include a random access memory (RAM), and the remainder of the memory 3860 may include a flash memory or a read-only memory (ROM).

Although FIG. 38 illustrates an example terminal, various changes may be made thereto. For example, various components of FIG. 38 may be combined together, each component may be further divided, or some components may be omitted, or other components may be added as necessary. As an example, the processor 3840 may be divided into multiple processors, such as one or more central processing units (CPUs) and one or more graphics processing units (GPUs). Although the terminal 3800 is configured like a mobile phone or a smart phone in FIG. 38, the terminal 3800 may be configured to operate as a different type of mobile or stationary device.

According to various embodiments of the disclosure, a method performed by a terminal in a communication system is provided, and the method may comprise receiving, from a base station, a common timing advance (TA) controlled by the base station, estimating a terminal-specific TA used for compensating for link delay between the base station and the terminal, and determining a TA of the terminal based on the common TA and the terminal-specific TA.

According to various embodiments of the disclosure, the common TA may be a TA which is commonly applied to a plurality of terminals including the terminal.

According to various embodiments of the disclosure, the common TA may be received via one of a system information block (SIB), a medium access control (MAC) control element (CE), and a radio resource control (RRC) message.

According to various embodiments of the disclosure, the method may further comprise receiving, from the base station, information indicating to report the terminal-specific TA; and reporting the terminal-specific TA to the base station.

According to various embodiments of the disclosure, the information indicating to report the terminal-specific TA may be received via one of downlink control information (DCI), a medium access control (MAC) control element (CE), and a radio resource control (RRC) message.

According to various embodiments of the disclosure, a method performed by a base station in a communication system is provided, and the method may comprise transmitting, to a terminal, a common timing advance (TA) controlled by the base station, and receiving an uplink signal from the terminal at time at which a TA of the terminal is applied, wherein the TA of the terminal is determined based on the common TA and a terminal-specific TA used for compensating for link delay between the base station and the terminal, and wherein the terminal-specific TA is estimated by the terminal.

According to various embodiments of the disclosure, the common TA may be a TA which is commonly applied to a plurality of terminals including the terminal.

According to various embodiments of the disclosure, the common TA may be transmitted via one of a system information block (SIB), a medium access control (MAC) control element (CE), and a radio resource control (RRC) message.

According to various embodiments of the disclosure, the method may further comprise transmitting, to the terminal, information indicating to report the terminal-specific TA, and receiving the terminal-specific TA from the terminal.

According to various embodiments of the disclosure, the information indicating to report the terminal-specific TA may be transmitted via one of downlink control information (DCI), a medium access control (MAC) control element (CE), and a radio resource control (RRC) message.

According to various embodiments of the disclosure, a terminal in a communication system is provided, and the terminal may comprise a transceiver, and a processor connected to the transceiver and configured to: receive, from a base station via the transceiver, a common timing advance (TA) controlled by the base station, estimate a terminal-specific TA used for compensating for link delay between the base station and the terminal, and determine a TA of the terminal based on the common TA and the terminal-specific TA.

According to various embodiments of the disclosure, the common TA may be a TA which is commonly applied to a plurality of terminals including the terminal.

According to various embodiments of the disclosure, the common TA may be received via one of a system information block (SIB), a medium access control (MAC) control element (CE), and a radio resource control (RRC) message.

According to various embodiments of the disclosure, the processor may be further configured to receive, from the base station via the transceiver, information indicating to report the terminal-specific TA, and report, via the transceiver, the terminal-specific TA to the base station.

According to various embodiments of the disclosure, the information indicating to report the terminal-specific TA may be received via one of downlink control information (DCI), a medium access control (MAC) control element (CE), and a radio resource control (RRC) message.

According to various embodiments of the disclosure, a base station in a communication system is provided, and the base station may comprise a transceiver, and a processor connected to the transceiver and configured to: transmit, to a terminal via the transceiver, a common timing advance (TA) controlled by the base station, and receive, via the transceiver, an uplink signal from the terminal at time at which a TA of the terminal is applied, the TA of the terminal may be determined based on the common TA and a terminal-specific TA used for compensating for link delay between the base station and the terminal, and the terminal-specific TA may be estimated by the terminal.

According to various embodiments of the disclosure, the common TA may be a TA which is commonly applied to a plurality of terminals including the terminal.

According to various embodiments of the disclosure, the common TA may be transmitted via one of a system information block (SIB), a medium access control (MAC) control element (CE), and a radio resource control (RRC) message.

According to various embodiments of the disclosure, the processor may be further configured to: transmit, to the terminal via the transceiver, information indicating to report the terminal-specific TA, and receive, via the transceiver, the terminal-specific TA from the terminal.

According to various embodiments of the disclosure, the information indicating to report the terminal-specific TA may be transmitted via one of downlink control information (DCI), a medium access control (MAC) control element (CE), and a radio resource control (RRC) message.

According to various embodiments of the disclosure, a method of a terminal in a communication system is provided, and the method comprises selecting at least one of a first scheme in which the terminal determines timing-related information used for adjusting uplink timing and a second scheme in which at least one of a base station and a satellite determines the timing-related information as a final scheme for determining the timing-related information, and determining the timing-related information based on the final scheme.

According to various embodiments of the disclosure, the method further comprises adjusting uplink timing based on the determined timing-related information.

According to various embodiments of the disclosure, selecting the at least one of the first scheme and the second scheme as the final scheme comprises selecting the second scheme as the final scheme by default, and changing the final scheme from the second scheme to the first scheme in case that the at least one of the base station and the satellite transmits first information related to the second scheme in a state in which the second scheme is selected as the final scheme.

According to various embodiments of the disclosure, selecting the at least one of the first scheme and the second scheme as the final scheme comprises receiving, from the at least one of the base station or the satellite, first information related to a scheme which the terminal will select as the final scheme among the first scheme and the second scheme, and selecting the at least one of the first scheme and the second scheme as the final scheme based on the first information.

According to various embodiments of the disclosure, selecting the at least one of the first scheme and the second scheme as the final scheme comprises selecting the at least one of the first scheme and the second scheme as the final scheme based on a capability of the terminal.

According to various embodiments of the disclosure, selecting the at least one of the first scheme and the second scheme as the final scheme comprises selecting the at least one of the first scheme and the second scheme as the final scheme based on reliability of a signal transmitted from the satellite.

According to various embodiments of the disclosure, selecting the at least one of the first scheme and the second scheme as the final scheme comprises selecting the at least one of the first scheme and the second scheme as the final scheme based on reliability of a signal transmitted from the satellite and whether the satellite is configured.

According to various embodiments of the disclosure, selecting the at least one of the first scheme and the second scheme as the final scheme comprises selecting the at least one of the first scheme and the second scheme as the final scheme based on whether a serving cell is provided via a satellite network or a terrestrial network.

According to various embodiments of the disclosure, the method further comprises reporting, to the at least one of the base station and the satellite, the determined timing-related information and information related to the final scheme.

According to various embodiments of the disclosure, a method of a base station in a communication system is provided, and the method comprises receiving, from a terminal, information about a final scheme which the terminal uses for determining timing-related information used for adjusting uplink timing and the timing-related information, and the final scheme is selected as at least one of a first scheme in which the terminal determines the timing-related information and a second scheme in which at least one of the base station and a satellite determines the timing-related information.

According to various embodiments of the disclosure, the second scheme is selected as the final scheme by default, or wherein the second scheme is selected based on a capability of the terminal, or reliability of a signal transmitted from the satellite.

According to various embodiments of the disclosure, a terminal in a communication system is provided, and the terminal comprises a processor, and a transceiver, and the processor is configured to: select at least one of a first scheme in which the terminal determines timing-related information used for adjusting uplink timing and a second scheme in which at least one of a base station and a satellite determines the timing-related information as a final scheme for determining the timing-related information, and determine the timing-related information based on the final scheme.

According to various embodiments of the disclosure, the processor is further configured to adjust uplink timing based on the determined timing-related information.

According to various embodiments of the disclosure, the processor is configured to: select the second scheme as the final scheme by default, and change the final scheme from the second scheme to the first scheme in case that the at least one of the base station and the satellite transmits first information related to the second scheme in a state in which the second scheme is selected as the final scheme.

According to various embodiments of the disclosure, the transceiver is configured to receive, from the at least one of the base station or the satellite, first information related to a scheme which the terminal will select as the final scheme among the first scheme and the second scheme, and the processor is configured to select the at least one of the first scheme and the second scheme as the final scheme based on the first information.

According to various embodiments of the disclosure, the processor is configured to select the at least one of the first scheme and the second scheme as the final scheme based on a capability of the terminal.

According to various embodiments of the disclosure, the processor is configured to select the at least one of the first scheme and the second scheme as the final scheme based on reliability of a signal transmitted from the satellite.

According to various embodiments of the disclosure, the processor is configured to select the at least one of the first scheme and the second scheme as the final scheme based on reliability of a signal transmitted from the satellite and whether the satellite is configured.

According to various embodiments of the disclosure, the processor is configured to select the at least one of the first scheme and the second scheme as the final scheme based on whether a serving cell is provided via a satellite network or a terrestrial network.

According to various embodiments of the disclosure, the transceiver is further configured to report, to the at least one of the base station and the satellite, the determined timing-related information and information related to the final scheme.

According to various embodiments of the disclosure, a base station in a communication system is provided, and the base station comprise a processor and a transceiver, the transceiver is configured to receive, from a terminal, information about a final scheme which the terminal uses for determining timing-related information used for adjusting uplink timing and the timing-related information, and the final scheme is selected as at least one of a first scheme in which the terminal determines the timing-related information and a second scheme in which at least one of the base station and a satellite determines the timing-related information.

According to various embodiments of the disclosure, the second scheme is selected as the final scheme by default, or the second scheme is selected based on a capability of the terminal, or reliability of a signal transmitted from the satellite.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, the first embodiment and the second embodiment may be combined and applied. The above-described embodiments may be changed or modified based on their technical spirit and applied to LTE systems or 5G systems.

One aspect of the disclosure enables to provide a method and apparatus for adjusting uplink timing in a communication system.

Another aspect of the disclosure enables to provide a method and apparatus for adjusting uplink timing if a terminal transmits and receives a signal to and from a base station via a satellite in a communication system.

Still another aspect of the disclosure enables to provide a scheme in which a terminal directly determines a timing advance (TA) value to adjust uplink timing in a communication system supporting a non-terrestrial network (NTN).

Still another aspect of the disclosure enables provide a scheme in which a base station or a satellite indicates a TA value and a terminal adjusts uplink timing based on the indicated TA value in a communication system supporting an NTN.

Still another aspect of the disclosure enables to provide a scheme in which a terminal adjusts uplink timing by adaptively selecting a scheme in which the terminal directly determines a TA value to adjust uplink timing and a scheme in which a base station or a satellite indicates a TA value and the terminal adjusts uplink timing based on the indicated TA value in a communication system supporting an NTN.

Still another aspect of the disclosure enables to provide a scheme in which a terminal reports a TA value or information about a method used for determining the TA value in a communication system supporting an NTN.

According to various embodiments of the disclosure, a terminal may access a base station via a satellite, the base station may indicate a time offset to the terminal, and the terminal may compensate for the time offset, so that it is possible to effectively transmit and receive a signals between the base station and the terminal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, system information block (SIB) including information associated with a timing advance (TA);
   identifying a first TA based on the information associated with the TA;
   determining a second TA based on a position of the UE and a position of a serving satellite to compensate for link delay;
   determining a third TA for transmission from the UE based on the first TA and the second TA;
   receiving, from the base station, information for TA reporting, the information including offset for the TA reporting; and
   transmitting, to the base station, a TA report related to the third TA.

2. The method of claim 1, wherein the first TA is a TA which is commonly applied to a plurality of UEs.

3. The method of claim 1, wherein the first TA is received via a radio resource control (RRC) message.

4. The method of claim 1, wherein the information for the TA reporting is received via at least one of downlink control information (DCI), a medium access control (MAC) control element (CE), or a radio resource control (RRC) message.

5. A method performed by a base station in a wireless communication system, the method comprising:
   transmitting, to a user equipment (UE), system information block (SIB) including information associated with a timing advance (TA);
   receiving an uplink signal from the UE at time at which a third TA of the UE is applied;
   transmitting, to the UE, information for TA reporting, the information including offset for the TA reporting; and
   receiving, from the UE, a TA report related to the third TA,
   wherein the third TA for transmission from the UE is determined based on a first TA and a second TA,
   wherein the first TA is identified based on the information associated with the TA, and
   wherein the second TA is used to compensate for link delay, and the second TA is determined based on a location of the UE and a location of a serving satellite.

6. The method of claim 5, wherein the first TA is a TA which is commonly applied to a plurality of UEs.

7. The method of claim 5, wherein the first TA is transmitted via a radio resource control (RRC) message.

8. The method of claim 5, wherein the information for the TA reporting is received via at least one of downlink control information (DCI), a medium access control (MAC) control element (CE), or a radio resource control (RRC) message.

9. A user equipment (UE) in a wireless communication system, the UE comprising:
   a transceiver; and
   a processor coupled with the transceiver and configured to control to:
   receive, from a base station, system information block (SIB) including information associated with a timing advance (TA), identify a first TA based on the information associated with the TA, determine a second TA based on a location of the UE and a location of a serving satellite to compensate for link delay, determine a third TA for transmission from the UE based on the first TA and the second TA, receive, from the base station, information for TA reporting, the information including offset for the TA reporting, and transmit, to the base station, a TA report related to the third TA.

10. The UE of claim 9, wherein the first TA is a TA which is commonly applied to a plurality of UEs.

11. The UE of claim 9, wherein the first TA is received via a radio resource control (RRC) message.

12. The UE of claimer 9, wherein the information for the TA reporting is received via at least one of downlink control information (DCI), a medium access control (MAC) control element (CE), or a radio resource control (RRC) message.

13. A base station in a wireless communication system, the base station comprising:

a transceiver; and a processor coupled with the transceiver and configured to control to:

transmit, to a user equipment (UE), system information block (SIB) including information associated with a timing advance (TA), receive, from the UE, an uplink signal at time at which a third TA of the UE is applied, transmit, to the UE, information for TA reporting, the information including offset for the TA reporting, and receive, from the UE, a TA report related to the third TA, wherein the third TA for transmission from the UE is determined based on a first TA and a second TA, wherein the first TA is identified based on the information associated with the TA, and wherein the second TA is used to compensate for link delay, and the second TA is determined based on a location of the UE and a location of a serving satellite.

14. The base station of claim 13, wherein the first TA is a TA which is commonly applied to a plurality of UEs.

15. The base station of claim 13, wherein the first TA is transmitted via a radio resource control (RRC) message.

16. The base station of claim 13, wherein the information for the TA reporting is received via at least one of downlink control information (DCI), a medium access control (MAC) control element (CE), or a radio resource control (RRC) message.

* * * * *